(12) United States Patent
Kirby et al.

(10) Patent No.: US 6,579,556 B2
(45) Date of Patent: Jun. 17, 2003

(54) AMBIENT STABLE BEVERAGE

(75) Inventors: Roy Michael Kirby, Bedford (GB); Hazel Steels, Bedford (GB); Malcolm Stratford, Bedford (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/855,116

(22) Filed: May 14, 2001

(65) Prior Publication Data

US 2001/0055644 A1 Dec. 27, 2001

(30) Foreign Application Priority Data

May 15, 2000 (GB) ................................. 0011677

(51) Int. Cl.$^7$ .................................................. A23F 3/00
(52) U.S. Cl. .................... 426/597; 426/521; 426/330.2; 426/335
(58) Field of Search ................................ 426/597, 521, 426/330.3, 335

(56) References Cited

U.S. PATENT DOCUMENTS

| 2,273,062 A | 2/1942 | Musher |
| 4,015,024 A | 3/1977 | Horman et al. |
| 5,914,149 A | 6/1999 | Tomida |
| 6,036,986 A | 3/2000 | Cirigliano et al. |
| 6,042,861 A | 3/2000 | Anslow et al. |

FOREIGN PATENT DOCUMENTS

| CH | 688 787 A | 3/1998 |
| EP | 0 501 094 A | 9/1992 |
| EP | 0 639 335 A1 | 2/1995 |
| GB | 2 315 398 A | 2/1998 |
| JP | 62-224273 | 10/1987 |
| JP | 10-295272 | 11/1998 |
| WO | WO 97/02762 | 1/1997 |

OTHER PUBLICATIONS

Patent Act 1977 Search Report under Section 17 (GB 0011677.2).
WPI Abstract Accession No. 1999–038200 & JP 100295272 (Riken Vitamin Co.) 10.11.98.
WPI Abstract Accession No. 1987–317008 & JP 62022423 (Meiji Milk Prod Co) 02.10.87.
05125404 JP06311846—1 page.
09289080 JP11116418—1 page.
International Search Report, PCT/EP 01/04855—7 pages.

*Primary Examiner*—Anthony J. Weier

(57) ABSTRACT

A method for preparing an ambient-stable beverage that is suitable for cold filing. The method involves adding to a beverage at least one pasteurization adjunct that has no appreciable fungicidal activity at a temperature between 0 and 40 degrees C but exhibits fungicidal activity when heated to a temperature between 40 and 65 degrees C, and raising the temperature of the beverage to a temperature between 40 and 65 degrees C in order to activate the fungicidal activity of the pasteurisation adjunct.

11 Claims, 47 Drawing Sheets

Fig. 9.
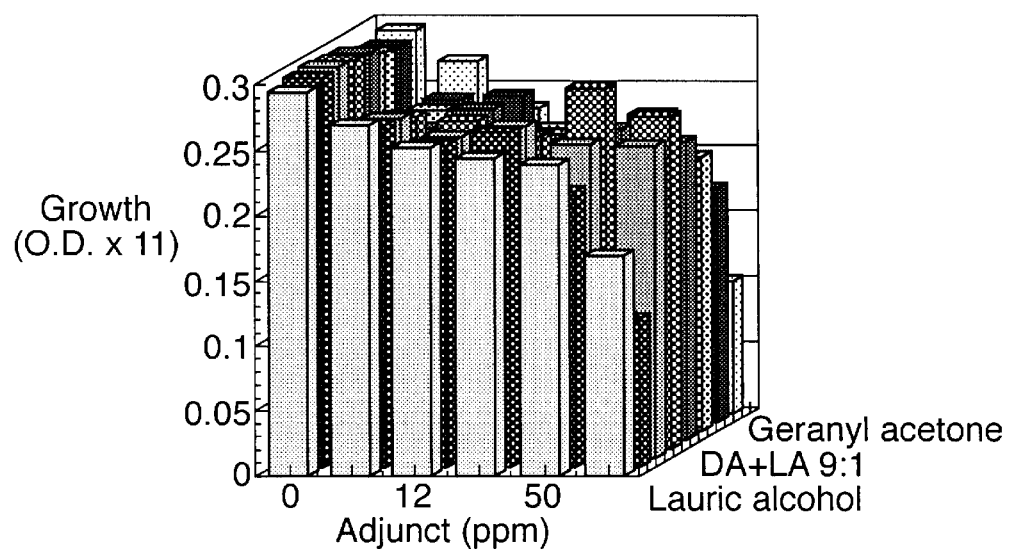
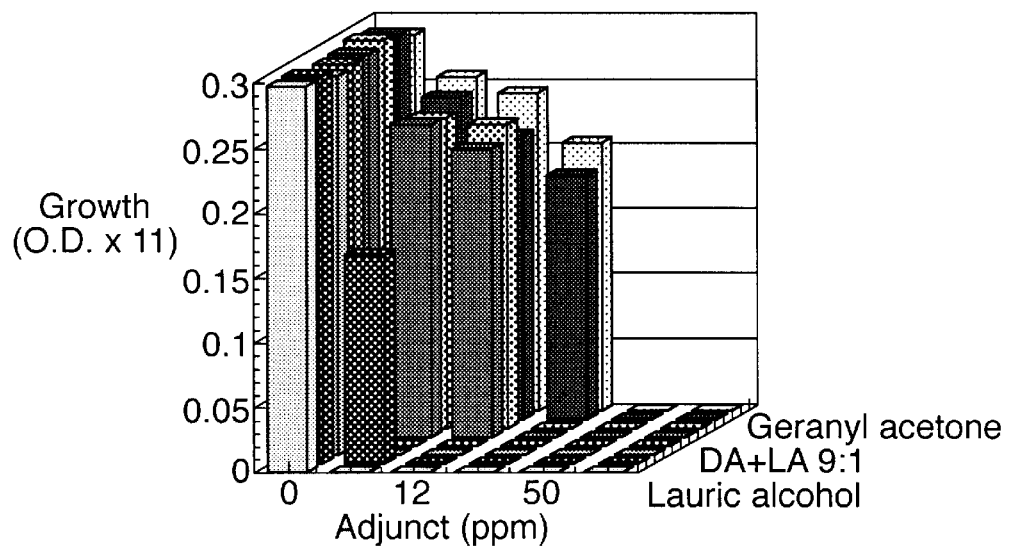

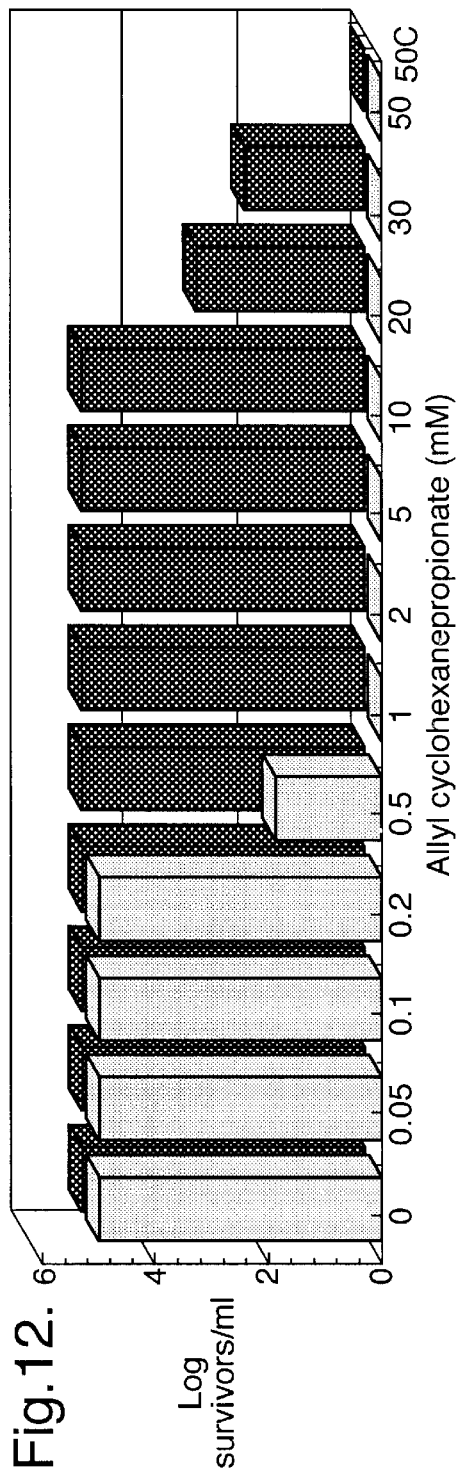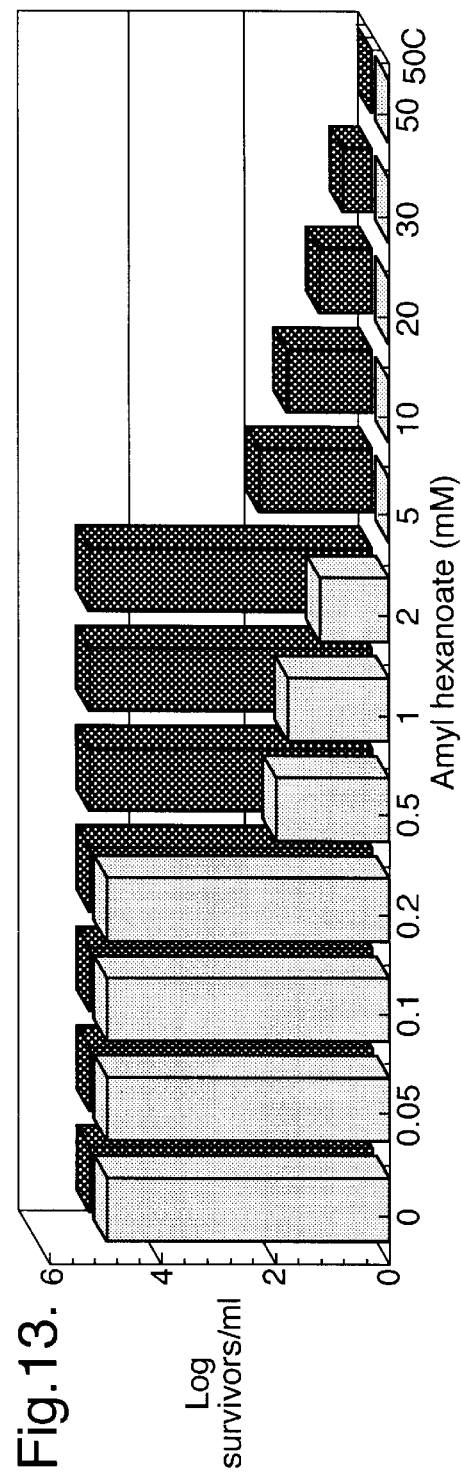

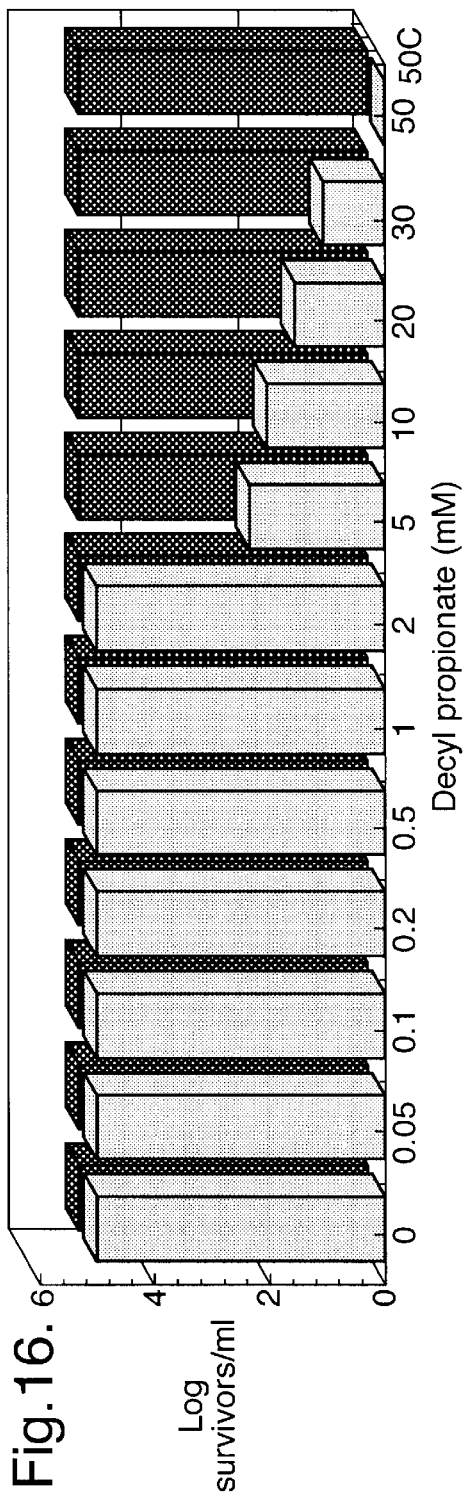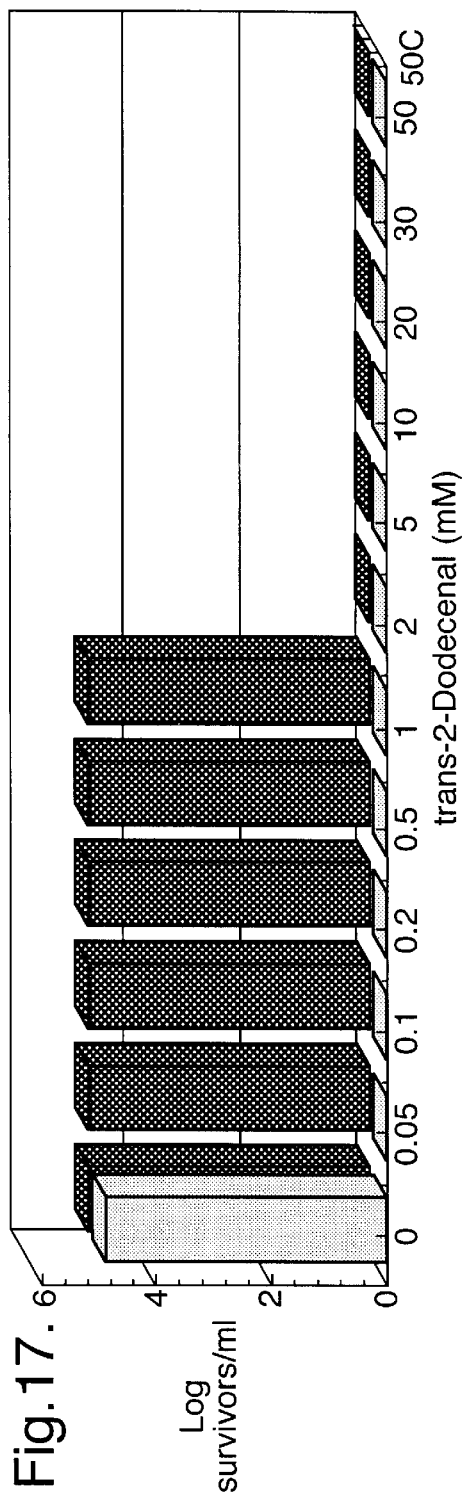

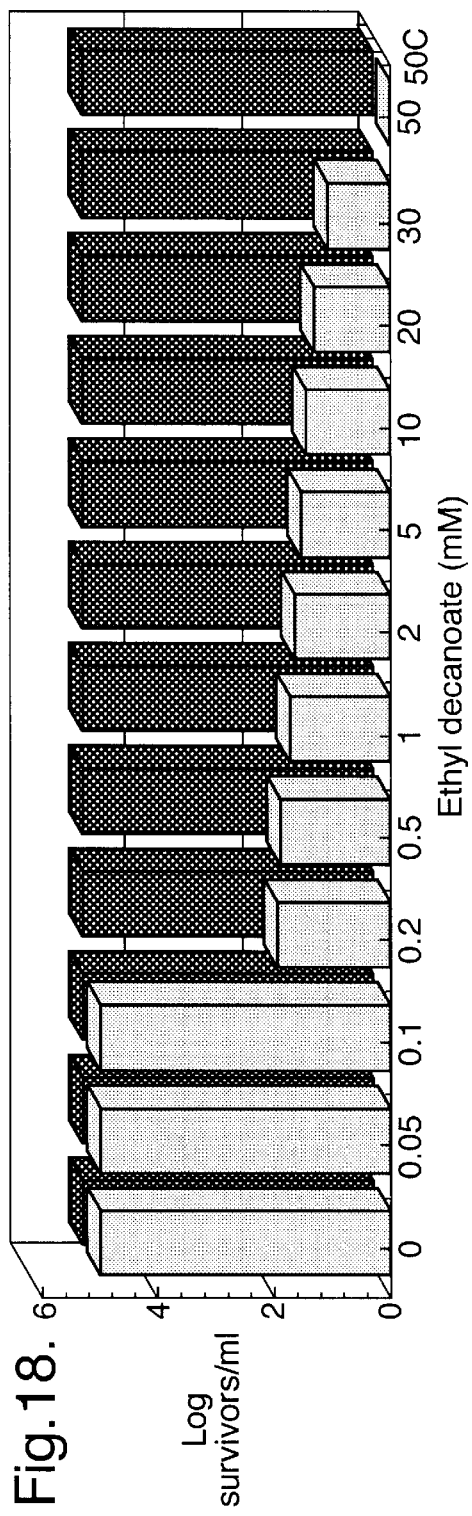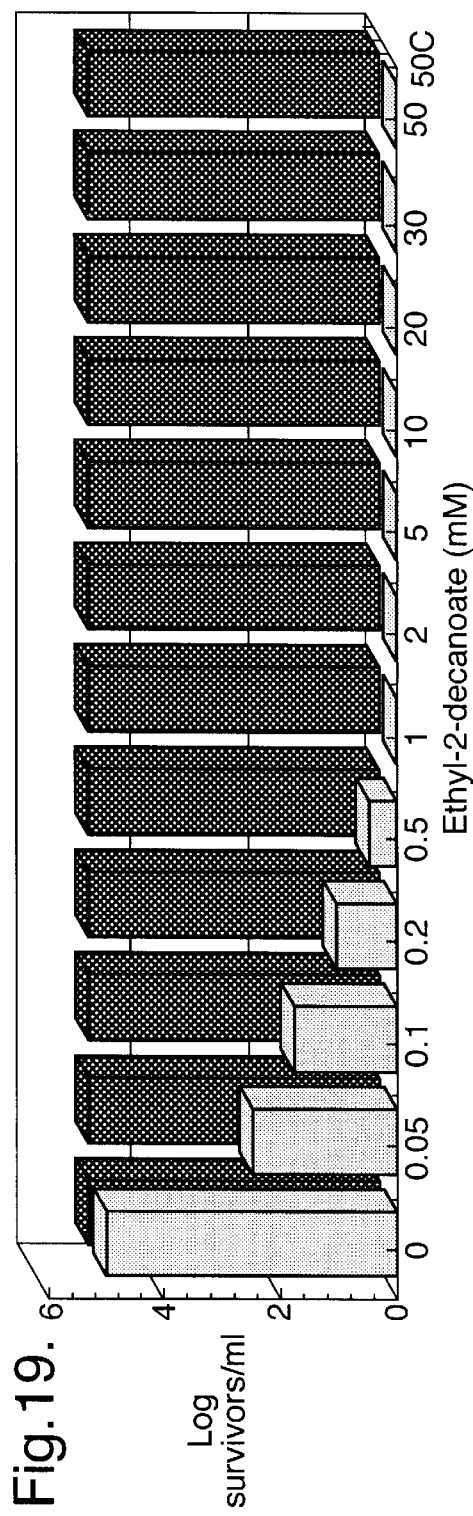

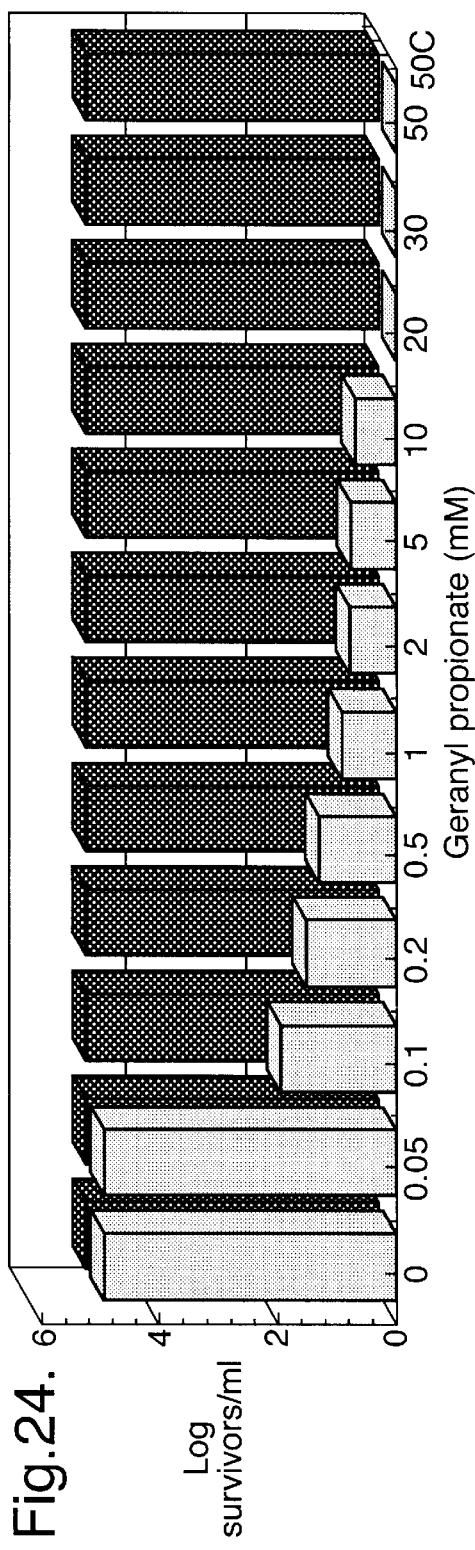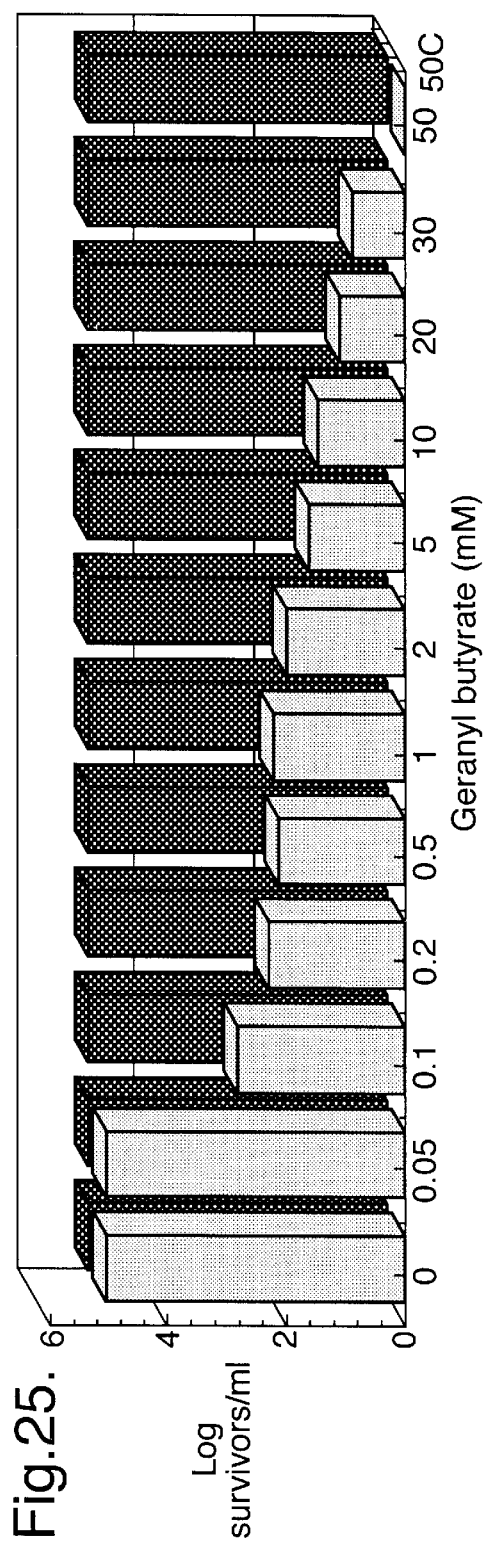

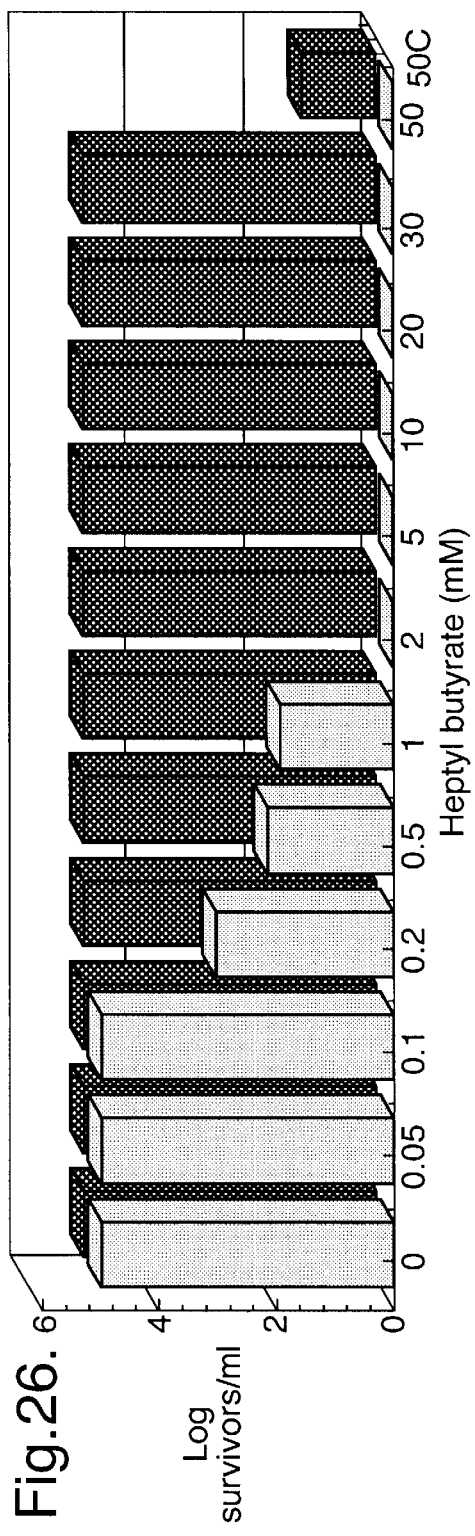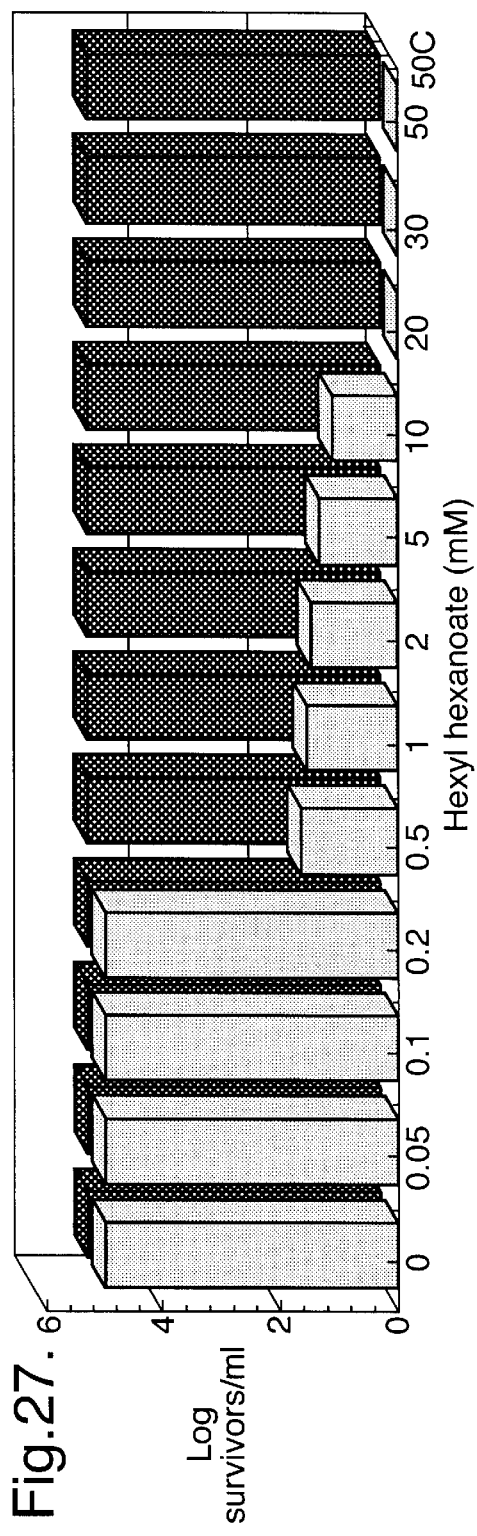

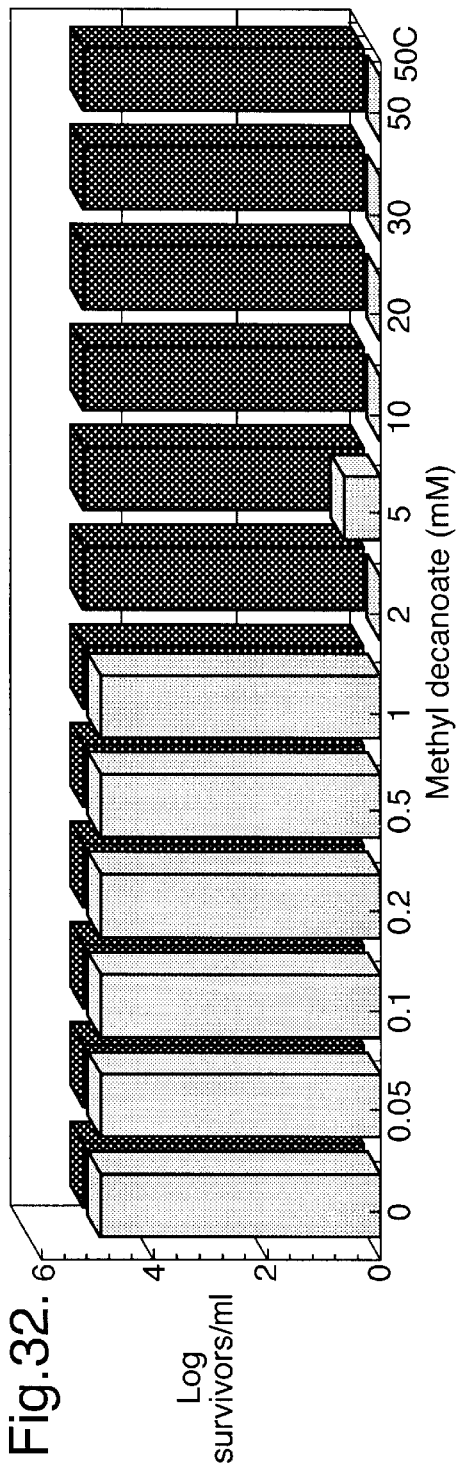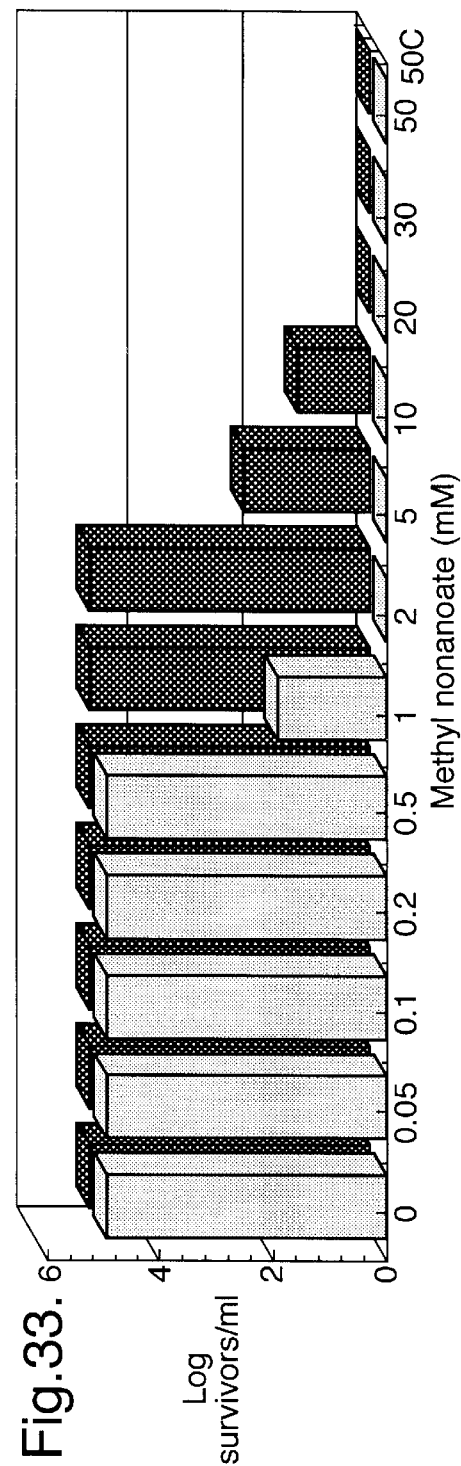

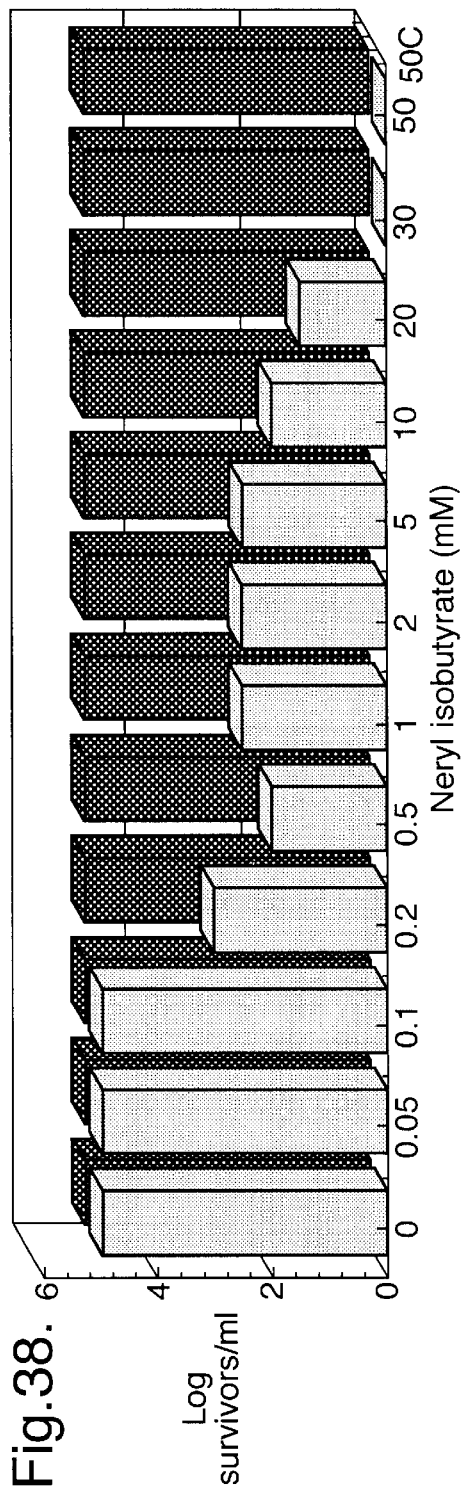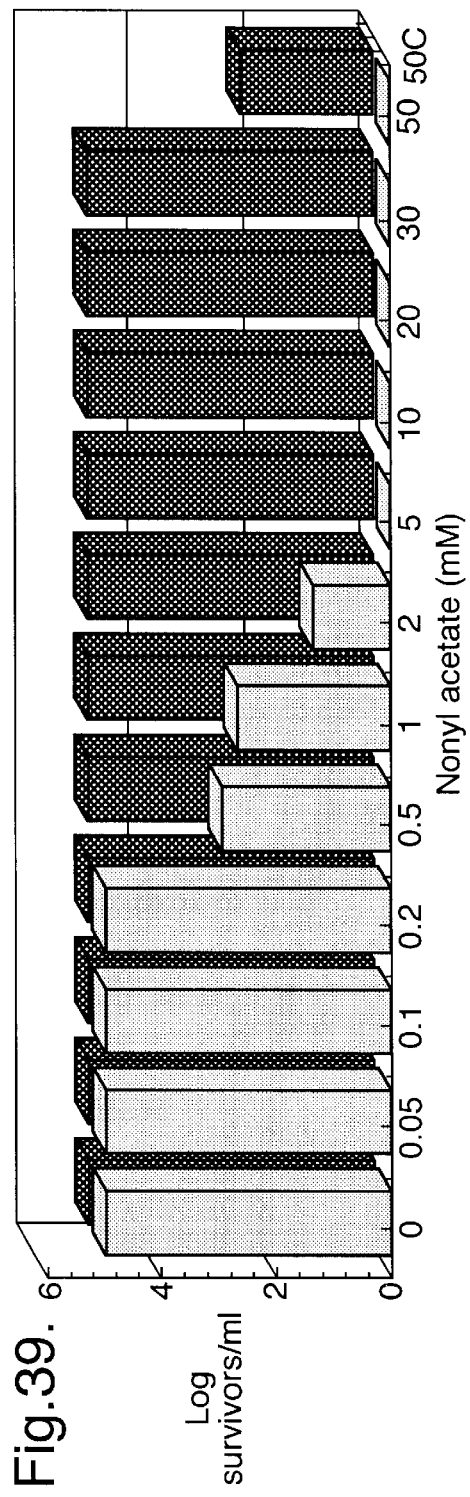

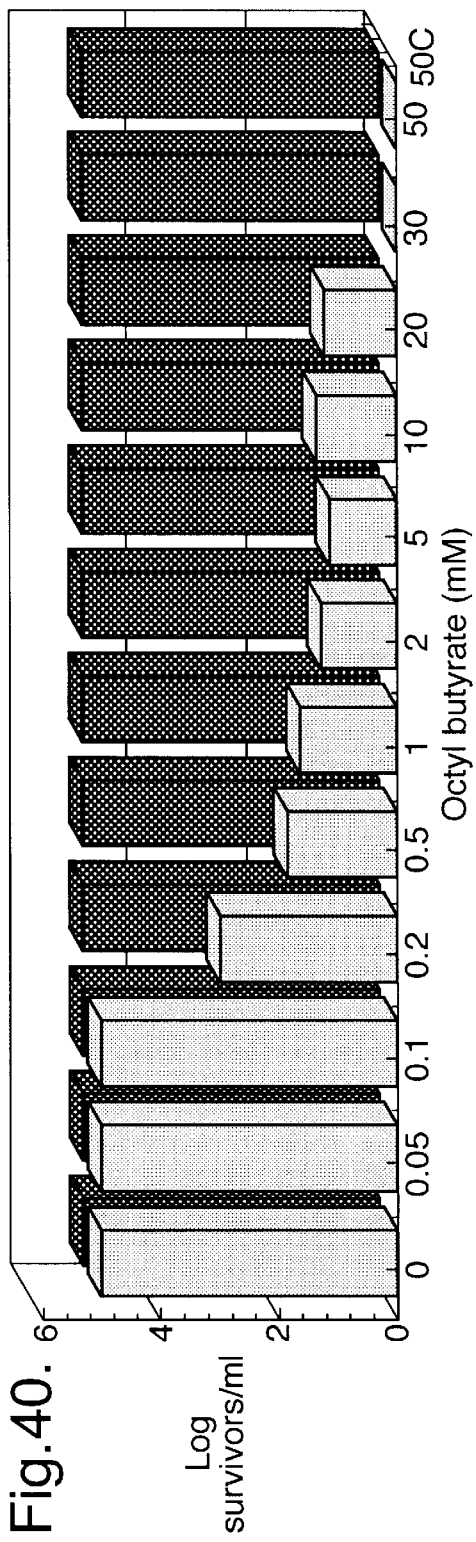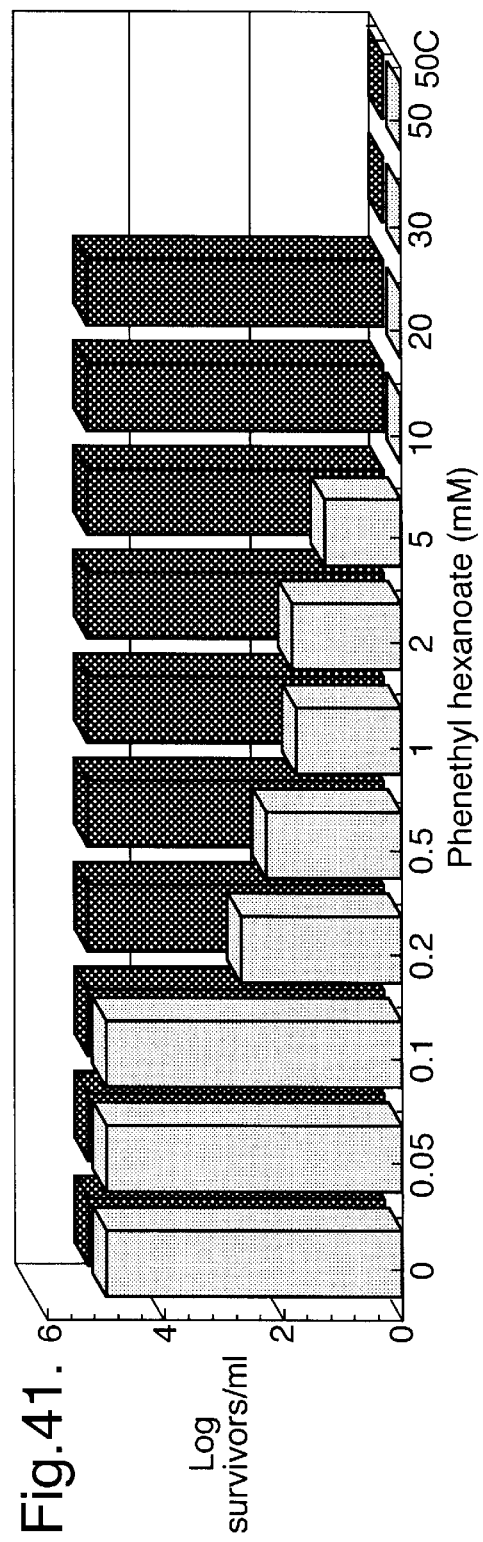

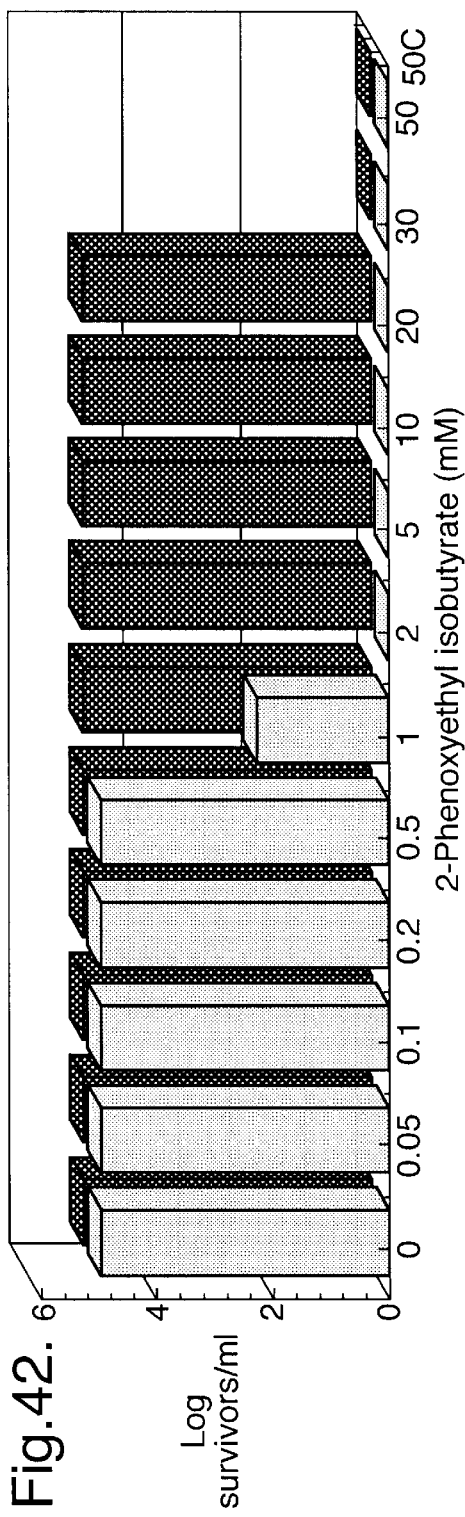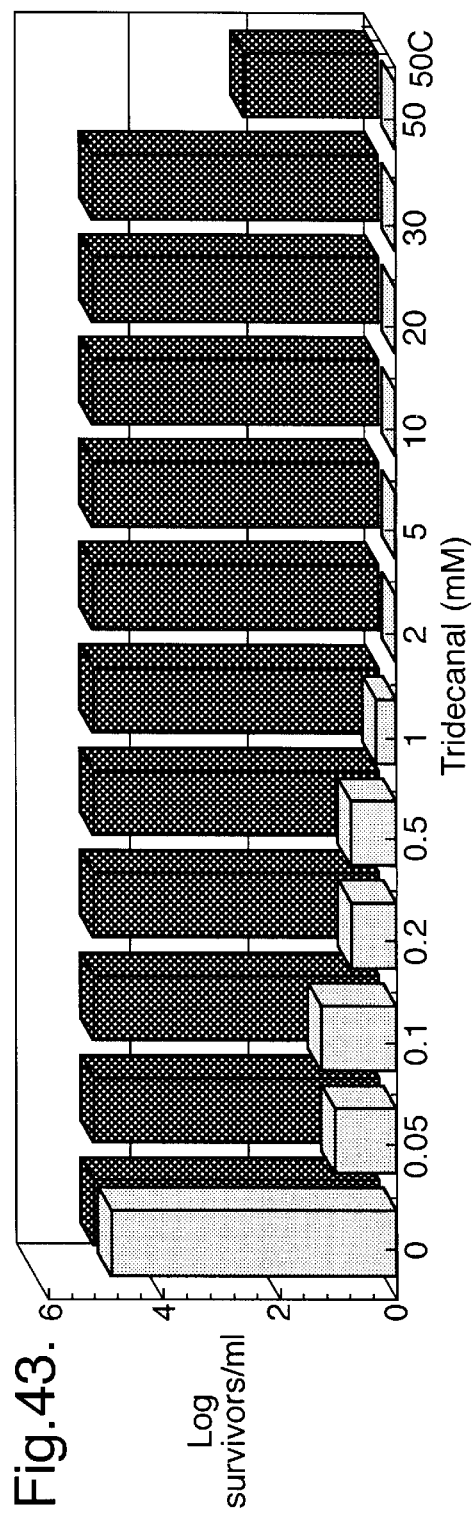

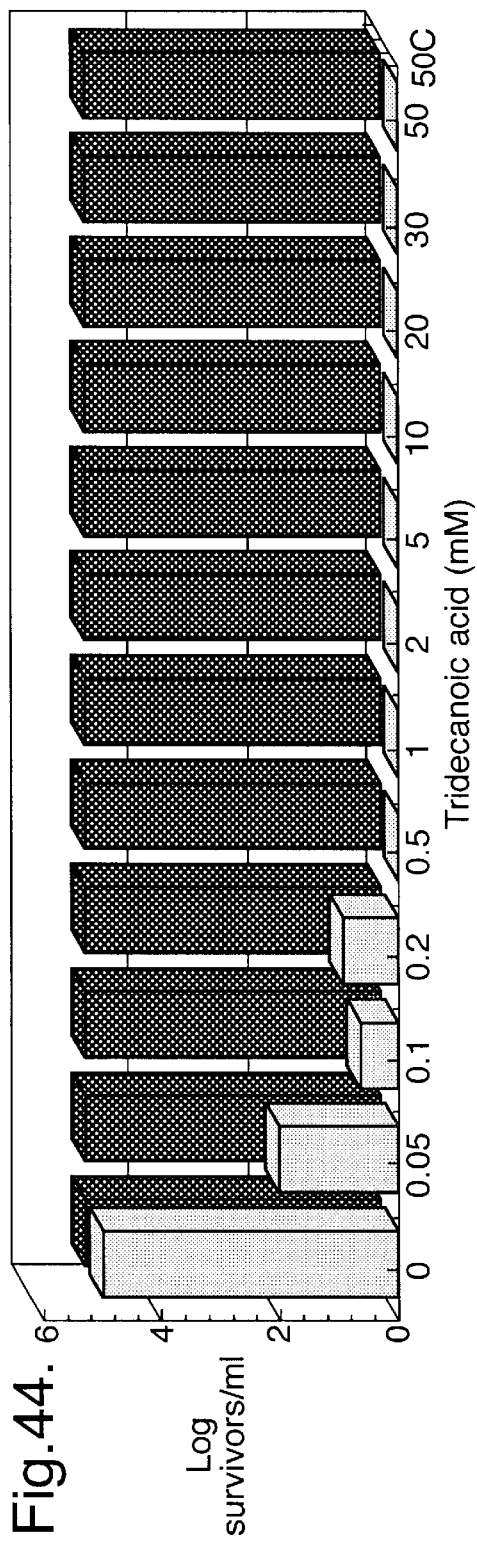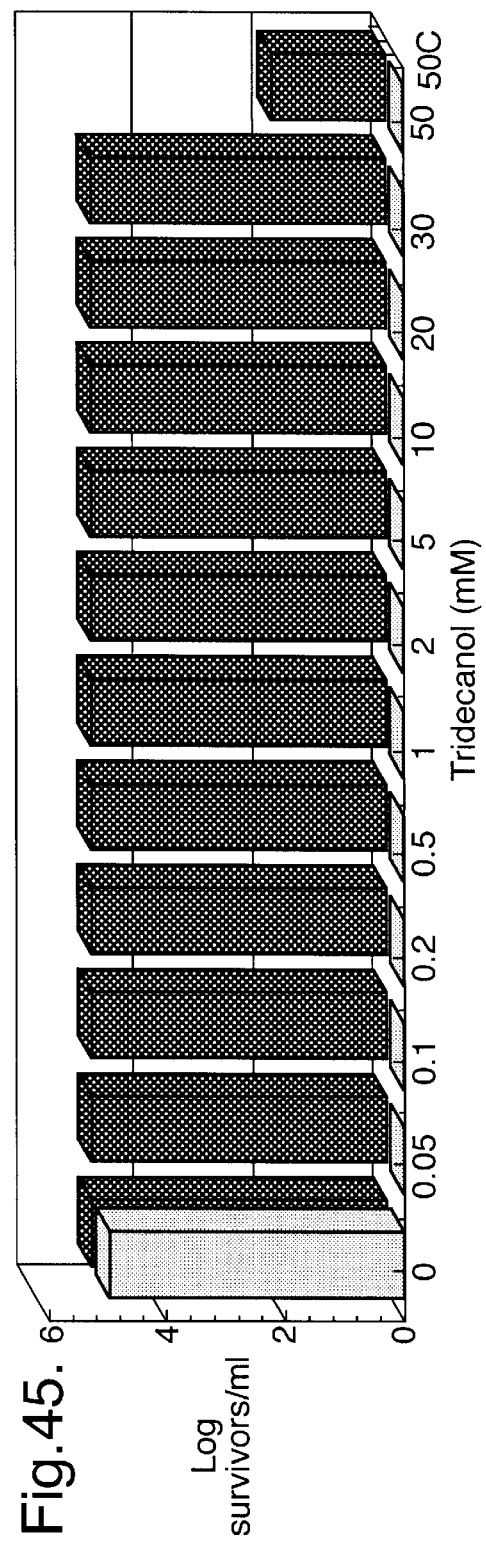

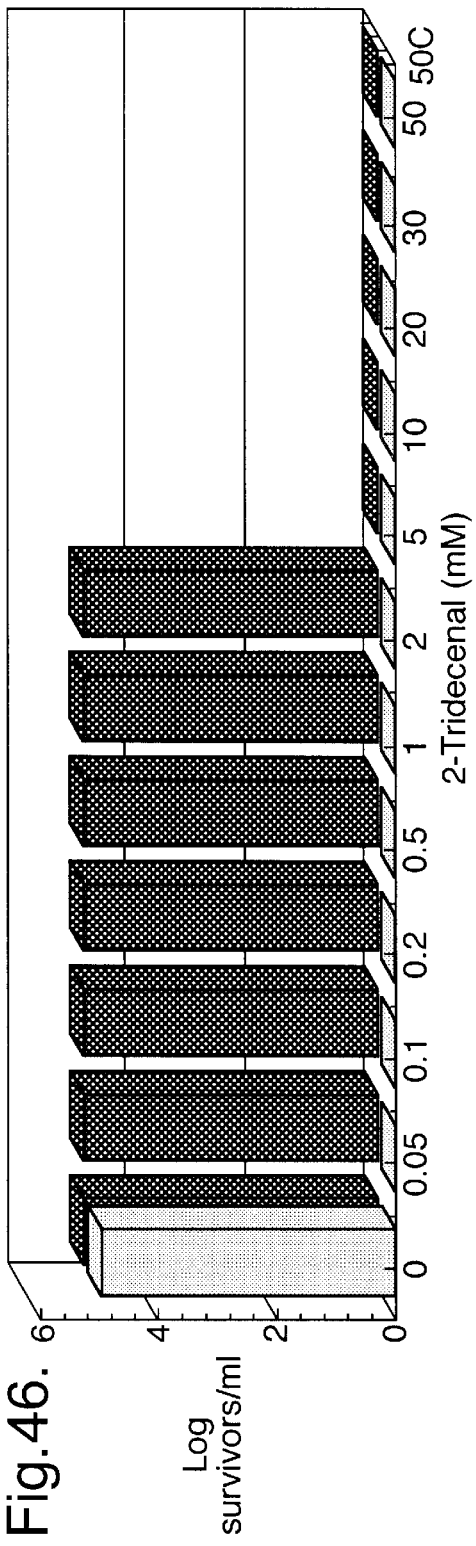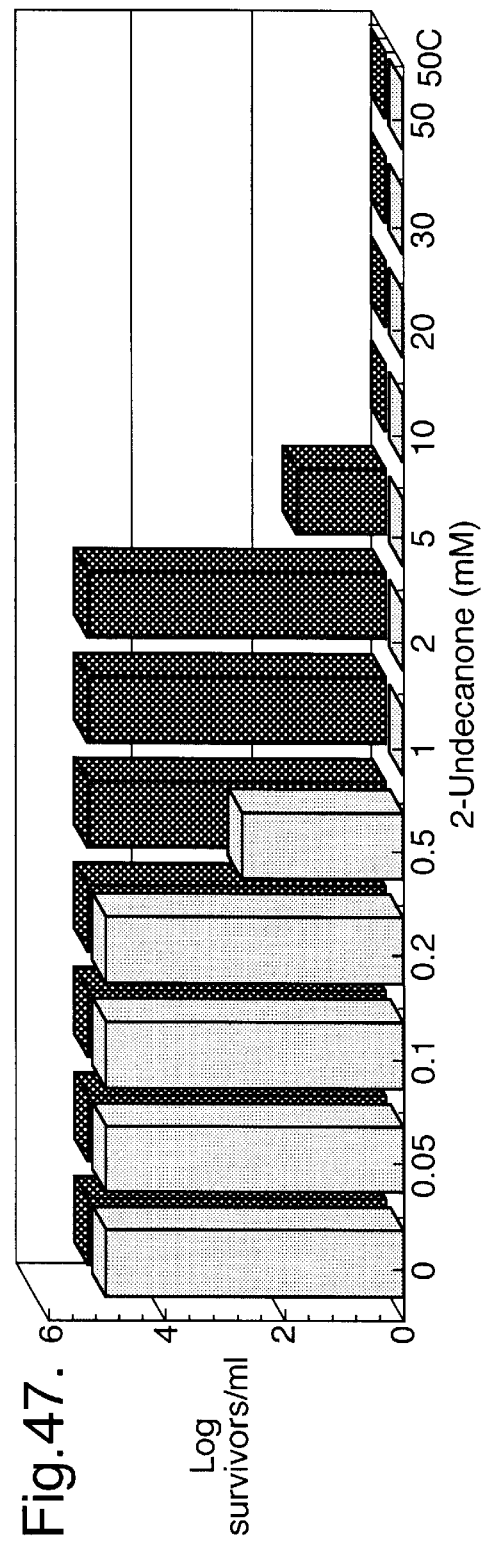

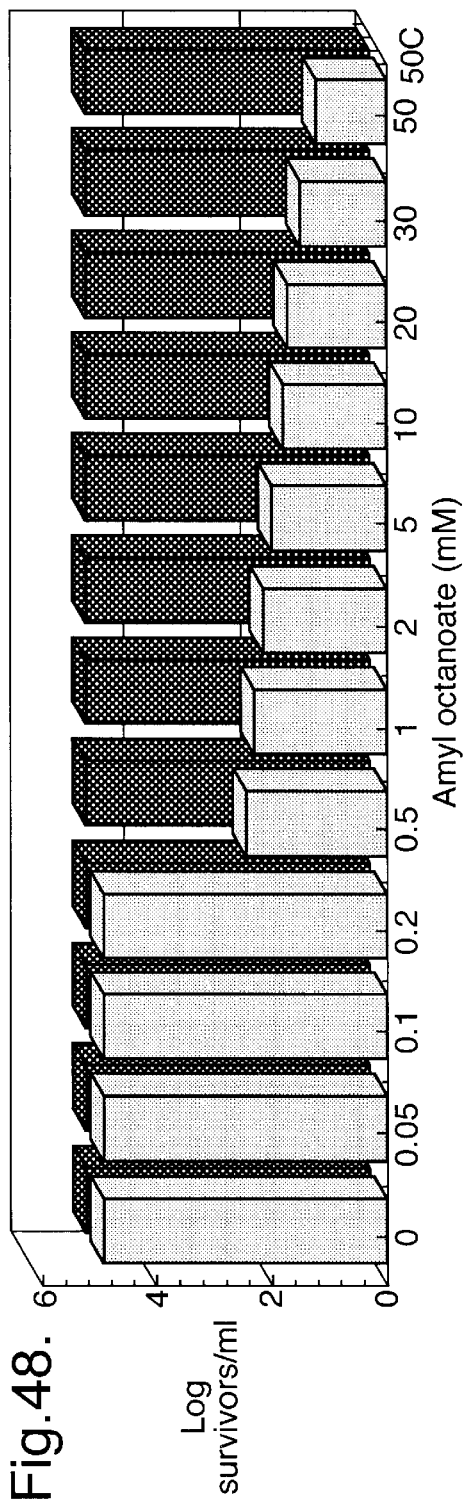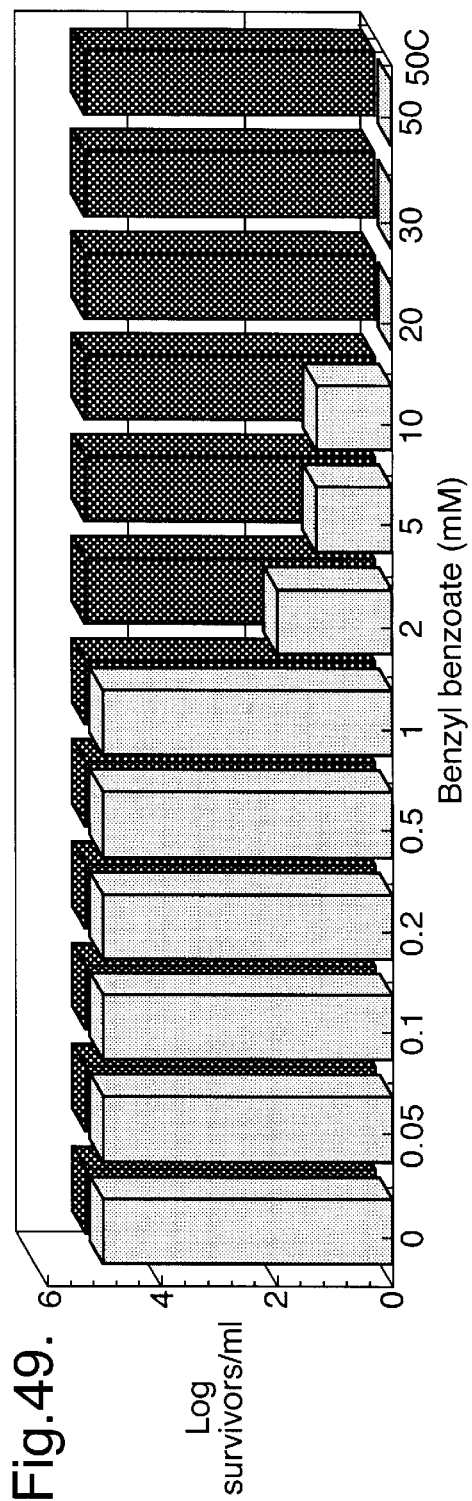

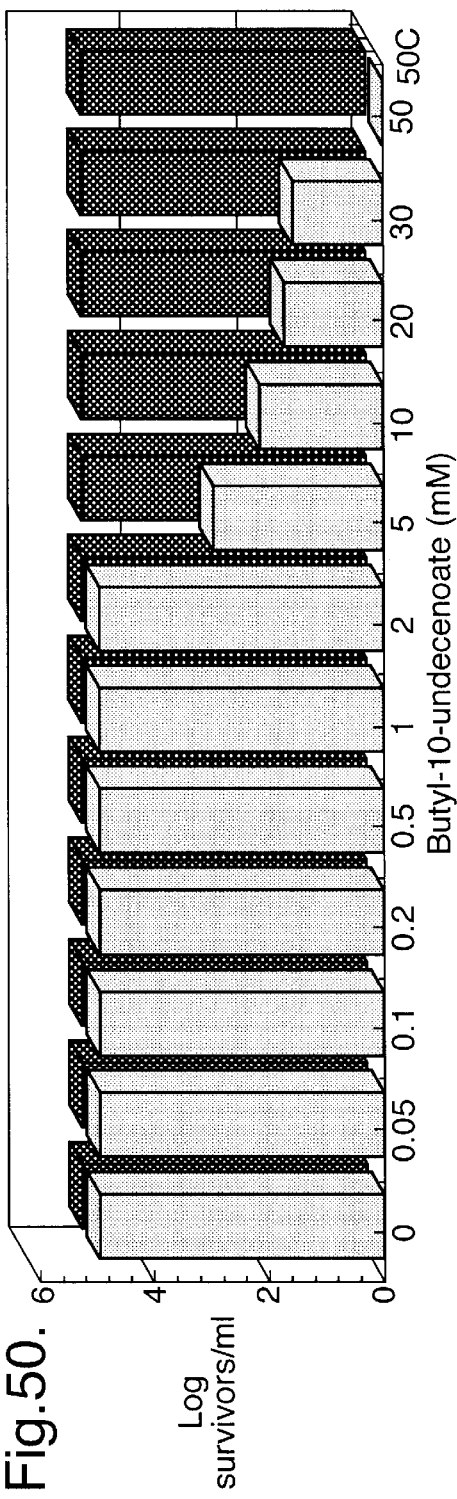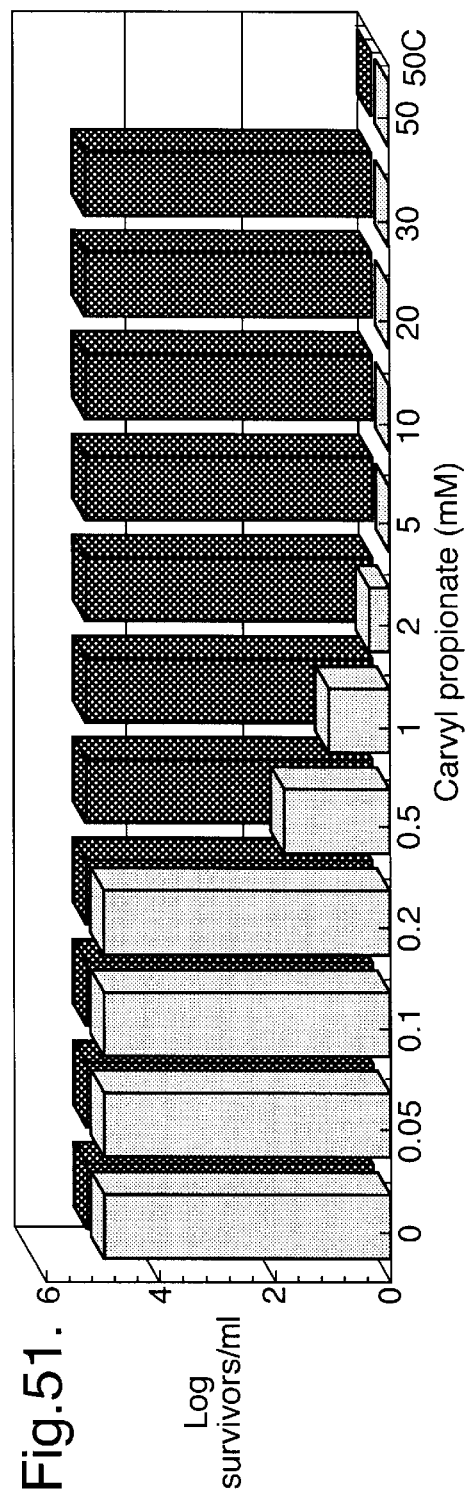

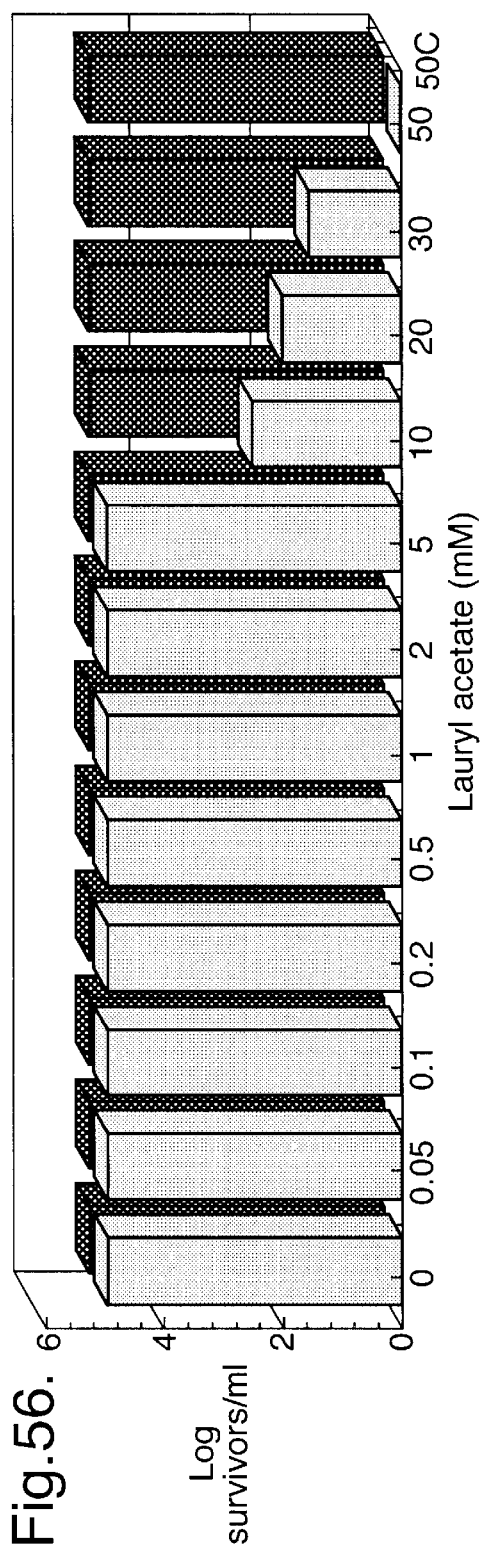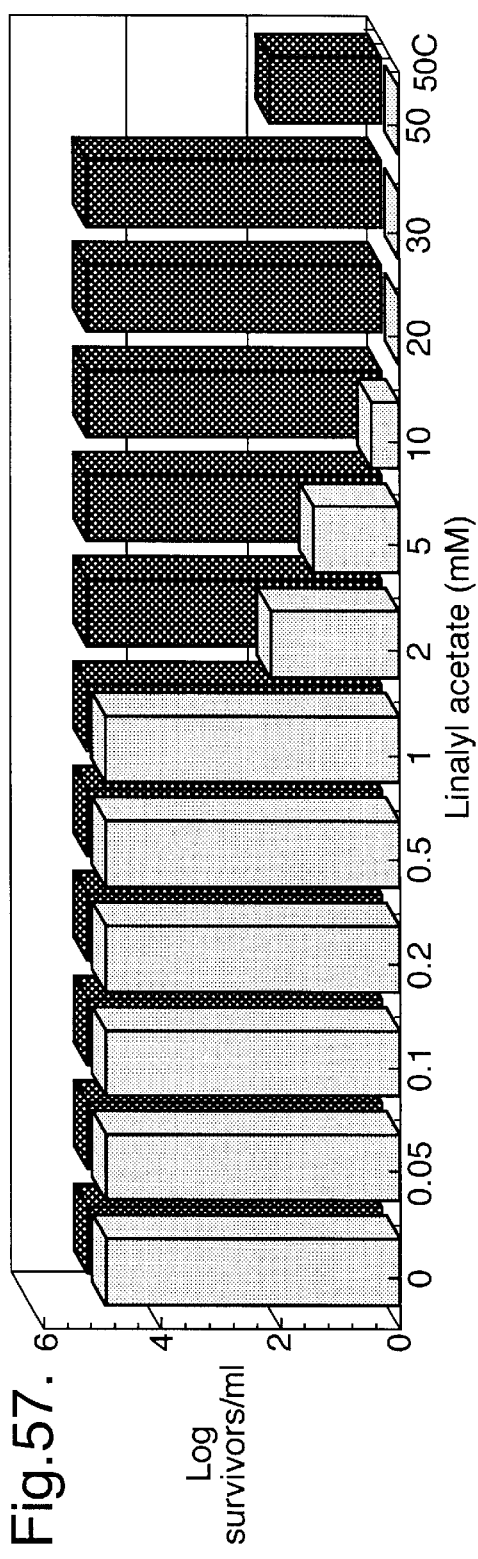

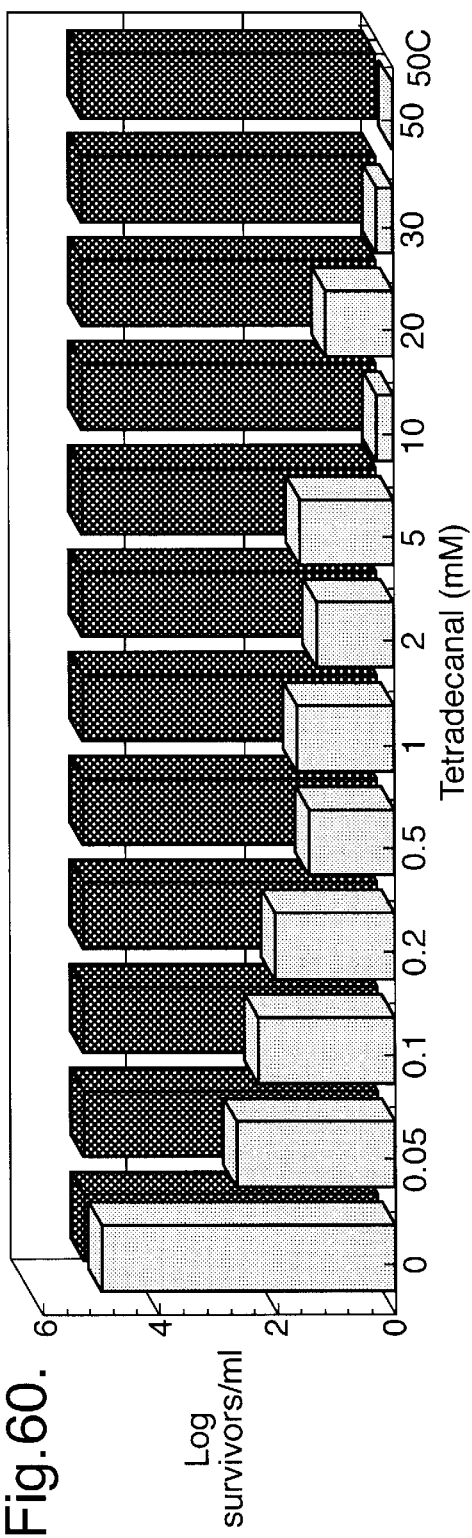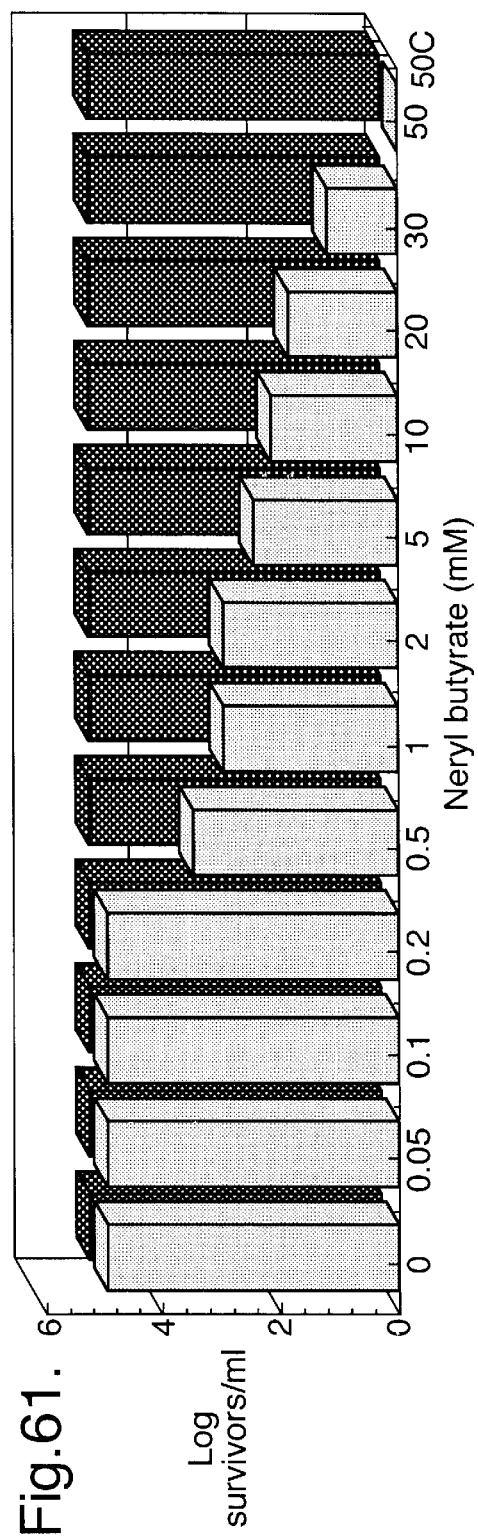

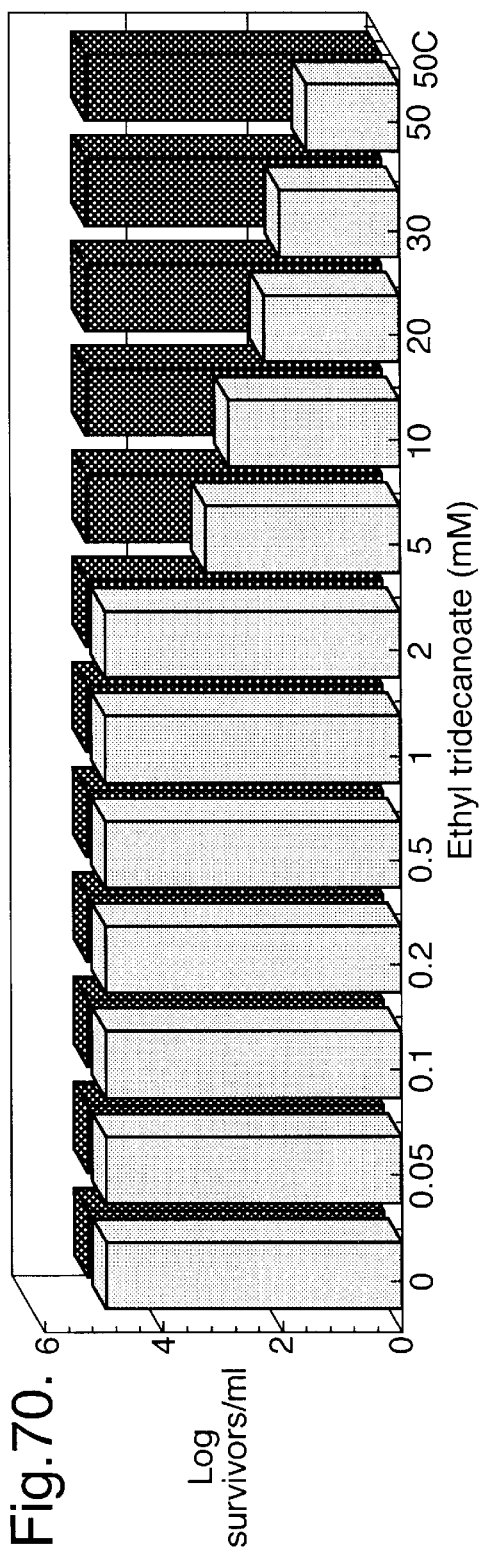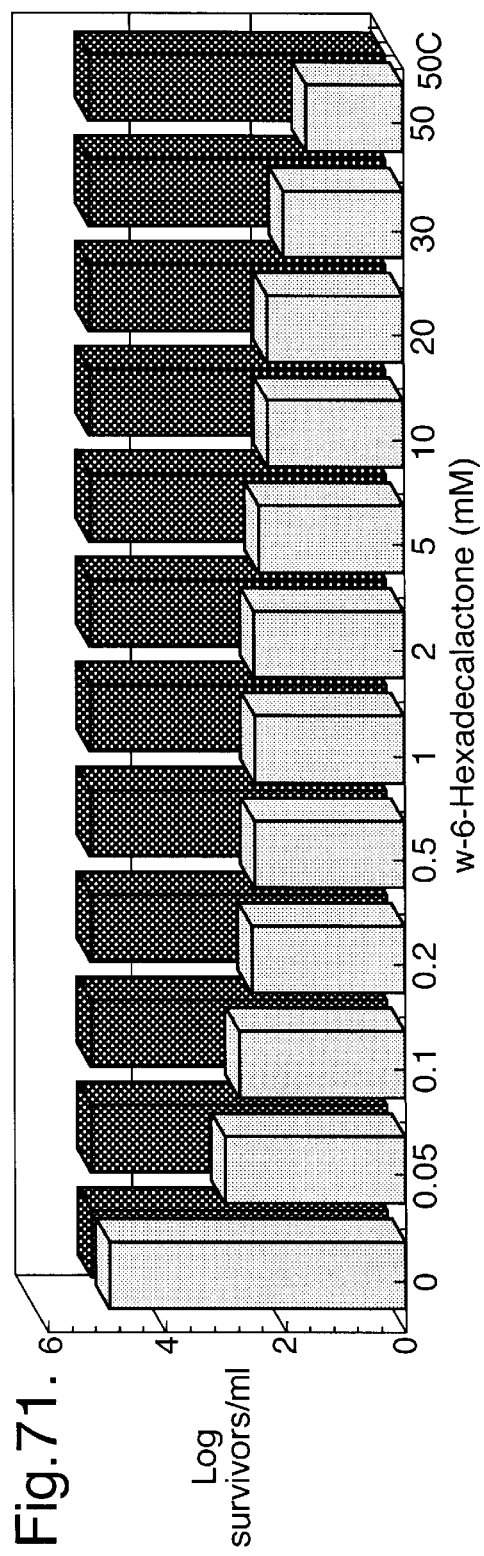

AMBIENT STABLE BEVERAGE

FIELD OF THE INVENTION

The present invention relates to a method for preparing an ambient stable beverage, particularly a tea based beverage, that involves adding to the beverage one or more pasteurisation adjuncts that become fungicidal when activated by heat.

BACKGROUND AND PRIOR ART

In recent years there has been an ever increasing choice for consumers who wish to quench their thirst with ready made beverages. Many of those are now turning from the well known soft drinks to tea based beverages, be those carbonated or still, and the "natural" refreshment they can provide.

Tea contains a complex combination of enzymes, biochemical intermediates and structural elements normally associated with plant growth and photosynthesis. There are also many natural substances that give tea its unique taste, astringency, aroma and colour. Many of these are produced by the oxidation reactions that occur during the so-called fermentation stage of black tea manufacture. Tea production has long been driven by traditional processing methods with only a fundamental understanding of the chemistry that is involved. As a consequence manufacturers have discovered making ambient stable tea based beverages at the volumes required to compete with more traditional soft drinks is not simply a matter of flavouring a soft drink with tea.

The flavour of a tea based beverage and its stability rely on the stability of the beverage as a whole. The fungi including yeasts and moulds that can grow in tea based beverages and other soft drinks can be killed by heat treatment or at least controlled by use of preservatives. Some tea based beverages are therefore pasteurised and then bottled in glass or special heat stable PET containers. This is known as "hot filling". Unfortunately this can be an expensive operation that creates a great deal of environmentally unfriendly waste. It has therefore become more attractive for manufacturers to pack their tea based products in standard PET containers which can range from single serve units to multi-serve packs and maintain the stability of the product using tailor made flavour and preservative systems. This is known as "cold filling". It is also useful in that one can readily use a tea concentrate or powder.

Unfortunately the use of common preservatives can affect the flavour of a tea based beverage. This is particularly true for sulphite and sorbate. Adding a strong flavour such as lemon can offset the preservative taste. However consumers are keen to experience other flavours. Furthermore, some of those consumers that were drawn to tea based products as a more healthy and natural alternative to soft drinks sometimes view preservatives as the sort of synthetic additives they would rather avoid.

Many countries have regulations that prohibit the use of certain food additives, including some fungicides and preservatives, in foods and beverages. Regulations can vary widely but there is a clear trend for foods to contain fewer and lower levels of chemical fungicides and preservatives, particularly synthetic ones.

Accordingly there is a need for a method for preparing pleasantly flavoured ambient-stable beverages that have low levels of synthetic preservatives.

In response to that need the present inventors have now developed a fungicidal system for tea based beverages that does not contain any synthetic fungicides or preservatives. The fungicidal system can also be used to stabilise non-tea based beverages including fruit and soft drinks.

STATEMENT OF THE INVENTION

The invention can in broad terms be said to relate to a method for preparing an ambient-stable beverage suitable for cold filing comprising the steps of: adding to a beverage at least one pasteurization adjunct that has no appreciable fungicidal activity at a temperature between 0 and 40 degrees C but exhibits fungicidal activity when heated to a temperature between 40 and 65 degrees C, and raising the temperature of the beverage to a temperature between 40 and 65 degrees C in order to activate the fungicidal activity of the pasteurisation adjunct. When the beverage is tea based it preferably contains 0.01 to 3% tea solids, especially about 0.14% tea solids.

The pasteurisation adjunct is a preferably a substance that has no appreciable fungicidal activity at a temperature between 0 and 40° C., especially between 20 and 35° C., but exhibits fungicidal activity when heated to a temperature between 40 and 65° C., especially between 45 and 55° C.

Particularly preferred pasteurisation adjuncts include decyl acetate, lauric acid, lauric aldehyde, lauric alcohol, 2-dodecenal, ethyl 2-decenoate, geranyl acetone, geranyl acetate which are preferably present in a concentration no greater than 1 mM, preferably no greater than 0.1 mM.

Unlike pasteurisation-based methods for stabilising beverages, the present method is not time or temperature dependent.

"Beverage" for the purposes of the present invention means any drink, other than water, and includes soft drinks, fruit drinks, coffee based drinks and tea based drinks.

"Tea" for the purposes of the present invention means leaf material from *Camellia sinensis* var. sinensis or *Camellia sinensis* var. assamica. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

BRIEF DESCRIPTION OF THE DRAWINGS

FIG. 9 shows the effect of pasteurisation adjuncts applied at 0–100 ppm in synthetic soft drink, zero tea content.

FIGS. 12 to 47 show the high effect pasteurisation adjuncts listed in Table 1 tested in YEPD broth pH 3.4.

FIGS. 48 to 63 show the moderate effect pasteurisation adjuncts listed in Table 1 tested in YEPD broth pH 3.4.

FIGS. 64 to 77 show the low effect pasteurisation adjuncts listed in Table 1 tested in YEPD broth pH 3.4.

DETAILED DESCRIPTION OF THE INVENTION

Figure 1:
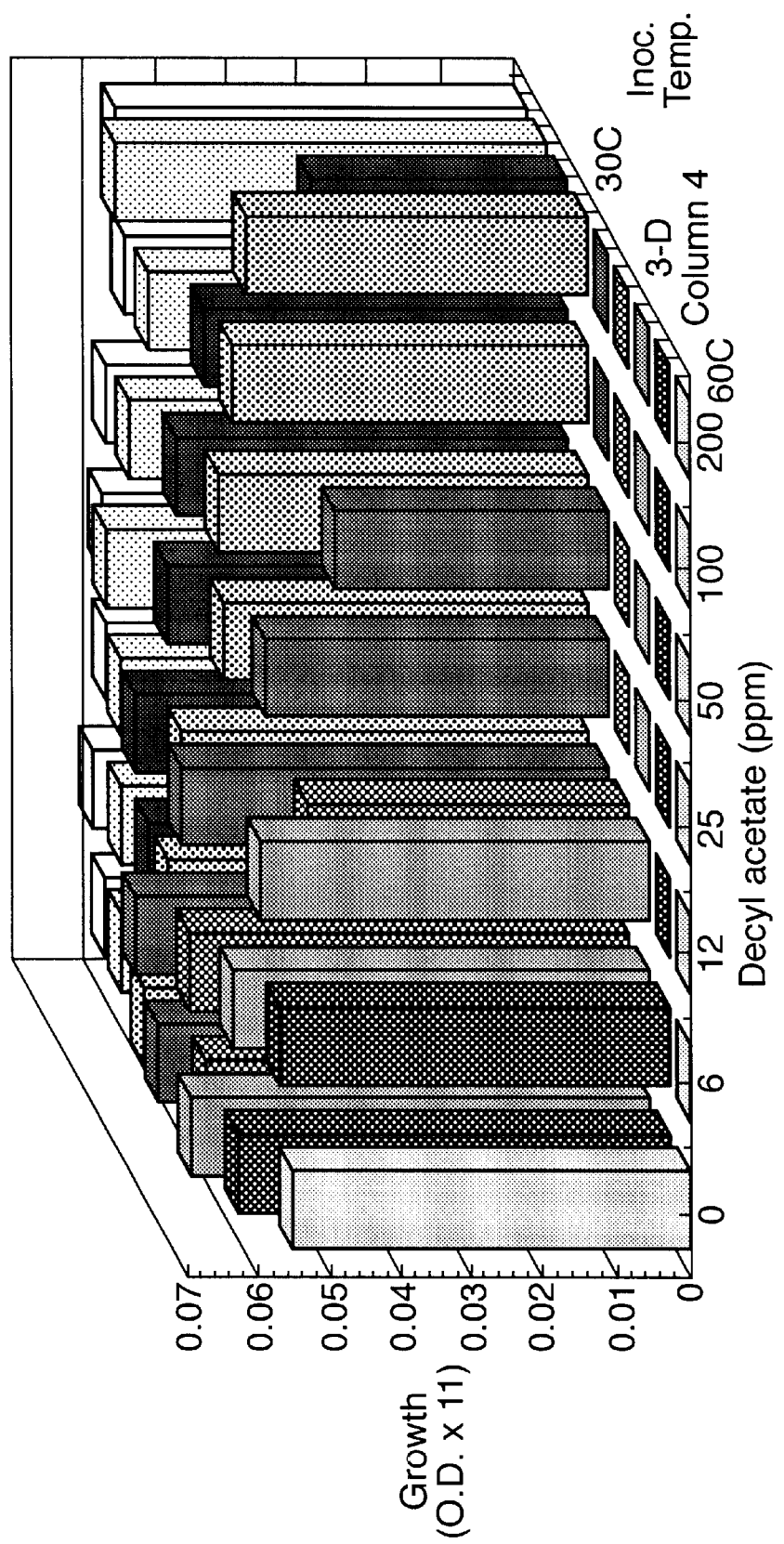
FIG. 1 shows pasteurisation adjunct, decyl acetate, applied at 0–200 ppm in Ready to Drink tea, 0.14% tea.

The present invention relates to a method for preparing an ambient stable beverage. The method involves adding to a beverage at least one pasteurisation adjunct that has no appreciable fungicidal activity at a temperature between 0 and 40 degrees C but exhibits fungicidal activity when heated to a temperature between 40 and 65 degrees C, and raising the temperature of the beverage to a temperature between 40 and 65 degrees C in order to activate the fungicidal activity of the pasteurisation adjunct.

Pasteurisation describes the process of inactivating enzymes and reducing the population of micro-organisms that occurs when a beverage is heated to a minimum temperature between 62.5 and 100° C. for a given period. One obtains a better pasteurisation by using higher temperatures and longer treatment times. In contrast to this the present invention arises from the finding that certain chemical substances that are not generally regarded as having any appreciable fungicidal activity at or near room temperature do in fact exhibit fungicidal activity when they are heated to about 50° C. This means that beverages containing such compounds can be heated to a temperature somewhat below 65° C. and yet the micro-organism population can be reduced to levels that one would expect to achieve by pasteurisation. Hence the chemical compounds can be described as pasteurization adjuncts. But unlike pasteurisation-based methods for stabilising beverages, the performance of the present method is not time or temperature dependent.

The present inventors initially found that the compounds such as decyl acetate, lauric acid, and methyl decenoate have no fungicidal activity at 30° C. and yet they exhibit significant fungicidal activity when heated to 50° C.

This led them to test other compounds that have no fungicidal activity at 30° C. They found that the compounds listed in Table 1 below do indeed exhibit significant fungicidal activity when heated to 50° C. In the table the minimum inhibitory concentration (MIC) is given for each compound as well as the molecular weight (M.W.), the $logP_{oct}$ and a rating of its importance. A compound is regarded as being of high importance if a low concentration is required to exhibit a substantial fungicidal activity. The $logP_{oct}$, that is the logarithm of the partition coefficient of the relevant compound in octanol and thus a measure of its fungicidal activity, was determined using CHEMDRAW™ software from the CHEMOFFICE ULRA ENHANCED 2000™ software package (version 5.5) that is commercially available from CambridgeSoft.

TABLE 1

Compounds that exhibit fungicidal activity at 50° C. but not at 30° C.

| COMPOUND | MIC50 (mM) | M.W. | logPoct | Importance |
|---|---|---|---|---|
| Allyl cyclohexanepropionate | 1 | 196 | 3.49 | High |
| Amyl hexanoate | 2 | 186 | 3.88 | High |
| Amyl octanoate | 60 | 214 | 4.79 | Mod |
| Benzoin | 10 | 212 | 2.53 | 10 |
| Benzyl benzoate | 20 | 212 | 3.00 | Mod |
| Benzyl salicylate | 50 | 228 | 2.61 | Low |
| Bornyl acetate | 2 | 196 | 2.66 | Low |
| Butyl heptanoate | 5 | 186 | 3.88 | High |
| Butyl laurate | 100 | 256 | 6.16 | Low |
| Butyl 10-undecenoate | 40 | 240 | 5.46 | Mod |
| Carvyl propionate | 5 | 208.3 | 2.81 | Mod |
| β-Caryophylene | 70 | 204 | — | Low |
| Decyl acetate | 1 | 200 | 4.34 | High |
| Decyl butyrate | 70 | 228 | 5.25 | Low |
| Decyl propionate | 50 | 214.35 | 4.79 | High |
| 2-Dodecenal | <0.05 (9 ppm) | 182 | 4.44 | High |
| Ethyl decanoate | 40 | 200 | 4.34 | High |
| Ethyl 2-decenoate | 1 | 198 | 4.16 | High |
| Ethyl laurate | 80 | 228 | 5.25 | Mod |
| Ethyl nonanoate | 10 | 186 | 3.88 | High |
| Ethyl tridecanoate | 100 | 242 | 5.71 | Low |
| Ethyl undecanoate | 50 | 214 | 4.79 | Mod |
| Ethyl 10-undecenoate | 50 | 212 | 4.55 | High |
| Geranyl acetate | 1 | 196 | — | High |
| Geranylacetone | 0.5 | 194 | — | High |
| Geranyl butyrate | 40 | 224 | — | High |
| Geranyl propionate | 12 | 210 | — | High |
| Heptyl butyrate | 2 | 186 | 3.88 | High |
| w-6-Hexadecalactone | 50 | 252 | — | Low |
| Hexadecanol | 100 | 242 | 6.48 | Low |
| Hexyl hexanoate | 30 | 201 | 4.34 | High |
| Hexyl octanoate | 10 | 228 | 5.25 | Mod |
| Isoamyl hexanoate | 5 | 186 | 3.63 | High |
| Isoamyl laurate | 120 | 270 | 6.37 | Low |
| Isoamyl salicylate | 15 | 208 | 2.71 | Mod |
| Lauric acid | 0.1 (20 ppm) | 200 | 4.49 | High |
| Lauric alcohol | 0.1 (18.6 ppm) | 186 | 4.66 | High |
| Lauric aldehyde | 0.2 (36 ppm) | 184 | 4.61 | High |
| Lauryl acetate | 40 | 228 | 5.25 | Mod |
| Linalyl acetate | 10 | 196 | 2.78 | Mod |
| Linalyl propionate | 20 | 210 | 3.43 | Mod |
| Methyl decanoate | 2 | 186 | 4.05 | High |
| Methyl laurate | 40 | 214 | 4.96 | High |
| Methyl myristate | 60 | 242 | 5.88 | Low |
| Methyl nonanoate | 2 | 172 | 3.6 | High |
| Methyl undecanoate | 50 | 200 | 4.51 | High |
| Methyl-9-undecenoate | 40 | 198 | 3.79 | High |
| Myristaldehyde | 40 | 212 | 5.53 | Mod |
| Myristic acid | 50 | 228 | 5.41 | High |
| Nerolidol | 1.5 | 222 | 4.08 | High |
| Neryl butyrate | 50 | 224 | 2.88 | Mod |
| Neryl isobutyrate | 30 | 224 | 3.94 | High |
| Nonyl acetate | 5 | 186 | 3.88 | High |
| Octyl butyrate | 40 | 200 | 4.34 | High |
| w-Pentadecalactone | 60 | 240 | — | Low |
| Pantadecanoic acid | 80 | 242 | 5.86 | Low |
| Pentadecanol | 75 | 228 | 6.03 | Low |
| Phenethyl hexanoate | 10 | 220 | 3.99 | High |
| Phenethyl octanoate | 40 | 248 | 4.90 | Mod |
| 2-Phenoxylethyl isobutyrate | 0.1 | 226 | 5.04 | High |
| Tetradecanol | 50 | 214 | 5.57 | Mod |
| Tridecanal | 5 | 200 | 5.07 | High |
| Tridecanoic acid | 0.2 | 214 | 4.95 | High |
| Tridecanol | 0.05 | 198 | 5.11 | High |
| 2-Tridecenal | <0.05 (9.8 ppm) | 196 | 4.90 | High |
| 2-Undecanone | 1 | 170 | 3.68 | High |

Many so-called pasteurisation adjuncts will provide effective fungicidal activity when heated to 50° C. or some other temperature below 65° C. However certain compounds may prove to be more appropriate than others in terms of their effect on the taste of the tea based beverage. Accordingly the present inventors have identified the following compounds as being preferred pasteurisation adjuncts for use in the method of the invention: allyl cyclohexanepropionate, amyl hexanoate, butyl heptanoate, decyl acetate, decyl propionate, 2-dodecenal, ethyl decanoate ethyl 2-decenoate, ethyl nonanoate, ethyl 10-undecenoate, geranyl acetate, geranylacetone, geranyl butyrate, geranyl propionate, heptyl butyrate, hexyl hexanoate, isoamyl hexanoate, lauric acid, lauric alcohol, lauric aldehyde, methyl decanoate, methyl laurate, methyl nonanoate, methyl undecanoate, methyl-9-undecenoate, myristic acid, nerolidol, neryl isobutyrate, nonyl acetate, octyl butyrate, phenethyl hexanoate, 2-phenoxylethyl isobutyrate, tridecanal, tridecanoic acid, tridecanol, 2-tridecenal and 2-undecanone. The pasteurisation adjuncts are preferably present in a concentration no greater than 1 mM, and especially no greater than 0.1 mM.

From that list decyl acetate, lauric acid, lauric aldehyde, lauric alcohol, 2-dodecenal, ethyl 2-decenoate, geranyl acetone, geranyl acetate are particularly preferred.

While not wanting to be bound by theory, the mode of fungicidal action of these pasteurisation adjuncts in at least tea based beverages is believed to involve disruption of microbial membranes. It is thought that at high temperatures these compounds are able to enter into membranes and cause microbial death by cell lysis.

The inventors postulated that the aforementioned compounds might not be the only compounds that might function as pasteurisation adjuncts in this way. One might define effective pasteurisation adjuncts on the basis of their Quantitative Structure Activity Relationship (QSAR) parameters. This definition would include known and hitherto unknown chemical compounds. The full list of the pasteurisation adjuncts tested above were plotted in respect of their molecular weight and $logP_{oct}$ values in FIG. 11. From that Figure the inventors forecast that preferred pasteurisation adjuncts can be defined as those that have a molecular weight between 170 and 230 daltons and a $logP_{oct}$ value between 3.5 and 5.5.

Water quality can seriously undermine the stability of a beverage. This is an important factor when making a beverage, particularly a tea based beverage, for cold filing. For that purpose it will often be important to minimise the yeast content of water used at all stages of production. Art known methods include chlorination/dechlorination and UV irradiation.

Ambient-stable beverages made by the method of the invention may be still or carbonated. Carbonation appears to provide a preservative effect in itself and therefore the formulation of a carbonated product need not be the same as a still one.

Tea is known to have certain antibacterial and antiviral properties in itself. One must exceed a concentration of about 3% to evidence tea beginning to suppress the growth of yeasts and moulds. At concentrations lower than this, which is typical for tea based beverages, tea acts as a nutrient that enhances the potential for microbial spoilage.

Most microbes that can typically grow in tea based beverages thrive on sugar, a source of nitrogen, oxygen, zinc, magnesium, potassium, phosphate and vitamins. It is therefore advantageous to limit the sugar content to 8 to 10 degrees brix, however one could use up to 60 degrees brix when the product is a tea mix. Oxygen content can be minimised by pre-pasteurisation or some heat treatment or nitrogen sparging. The mineral content of a tea based beverage can be minimised using EDTA, citrate, or a water softener. For example microbes can grow in tea if the concentration of magnesium ions exceeds 0.2 ppm, and they only need trace levels of zinc. One must be careful using citrate for this purpose as it can affect taste.

The invention will now be described in the following examples with reference to the accompanying drawings.

EXAMPLE 1

Ready to Drink Tea Experiments

FIG. 1 shows pasteurisation adjunct, decyl acetate, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 2:
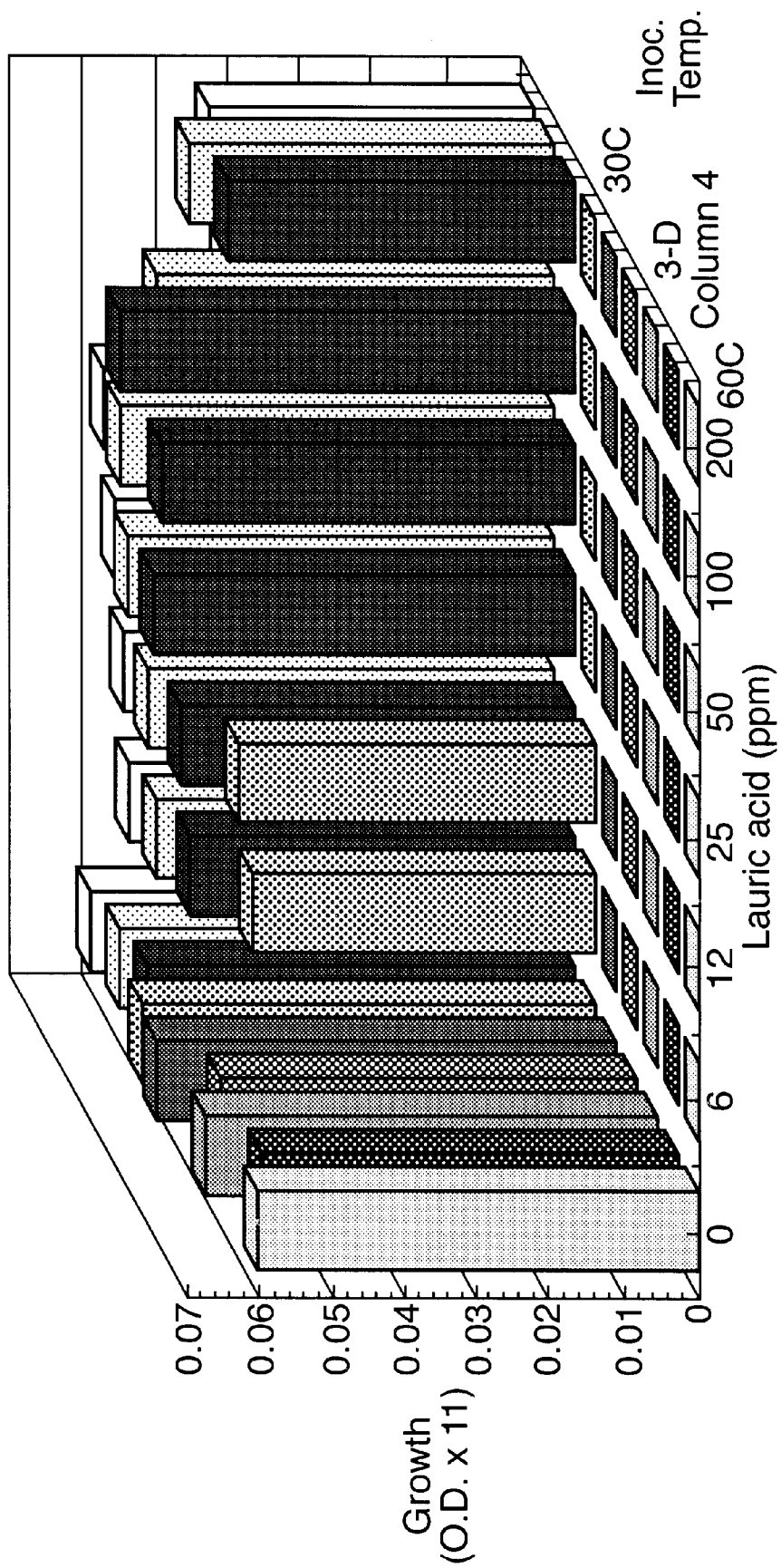
FIG. 2 shows pasteurisation adjunct, lauric acid, applied at 0–200 ppm in Ready to Drink tea, 0.14% tea.

FIG. 2 shows pasteurisation adjunct, lauric acid, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 3:
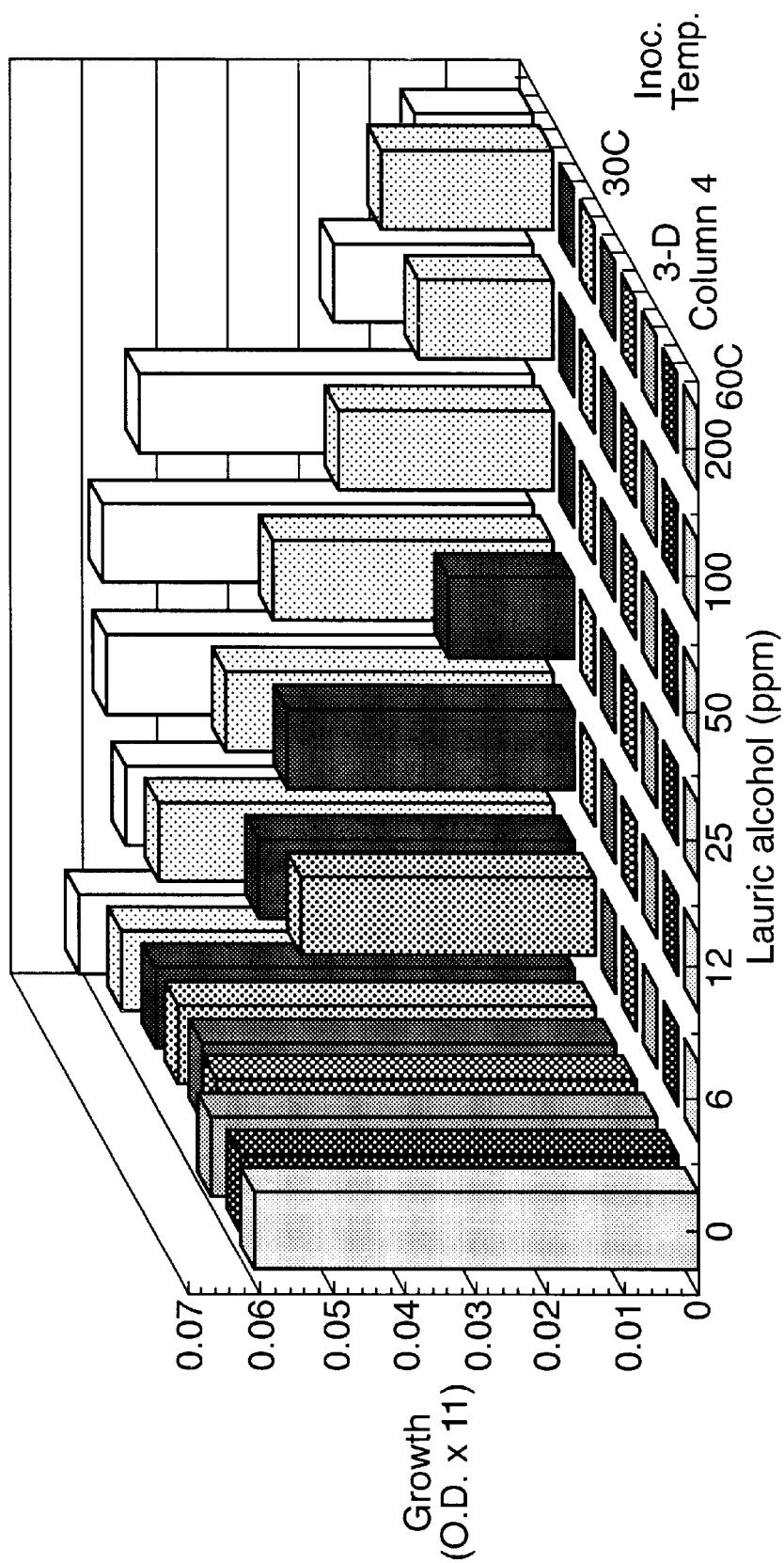
FIG. 3 shows pasteurisation adjunct, lauric alcohol, applied at 0–200 ppm in Ready to Drink tea, 0.14% tea.

FIG. 3 shows pasteurisation adjunct, lauric alcohol, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 4:
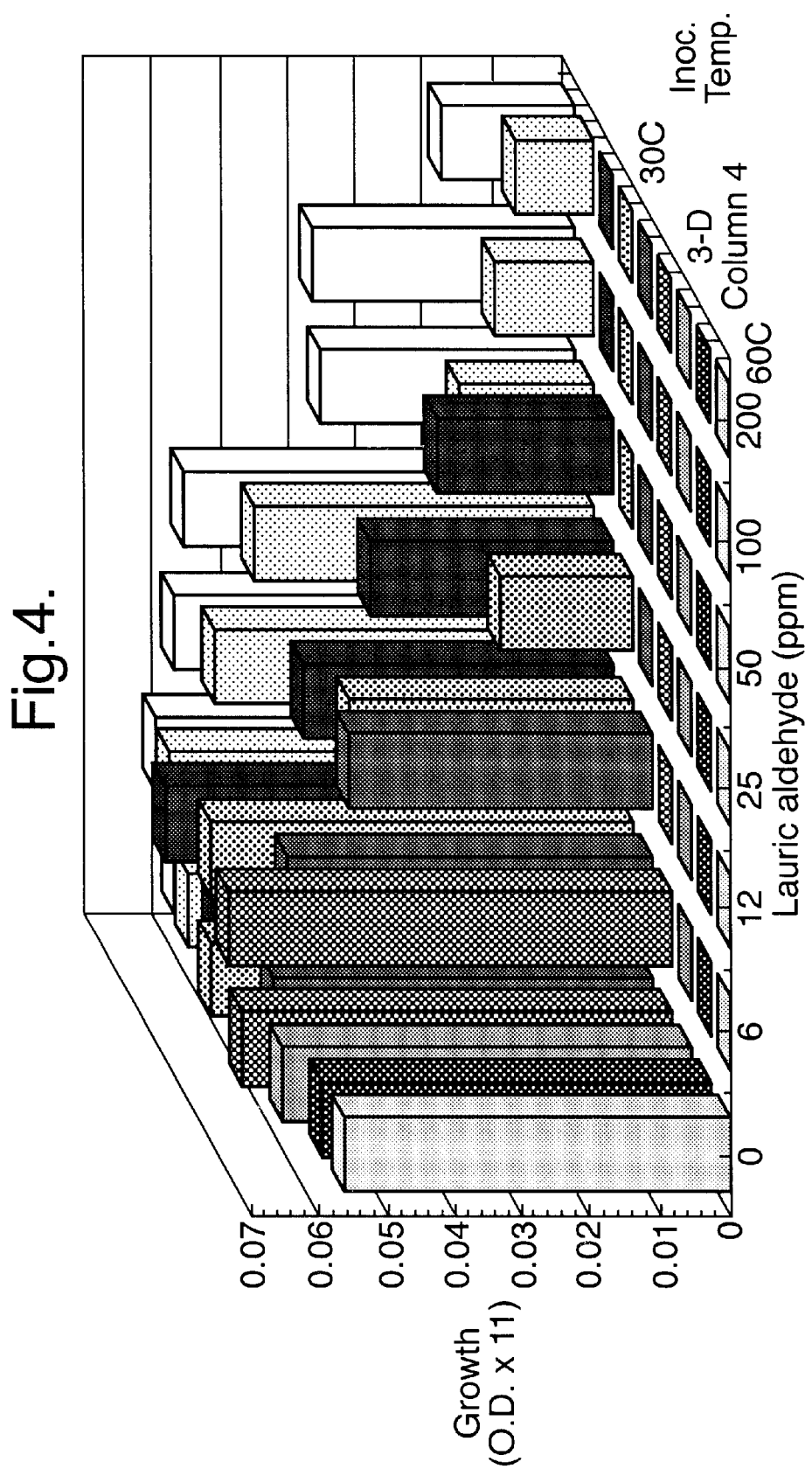
FIG. 4 shows pasteurisation adjunct, lauric aldehyde, applied at 0–200 ppm in Ready to Drink tea, 0.14% tea.

FIG. 4 shows pasteurisation adjunct, lauric aldehyde, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 5:
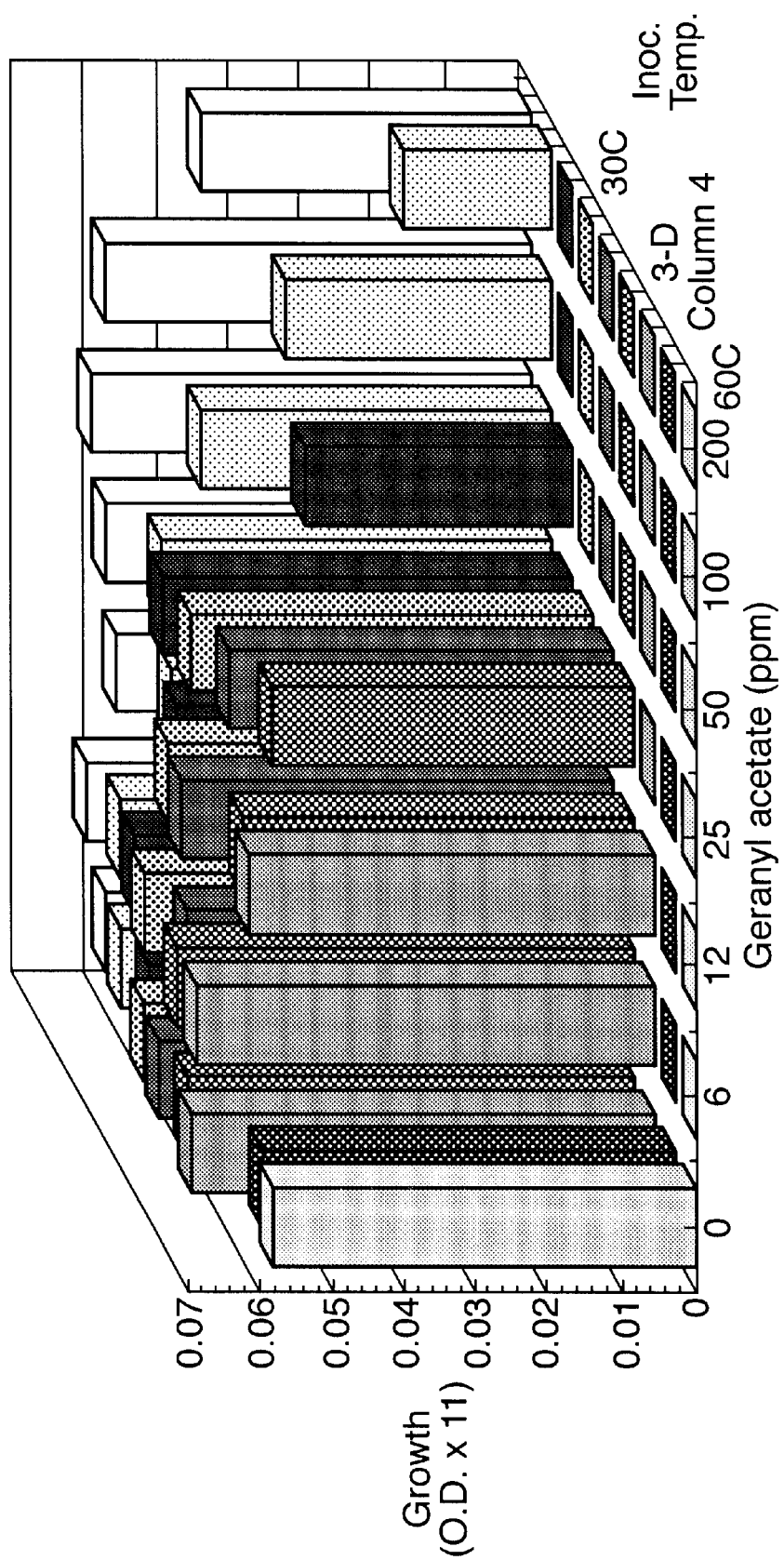
FIG. 5 shows pasteurisation adjunct, geranyl acetate, applied at 0–200 ppm in Ready to Drink tea, 0.14% tea.

FIG. 5 shows pasteurisation adjunct, geranyl acetate, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 6:
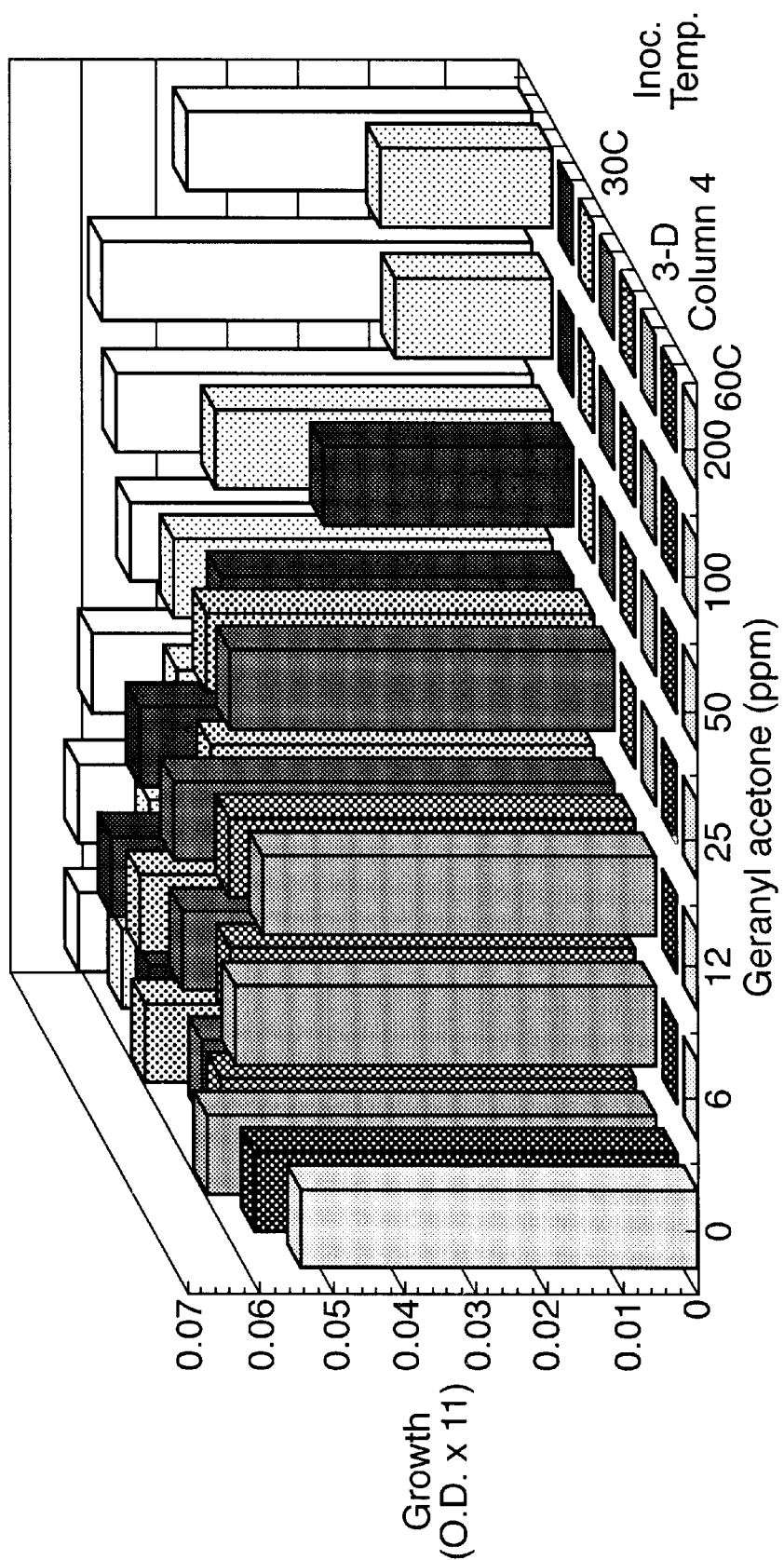
FIG. 6 shows pasteurisation adjunct, geranyl acetone, applied at 0–200 ppm in Ready to Drink tea, 0.14% tea.

FIG. 6 shows pasteurisation adjunct, geranyl acetone, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 7:
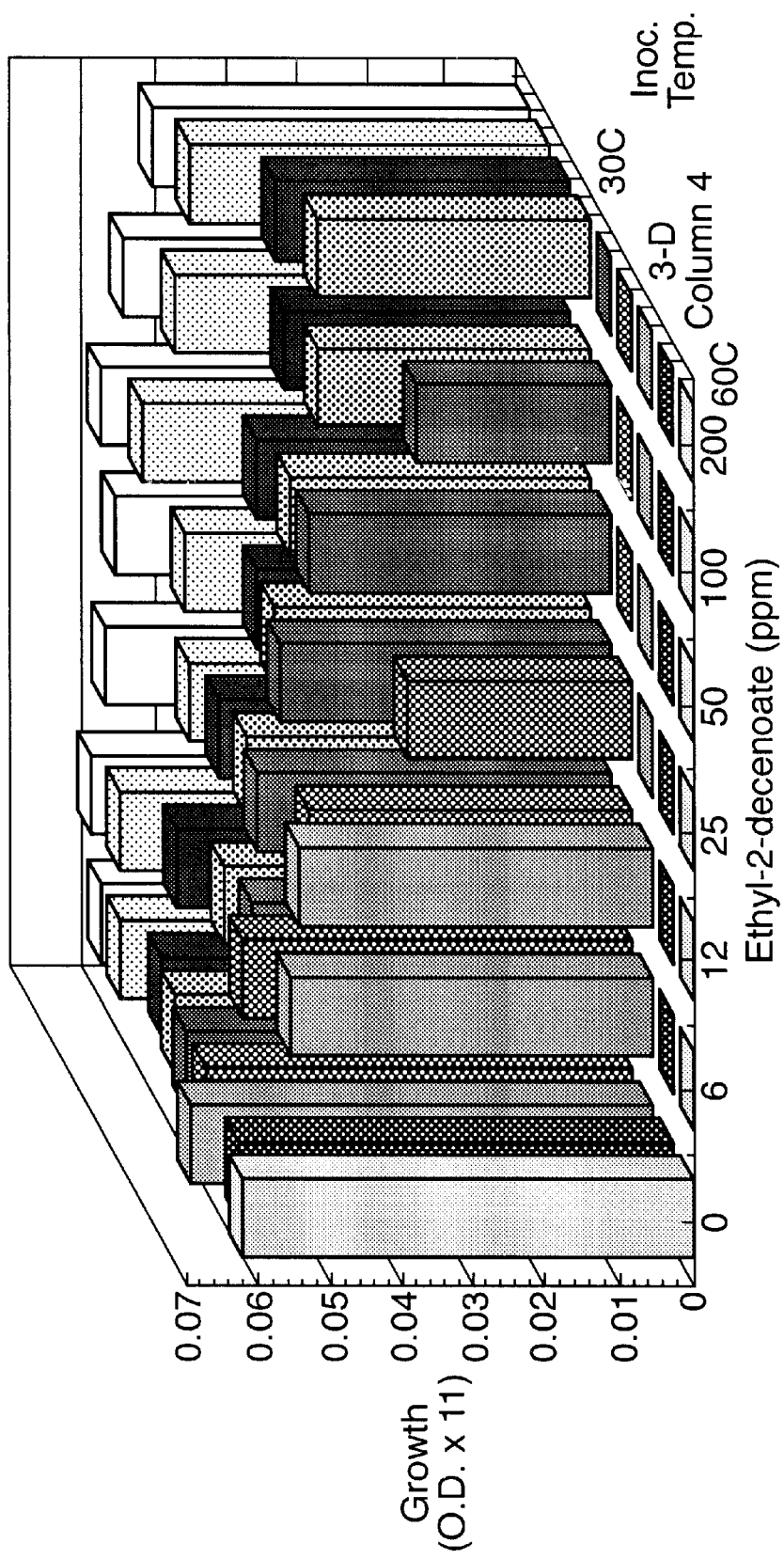
FIG. 7 shows pasteurisation adjunct, ethyl-2-decenoate, applied at 0–200 ppm in Ready to Drink tea, 0.14% tea.

FIG. 7 shows pasteurisation adjunct, ethyl-2-decenoate, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

Figure 8:
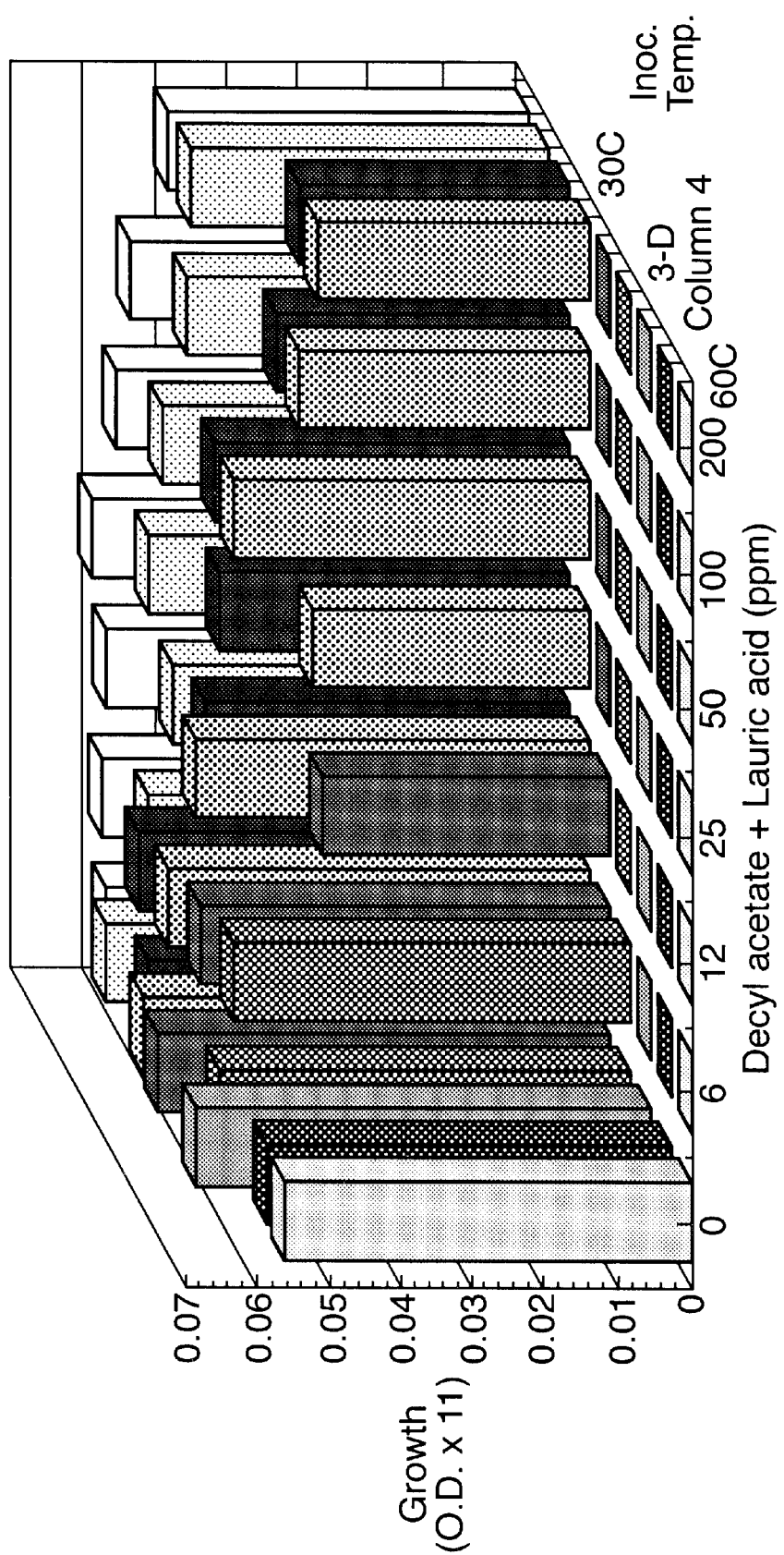
FIG. 8 shows a 9:1 mixture of pasteurisation adjuncts, decyl acetate:lauric acid, applied at 0–200 ppm in Ready to Drink tea, 0.14% tea.

FIG. 8 shows a 9:1 mixture of pasteurisation adjuncts, decyl acetate:lauric acid, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 rim in x11 diluted samples. The pasteurisation adjunct had little effect at low temperature on yeast growth as did heat up to 60° C., without pasteurisation adjunct. Heat+pasteurisation adjunct showed a remarkable combined synergistic effect.

EXAMPLE 2
Synthetic Soft Drink Experiments

FIG. 9 shows the effect of pasteurisation adjuncts applied at 0–100 ppm in synthetic soft drink, zero tea content. Synthetic soft drink contained glucose, 8% w/v, citric acid 3 g/l, potassium orthophosphate 1 g/l, magnesium chloride 0.1 g/l and yeast extract 0.1 g/l. Rows of 30 ml tubes containing 10 ml synthetic soft drink, pH 3.4, were equilibrated at the required temperature for 7 minutes in a water bath, before inoculation with 104 cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth. 50° C. temperature+pasteurisation adjuncts showed a remarkable combined synergistic effect.

EXAMPLE 3
Bacteria Experiments

Figure 10:
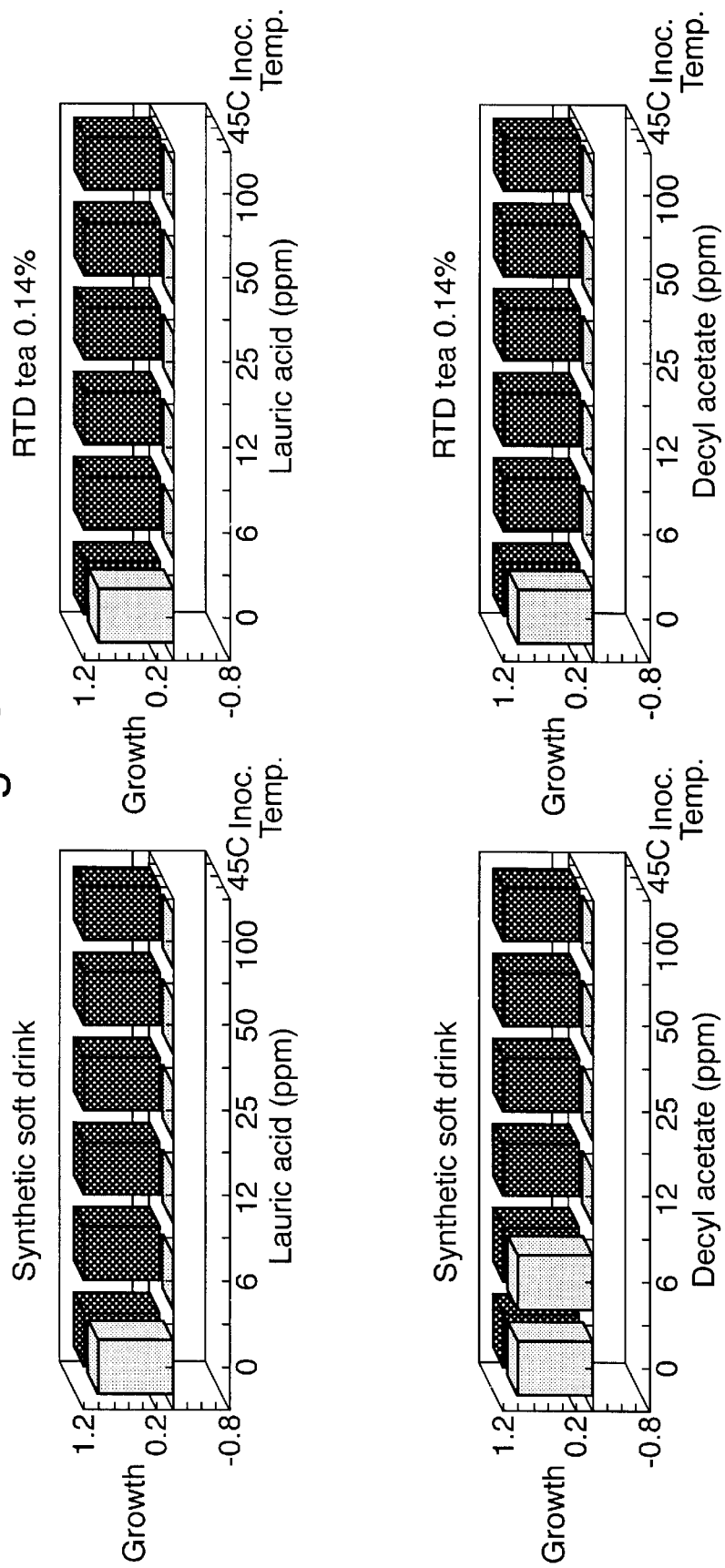
FIG. 10 shows the effect on bacteria of heat+pasteurisation adjuncts, decyl acetate or lauric acid, applied at 0–100 ppm in Ready to Drink tea, 0.14% tea or synthetic soft drink.

FIG. 10 shows the effect on bacteria of heat+pasteurisation adjuncts, decyl acetate or lauric acid, applied at 0–100 ppm in Ready to Drink tea, 0.14% tea or synthetic soft drink. Rows of 30 ml tubes containing 10 ml soft drink, pH 3.4, were equilibrated at the required temperature for 7 minutes in a water bath, before inoculation with 104 cells/ml of the bacteria, *Gluconobacter* sp. 222. Tubes were held at temperature for 2 minutes before being cooled rapidly in cold water for 5 minutes. Tubes were then incubated for 14 days at 25° C. to allow surviving bacteria to grow out. At 14 days growth was measured visually. The pasteurisation adjunct had little effect at low temperature on yeast growth as did heat up to 60° C., without pasteurisation adjunct. Heat+pasteurisation adjunct showed a remarkable combined synergistic effect.

EXAMPLE 4
Identification of Preferred Pasteurisation Adjuncts

Figure 11:
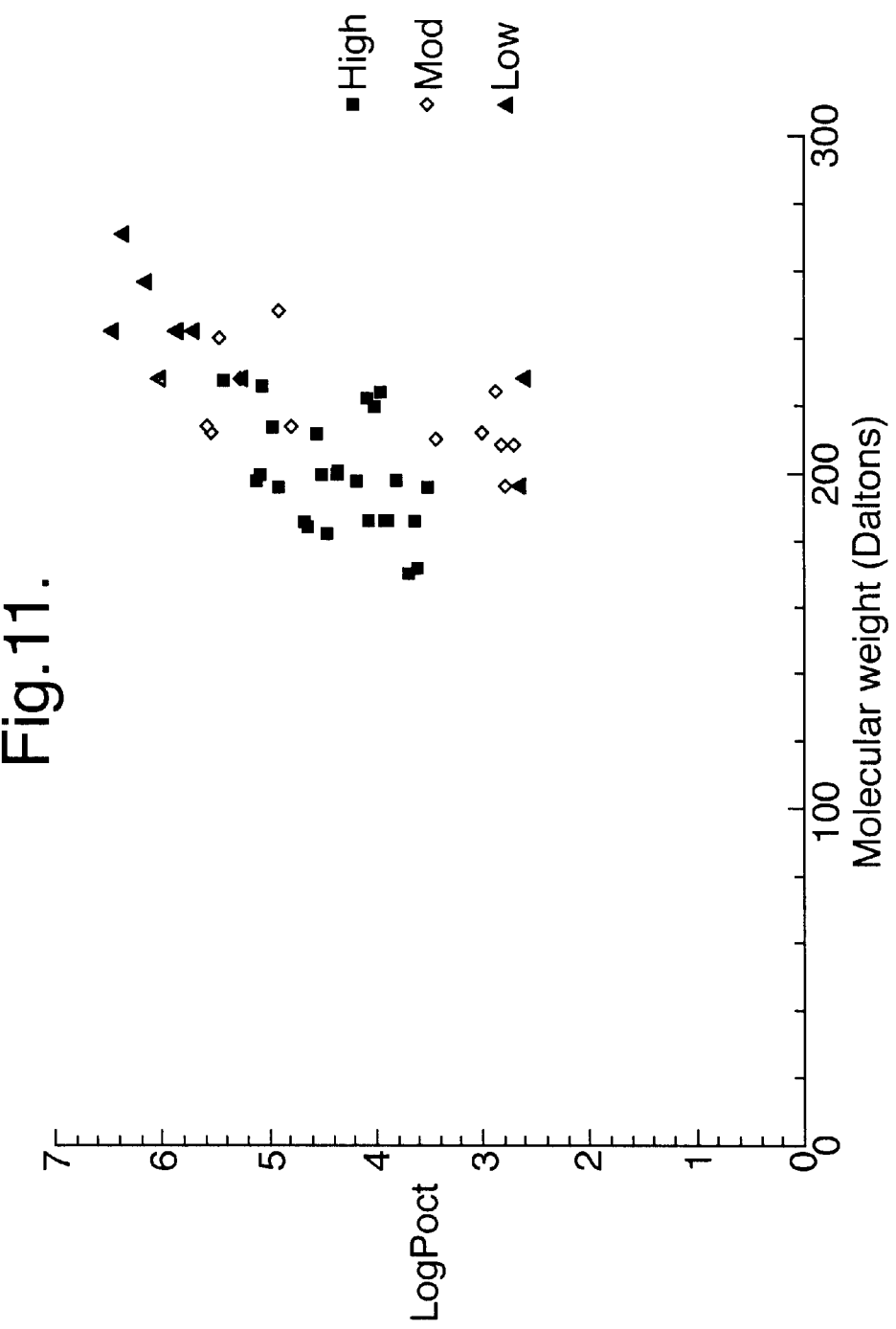
FIG. 11 is a Scatter plot of molecular weight/partition coefficient of compounds able to function as pasteurisation adjuncts.
Figure 14:
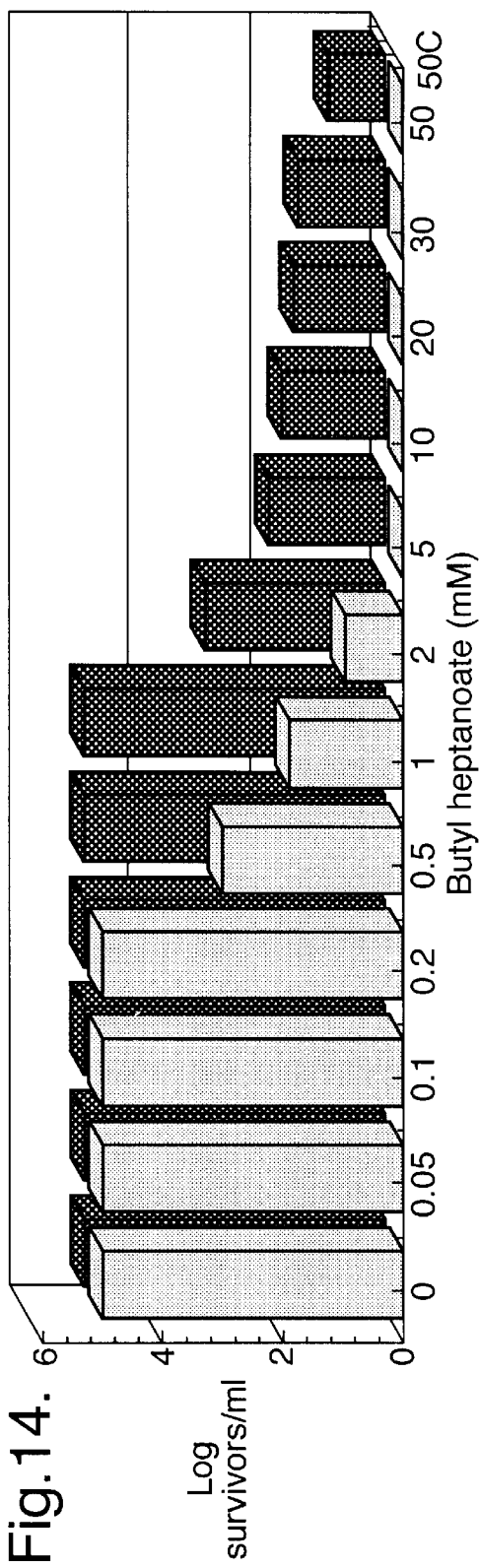
Figure 15:
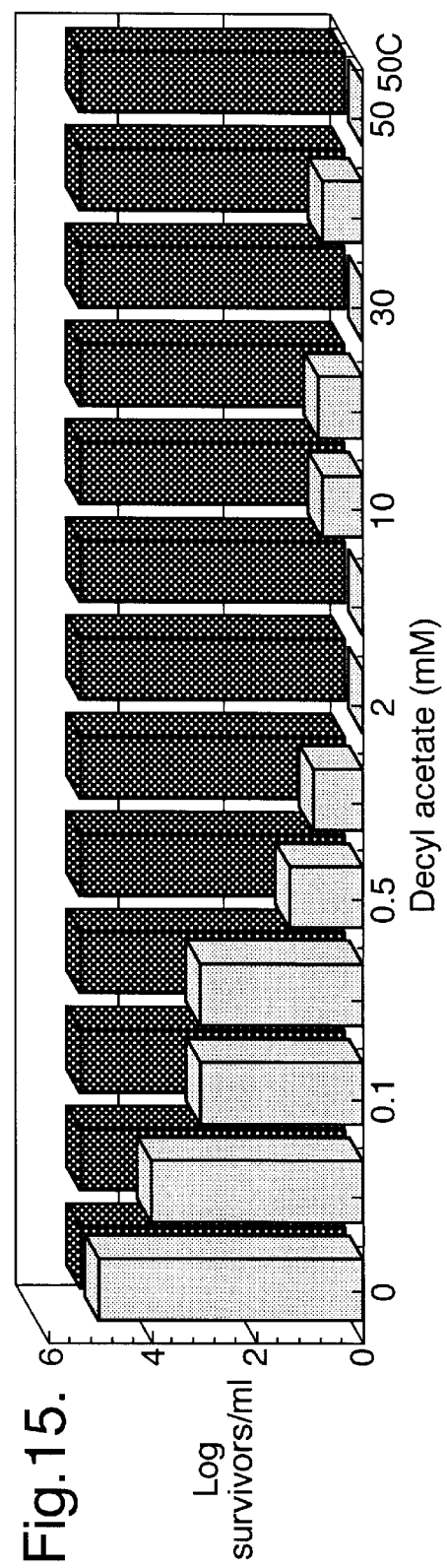
Figure 20:
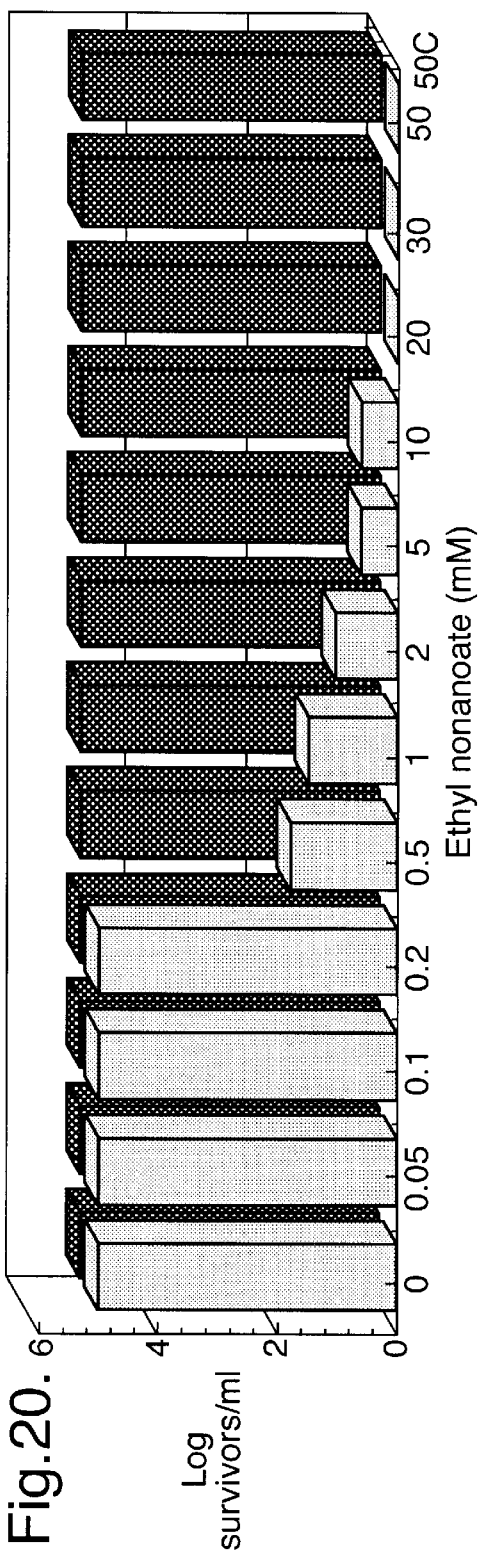
Figure 21:
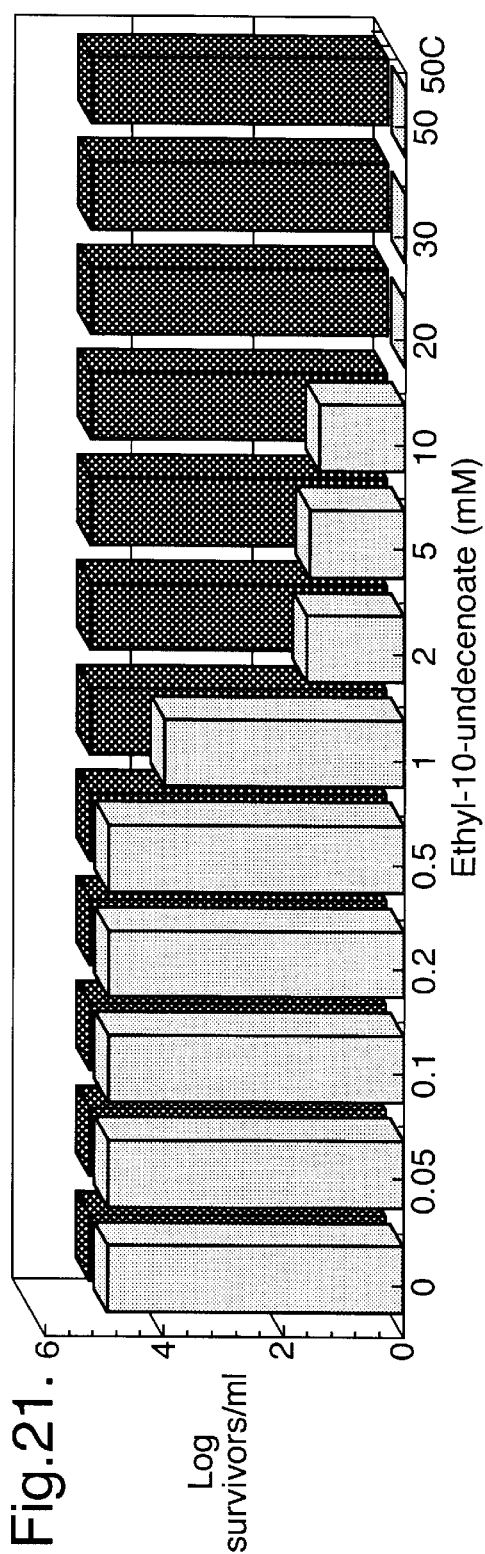
Figure 22:
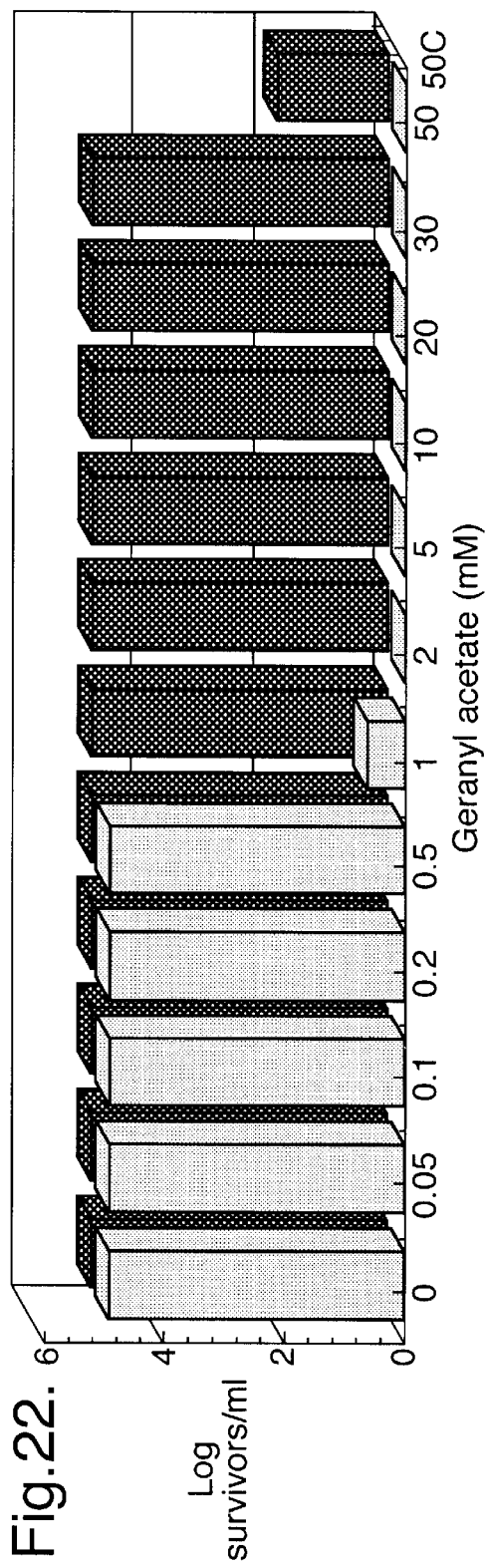
Figure 23:
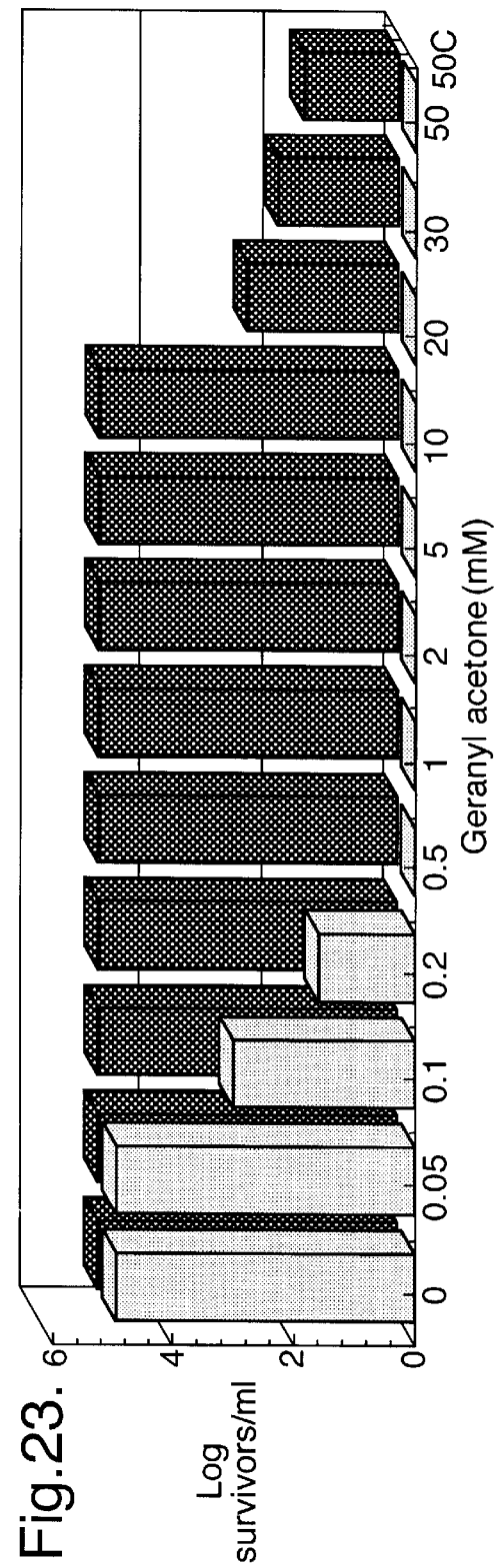
Figure 28:
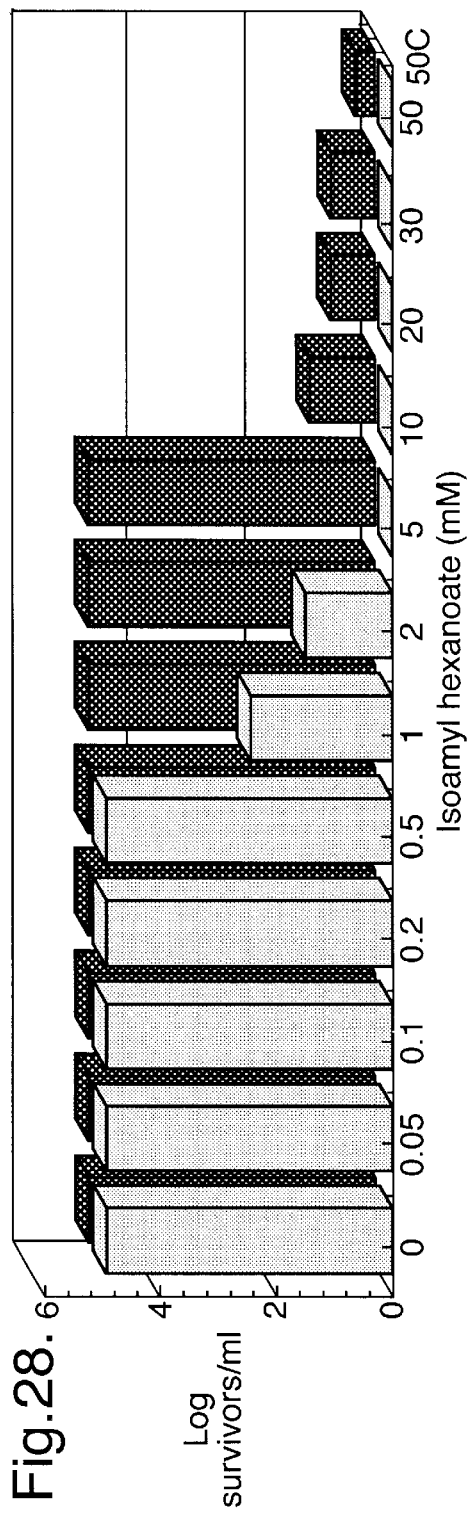
Figure 29:
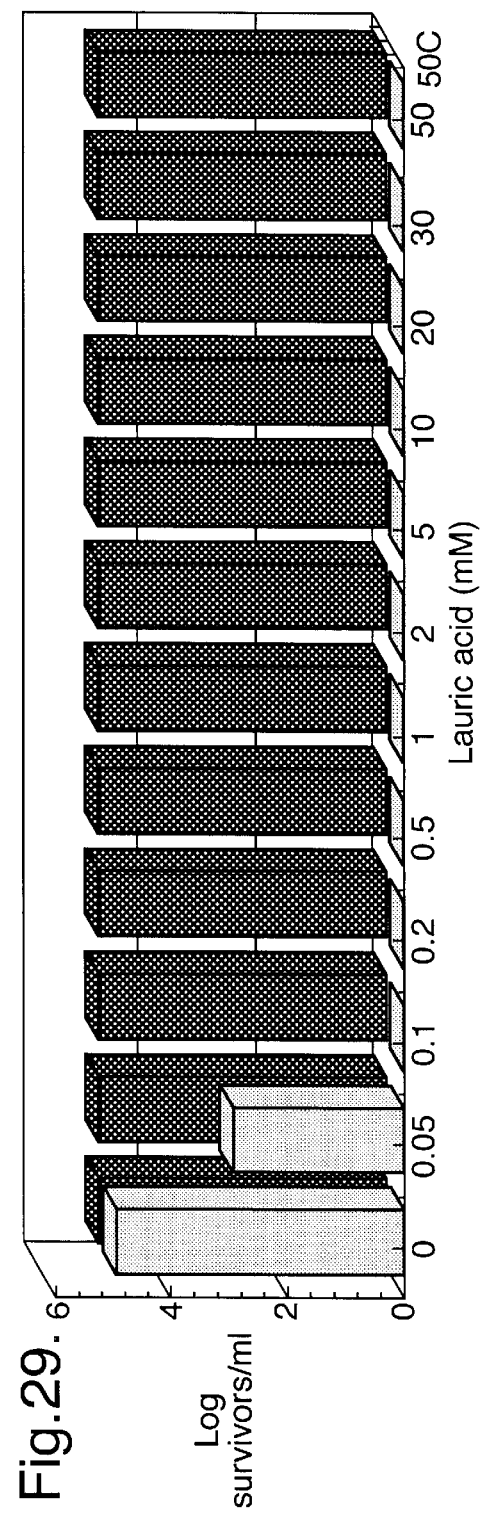
Figure 30:
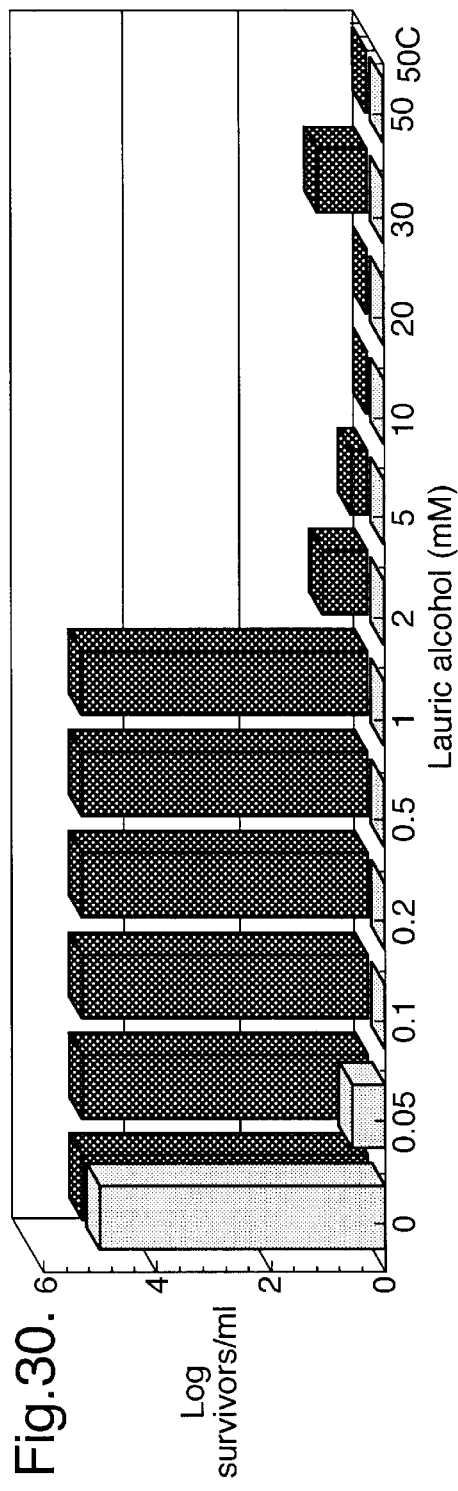
Figure 31:
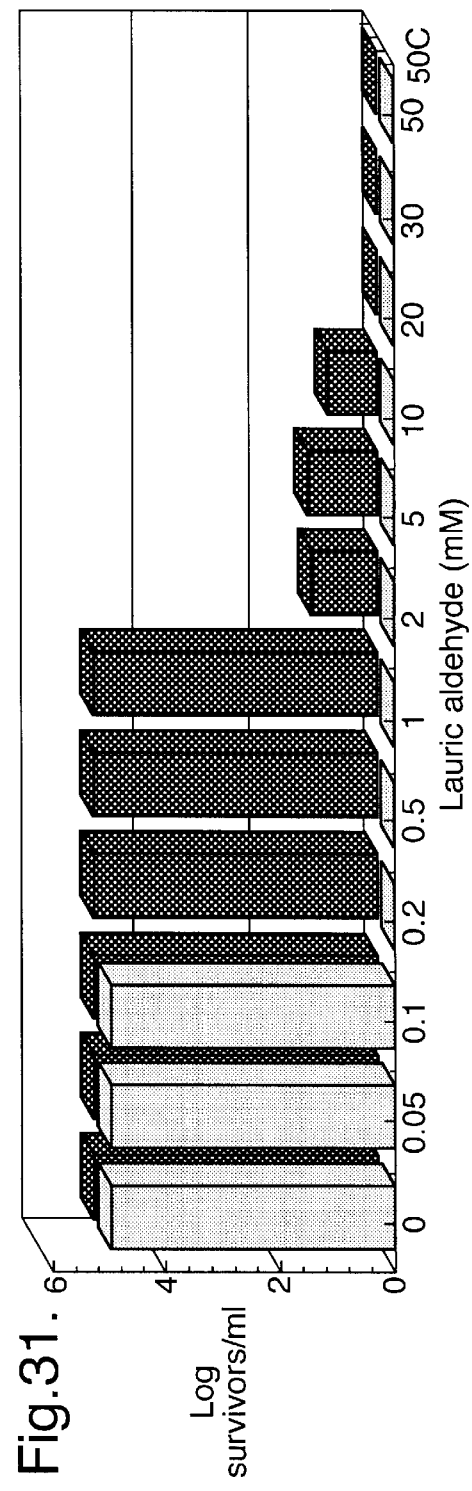
Figure 34:
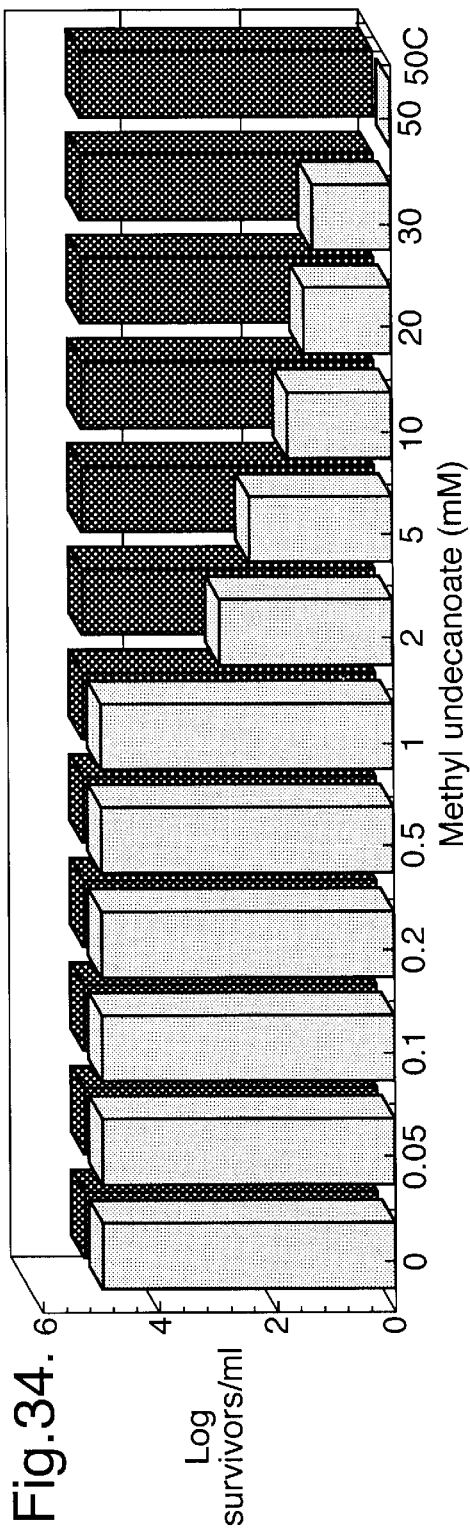
Figure 35:
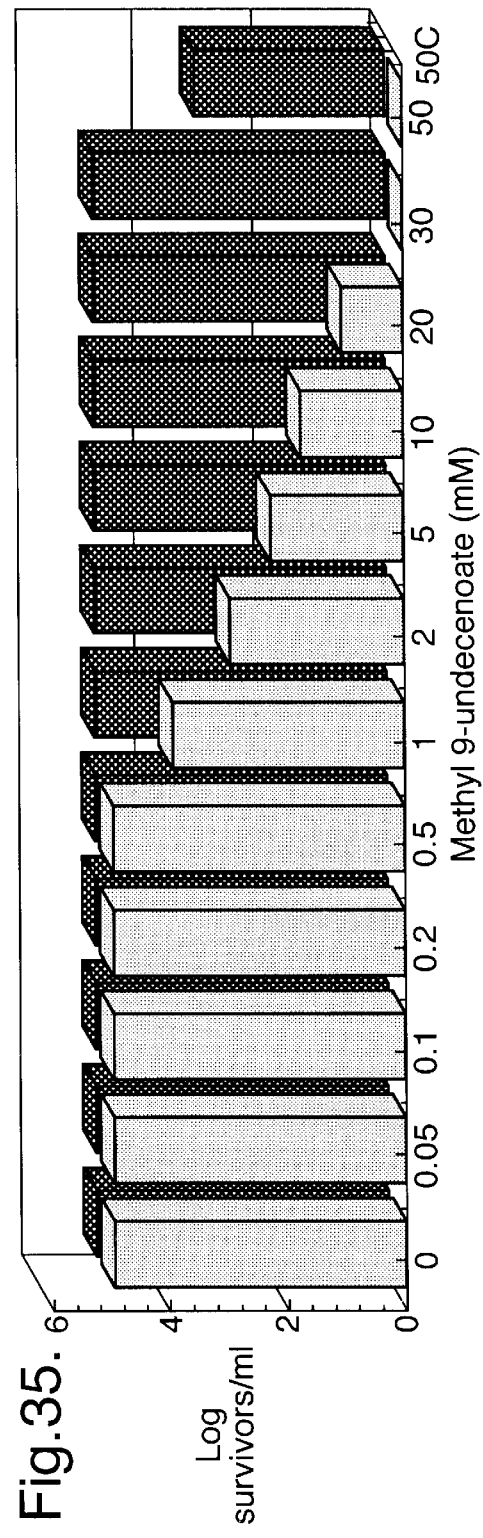
Figure 36:
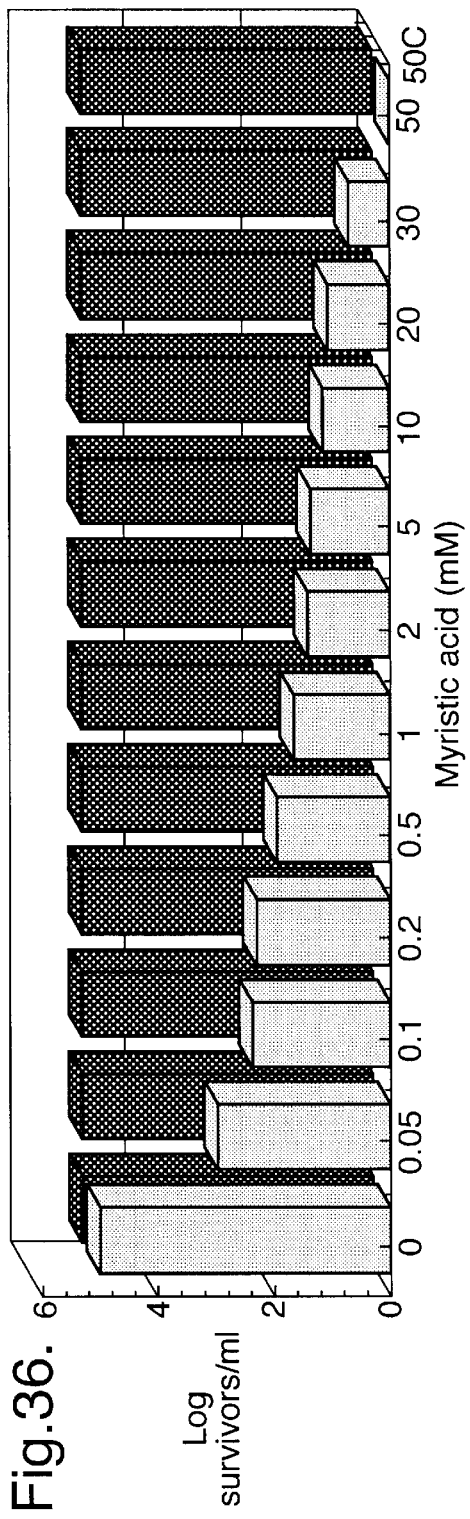
Figure 37:
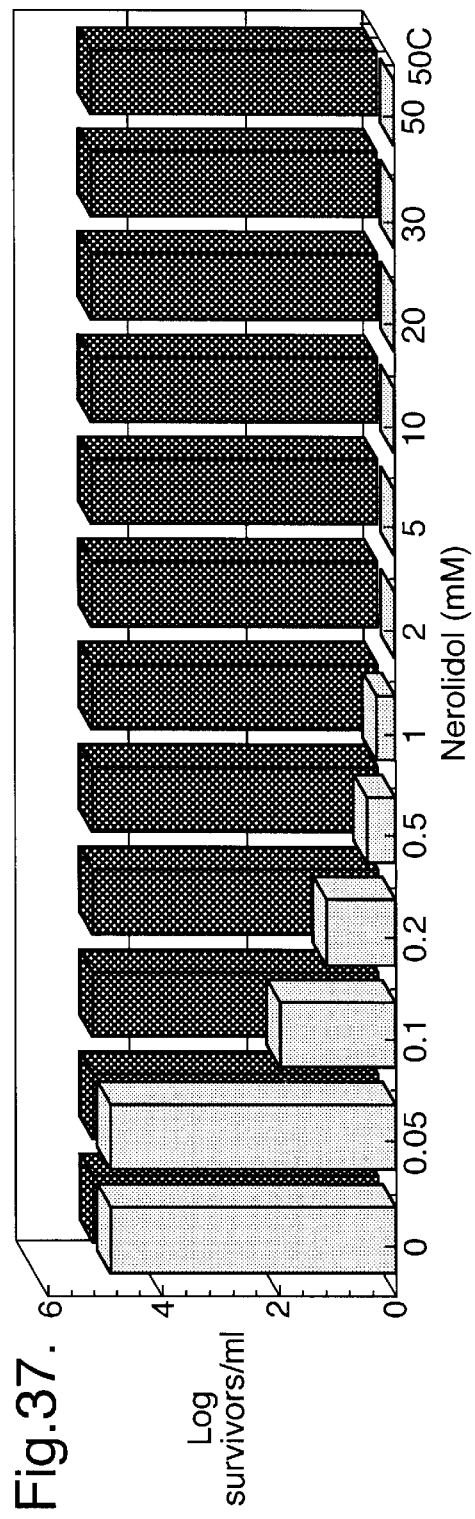
Figure 52:
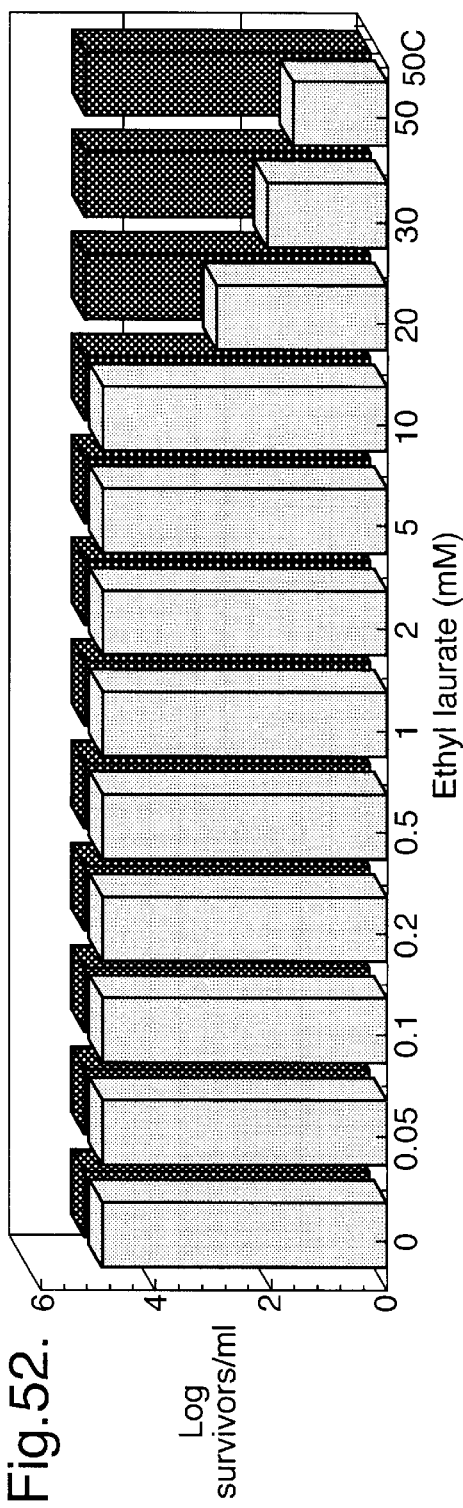
Figure 53:
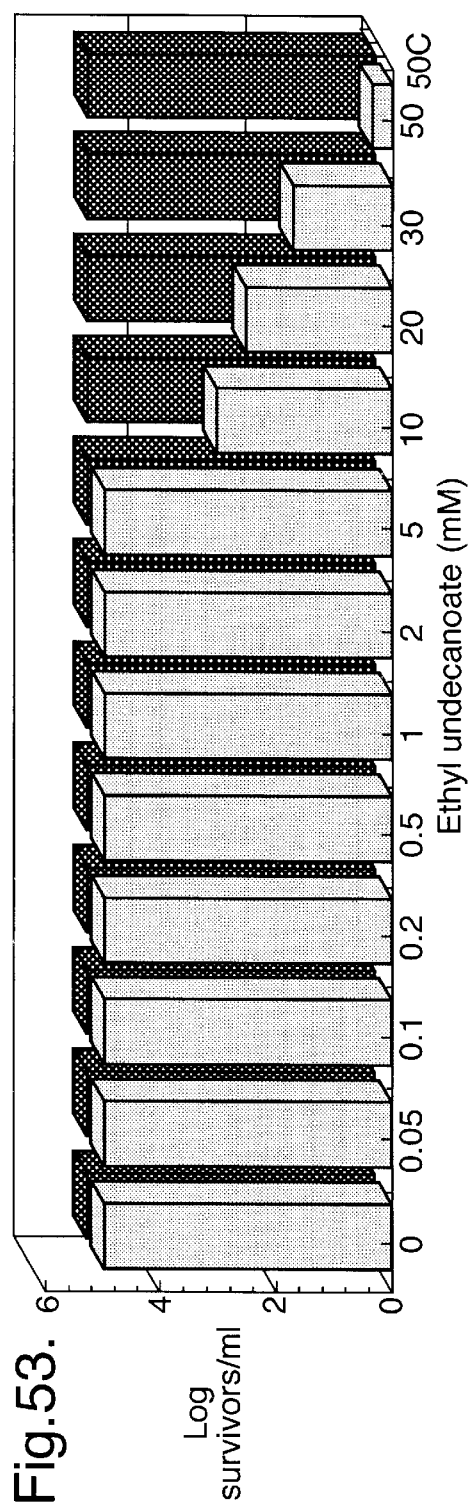
Figure 54:
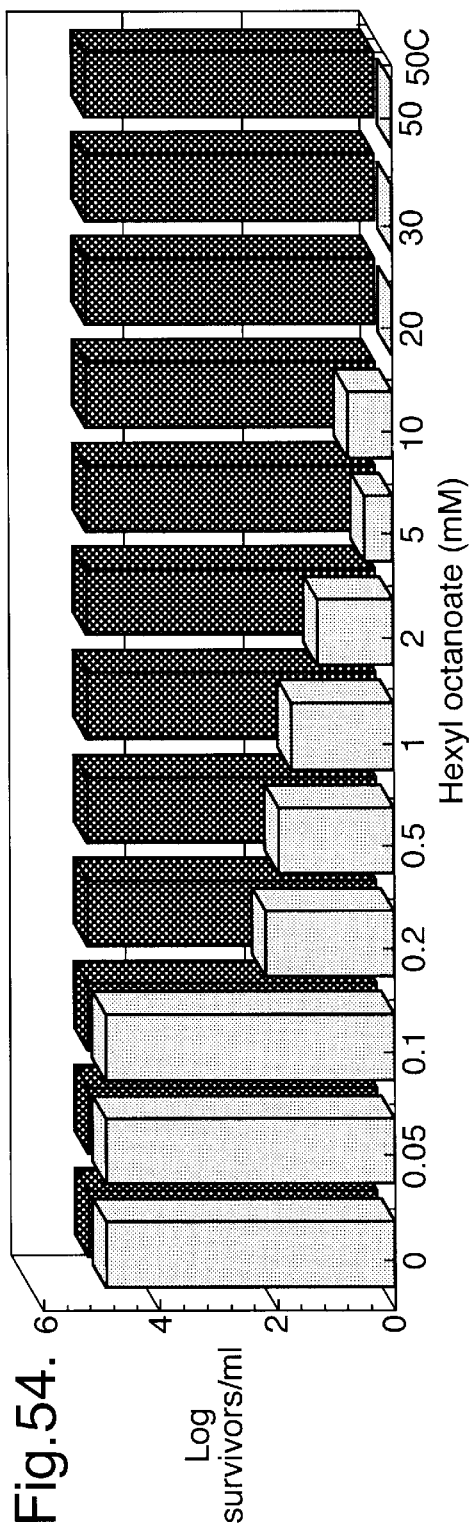
Figure 55:
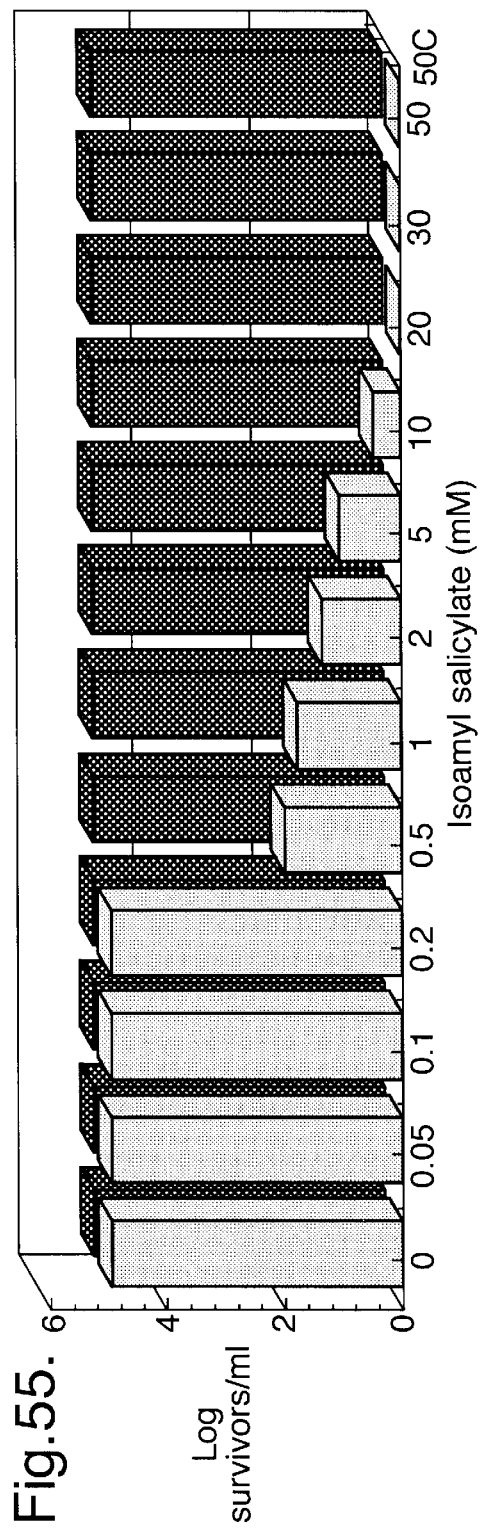
Figure 58:
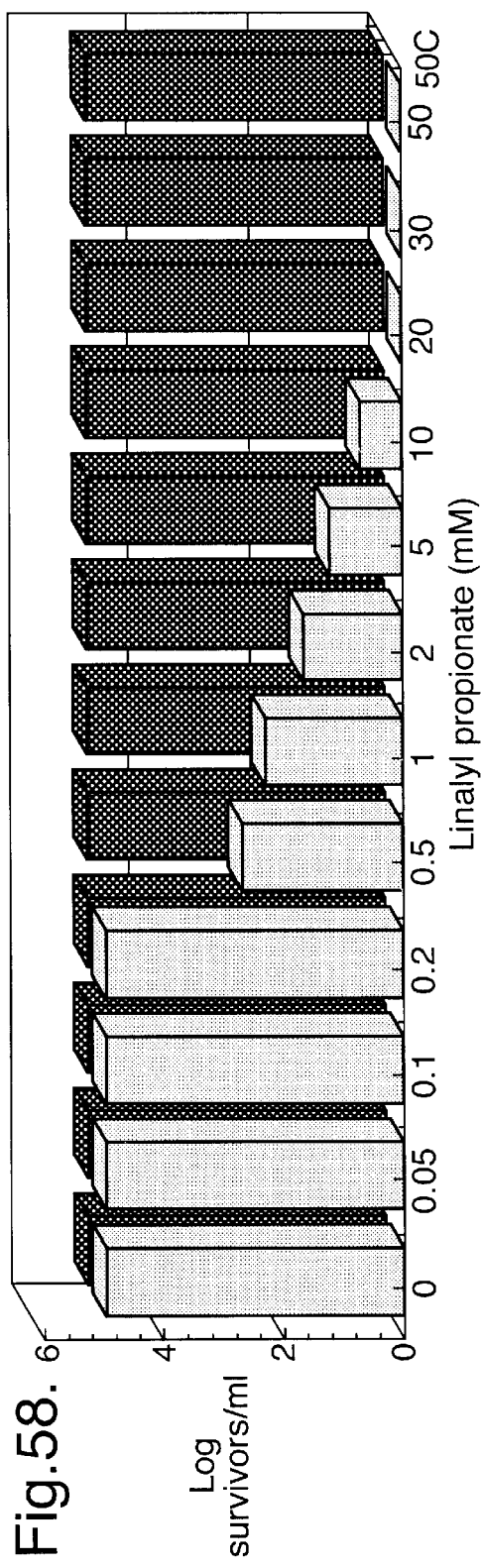
Figure 59:
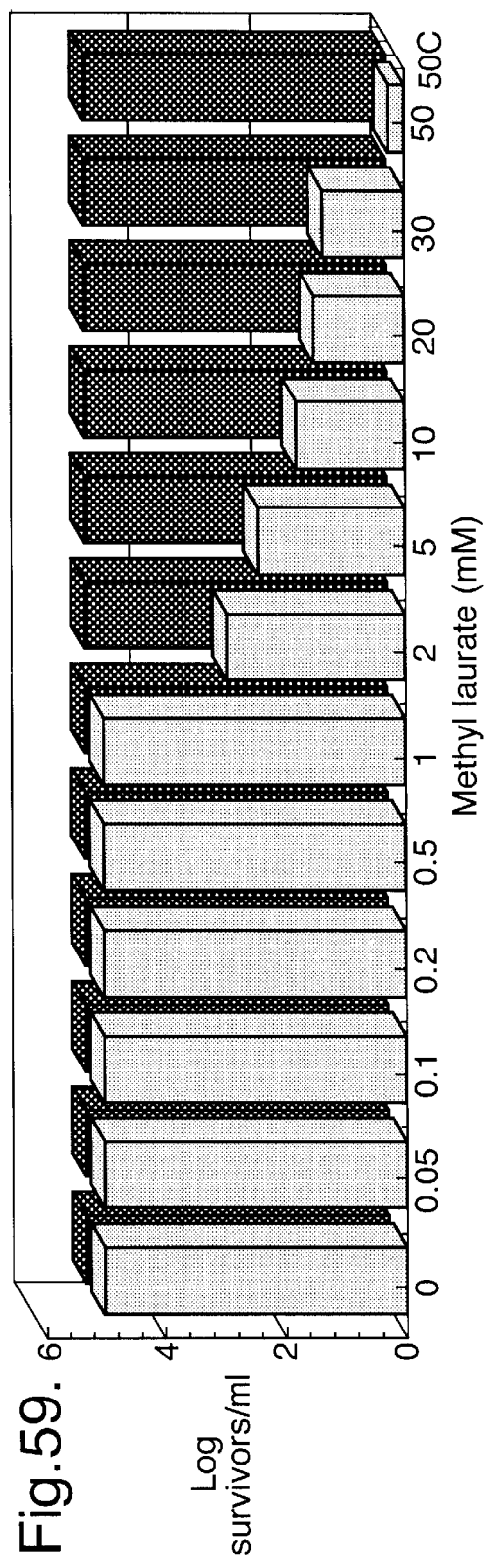
Figure 62:
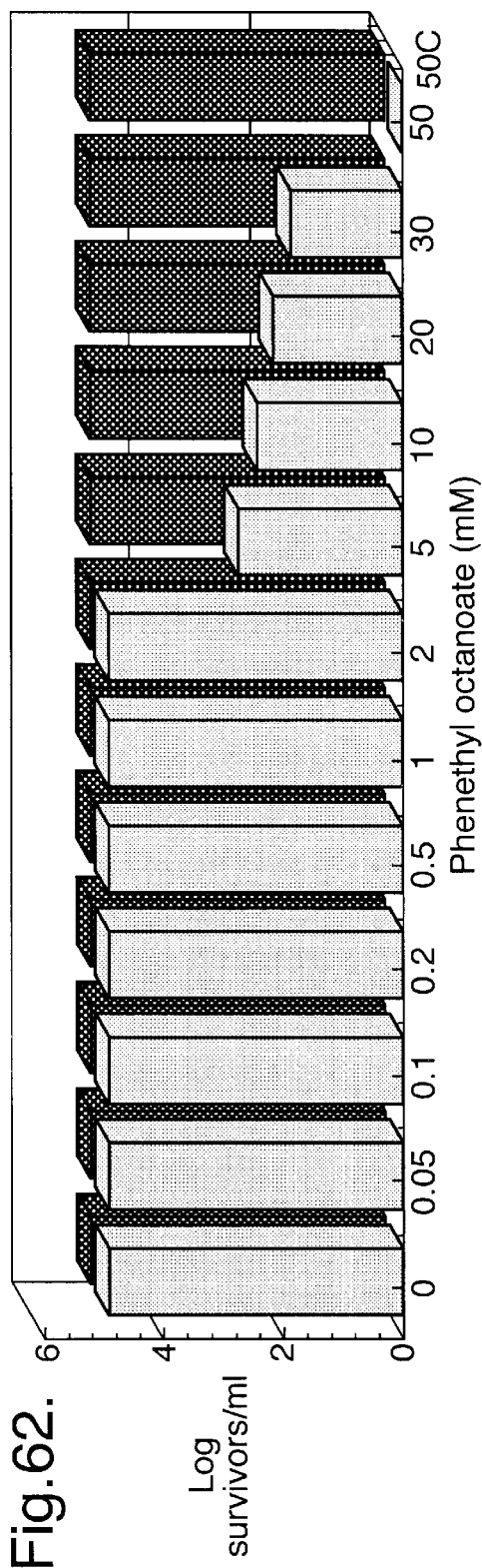
Figure 63:
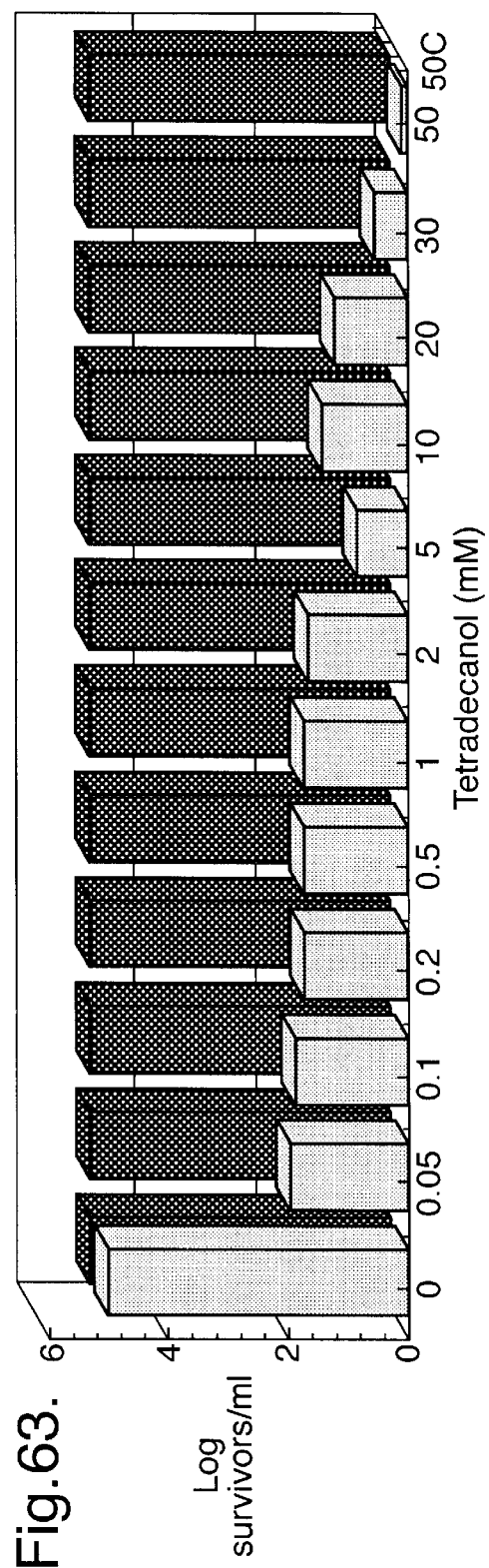
Figure 64:
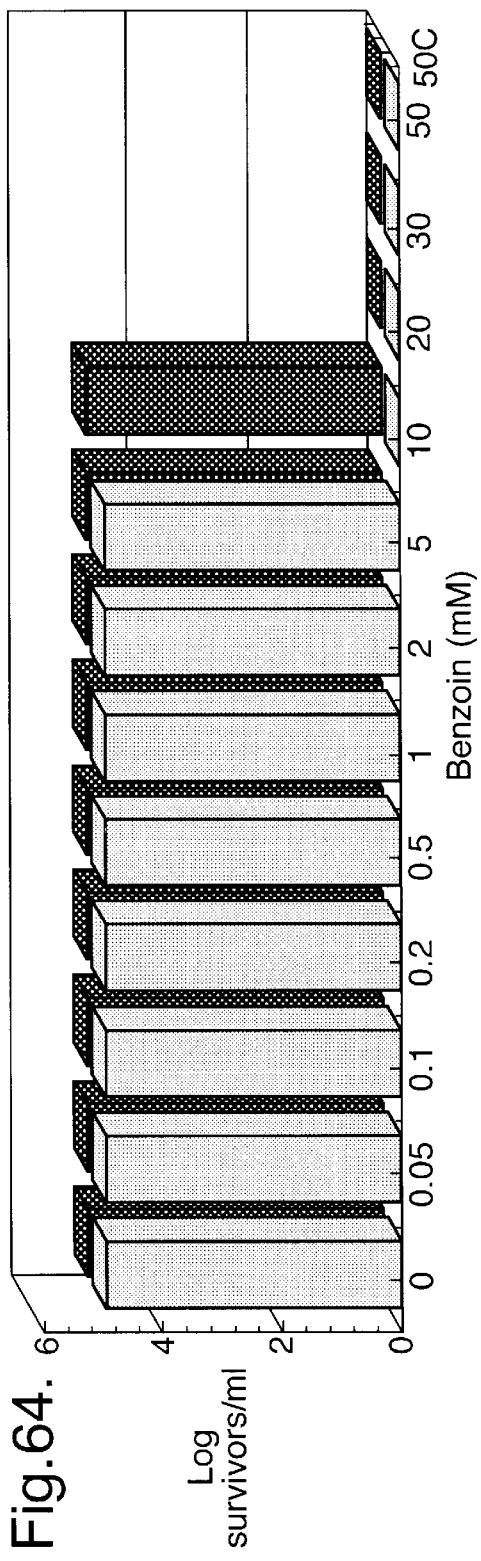
Figure 65:
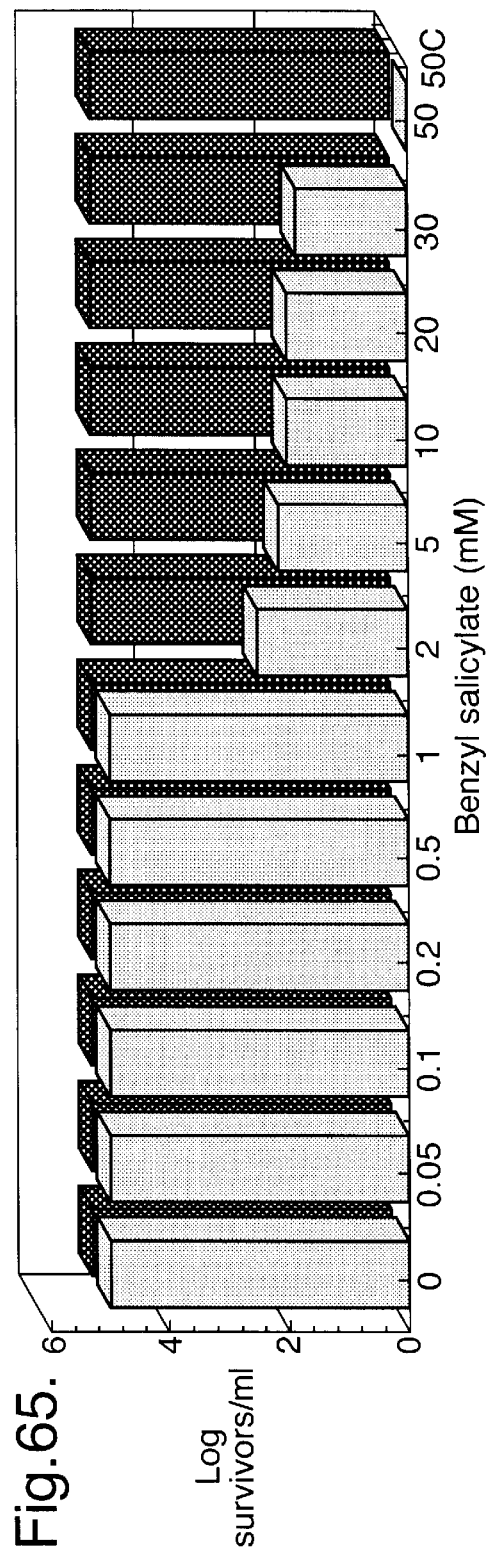
Figure 66:
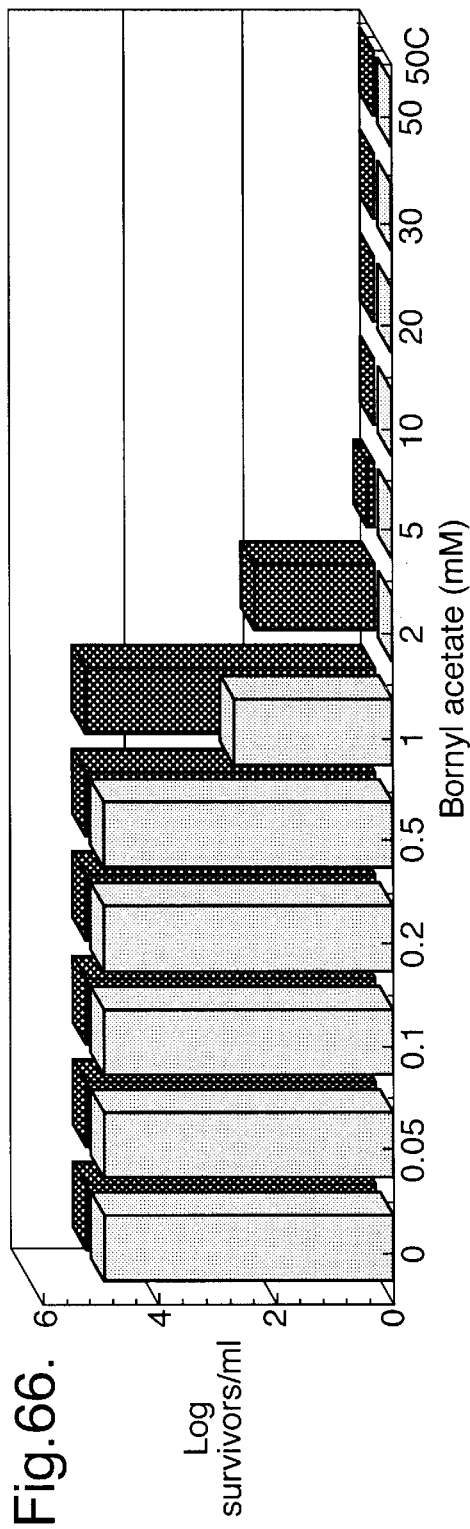
Figure 67:
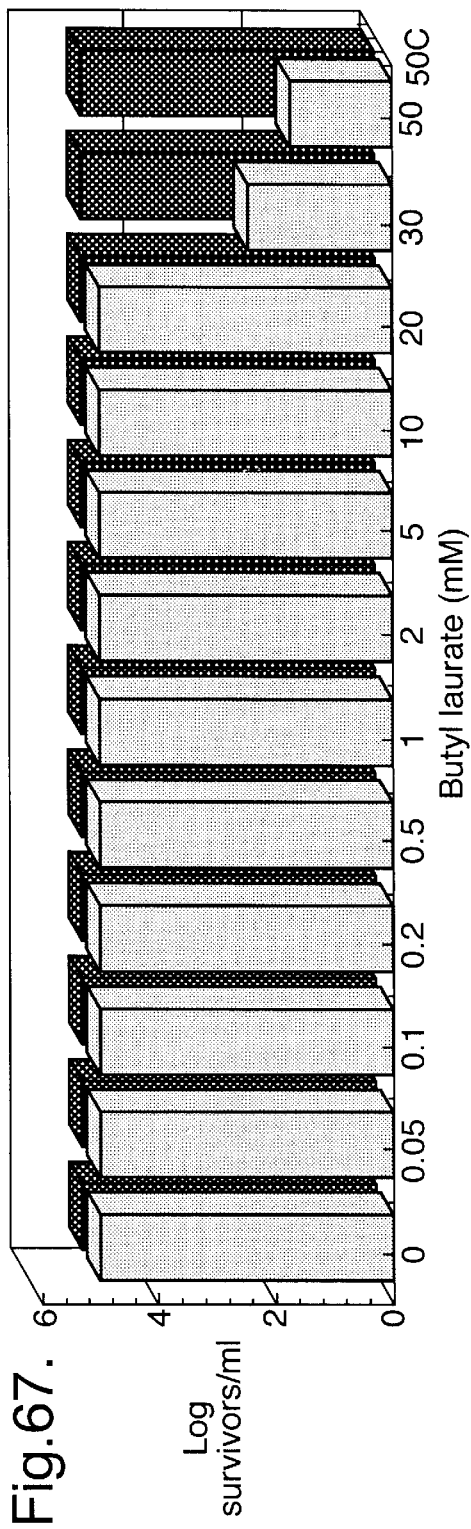
Figure 68:
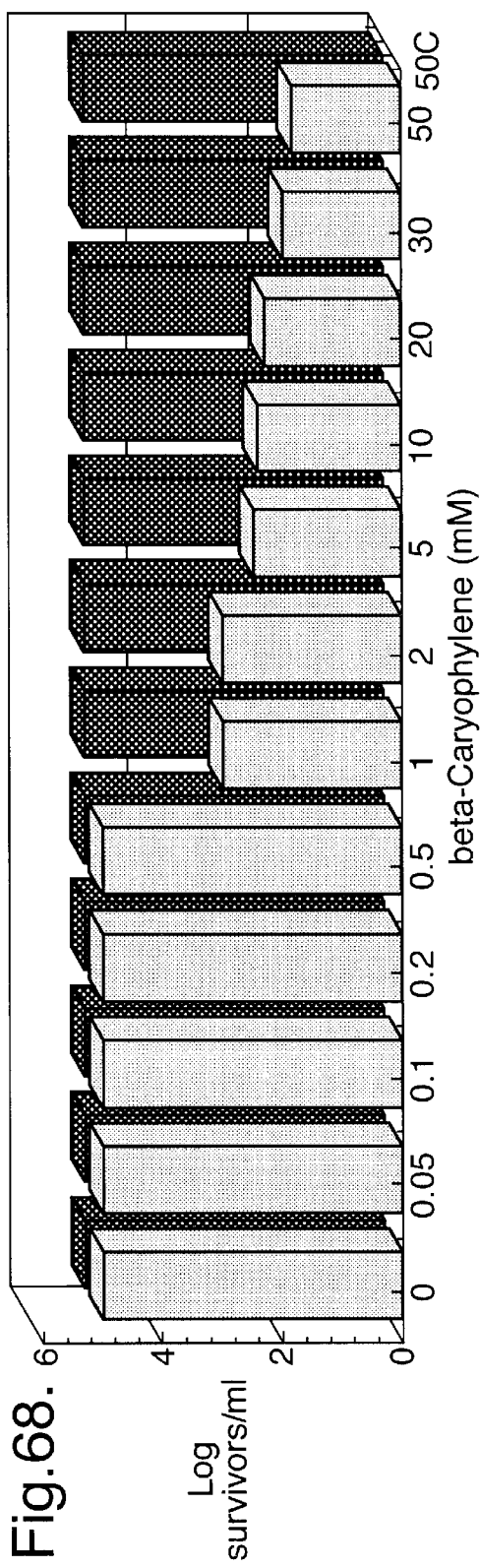
Figure 69:
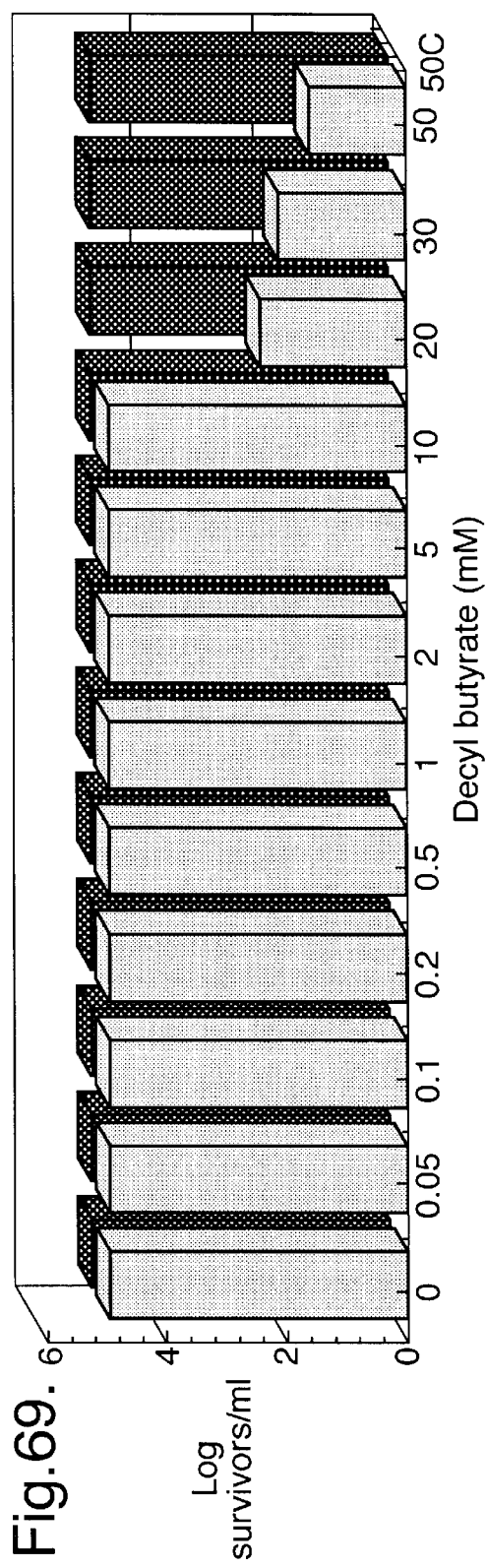
Figure 72:
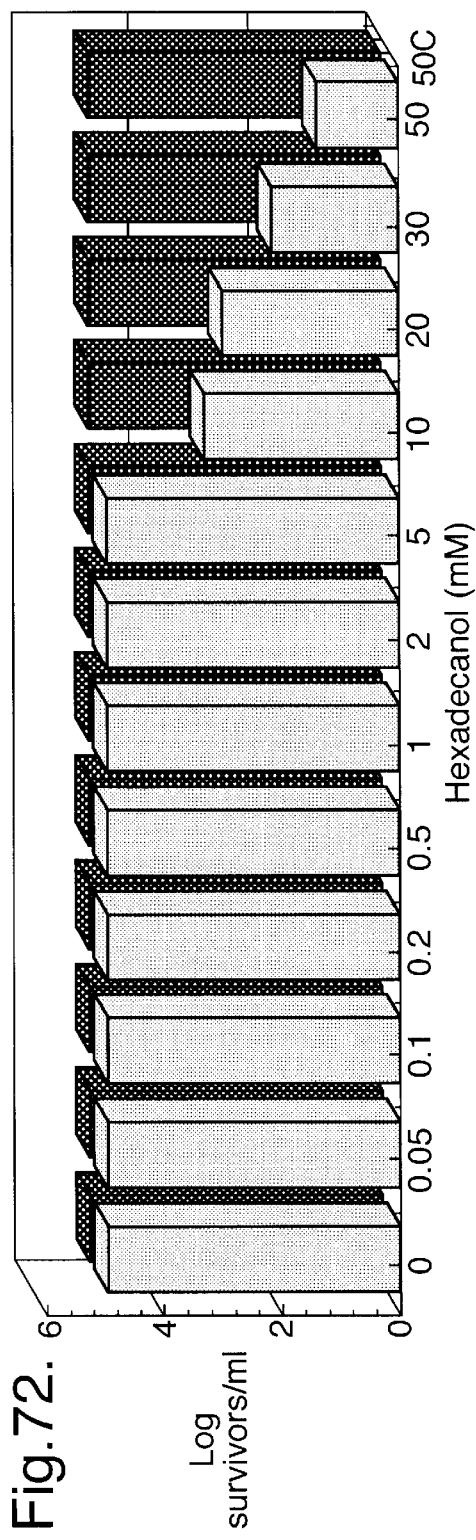
Figure 73:
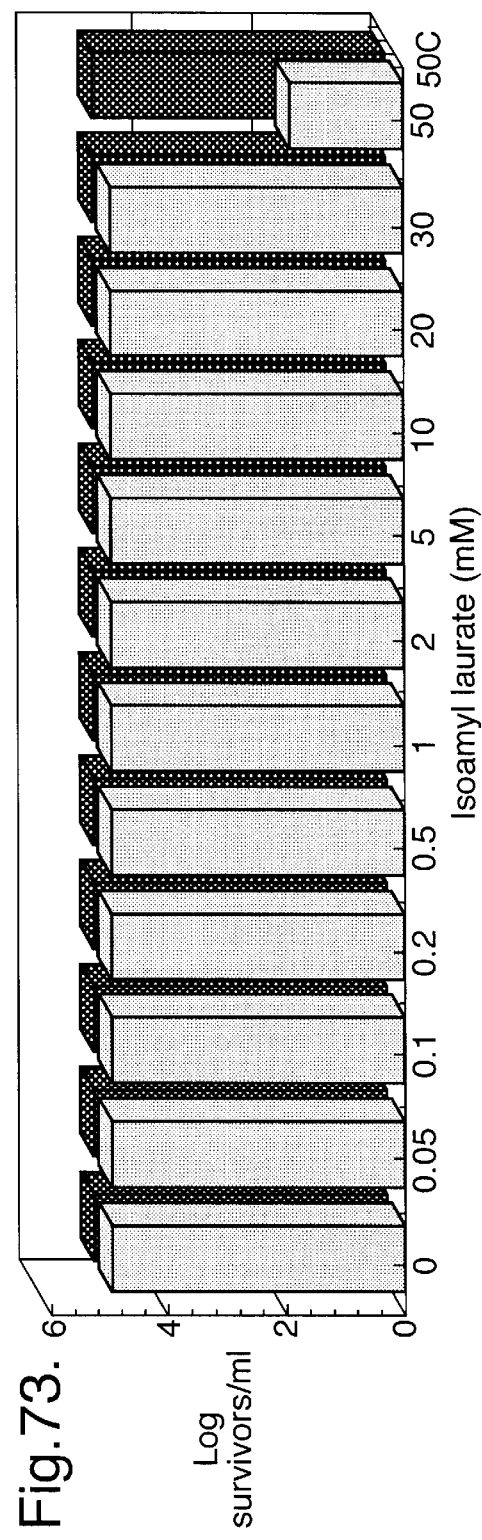
Figure 74:
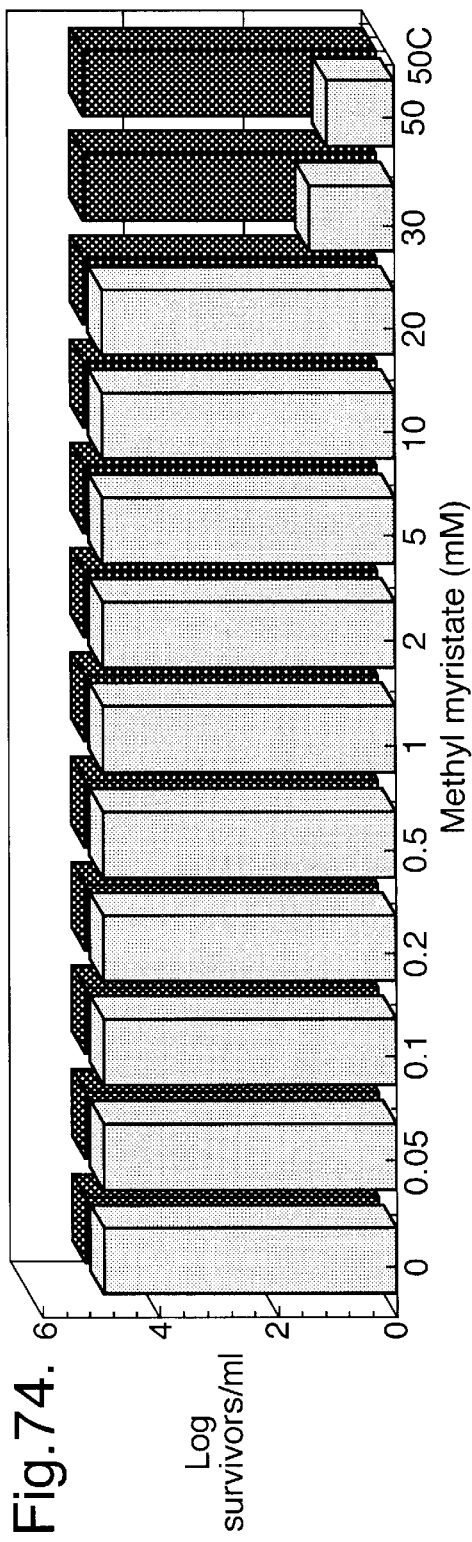
Figure 75:
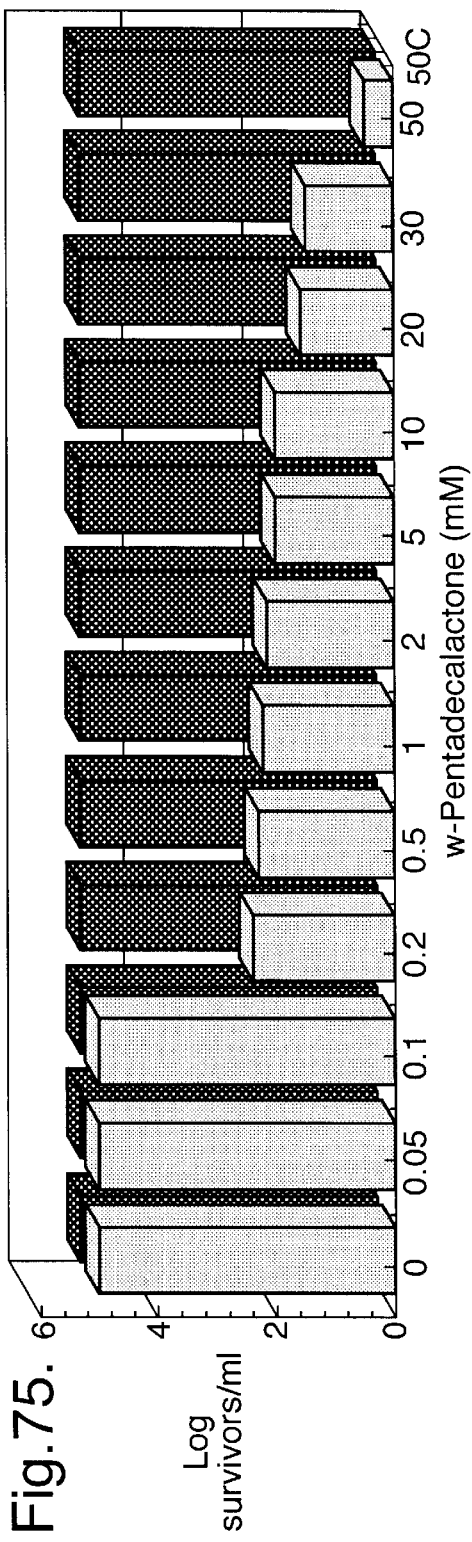
Figure 76:
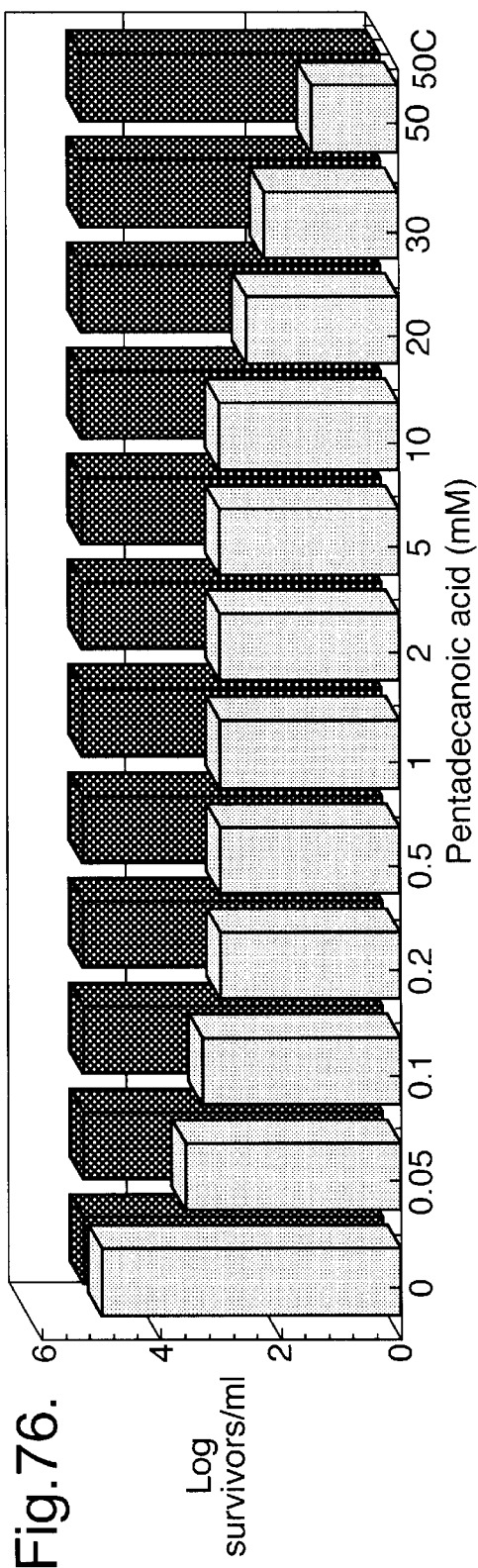
Figure 77:
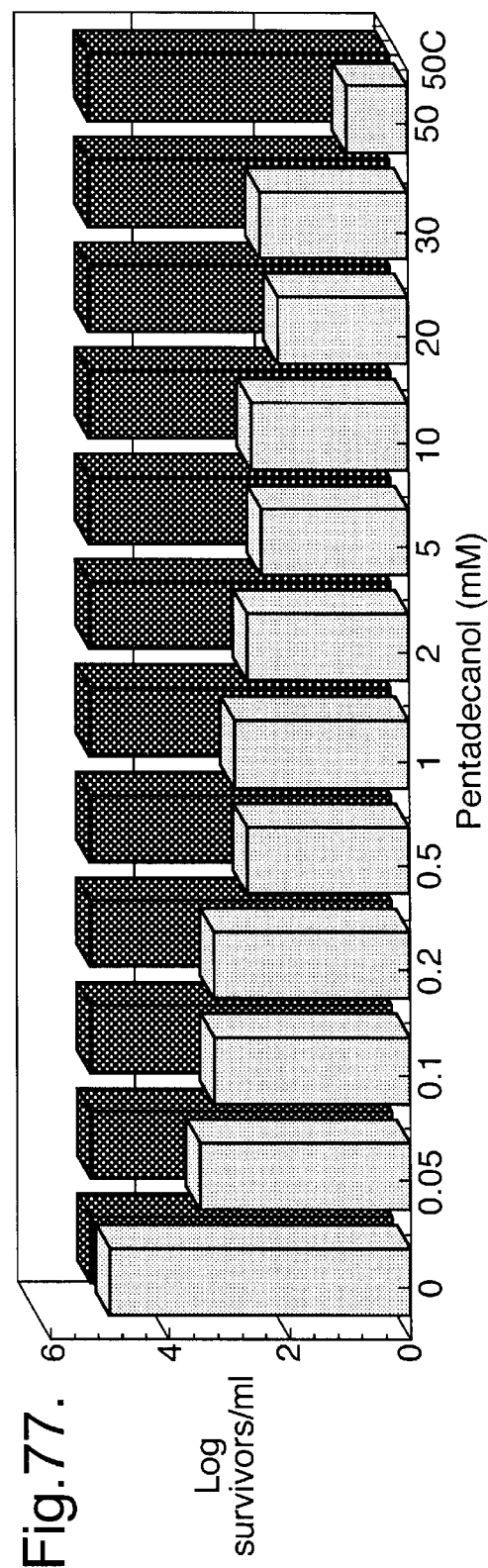
Figure 78:
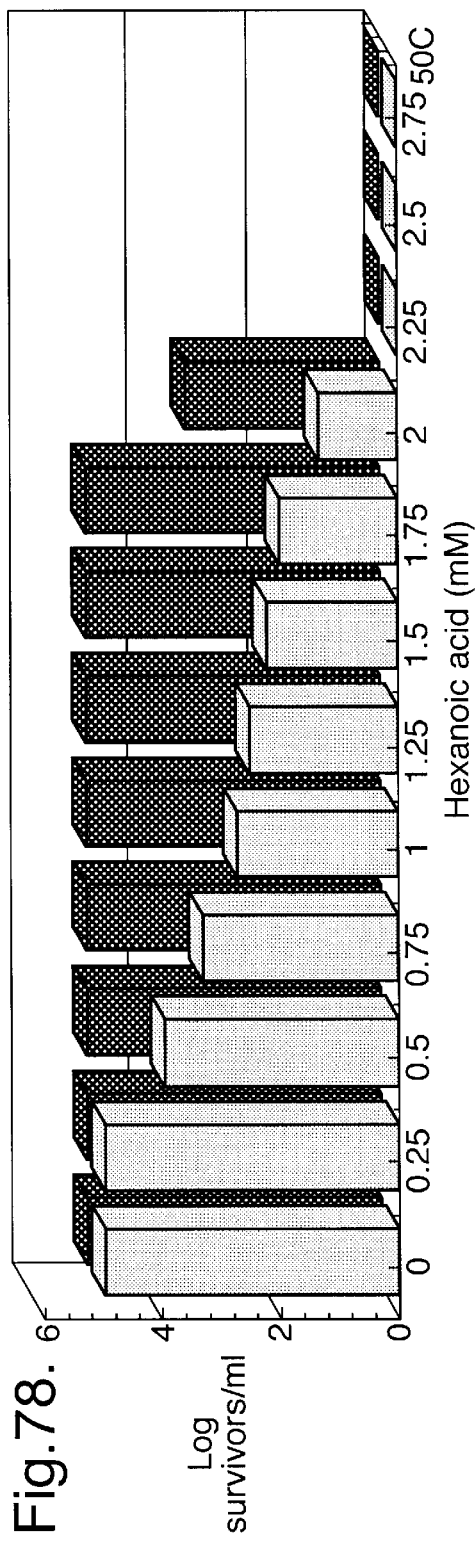
FIGS. 78 to 82 show the control compounds showing little effect as pasteurisation adjuncts tested in YEPD broth pH 3.4.
Figure 79:
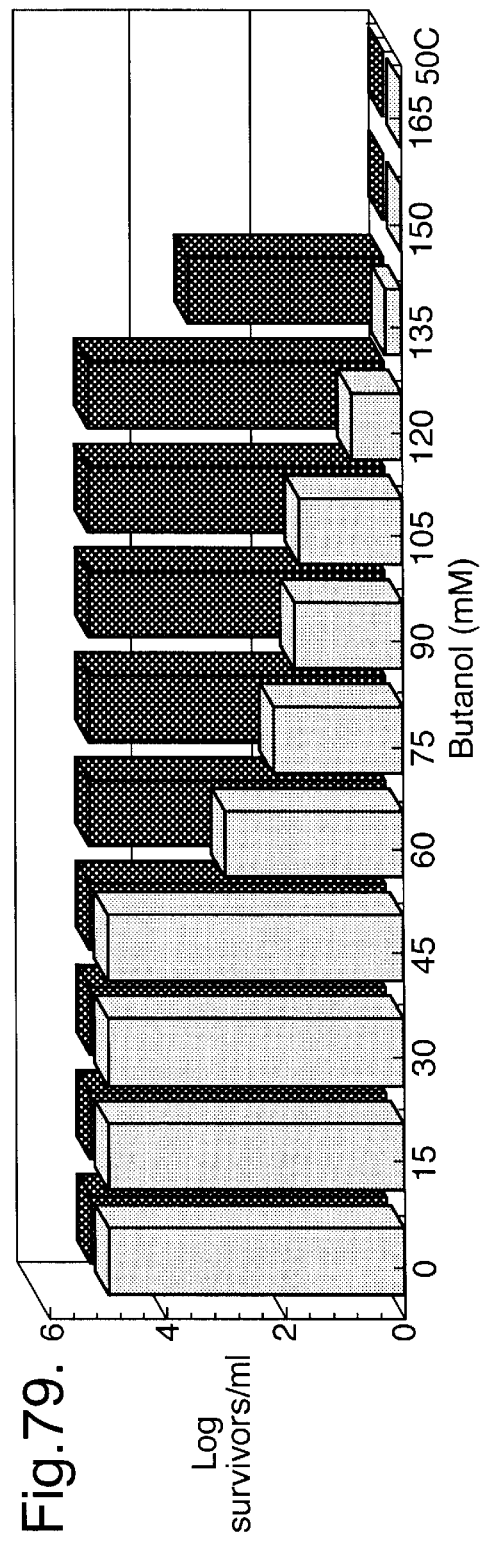
Figure 80:
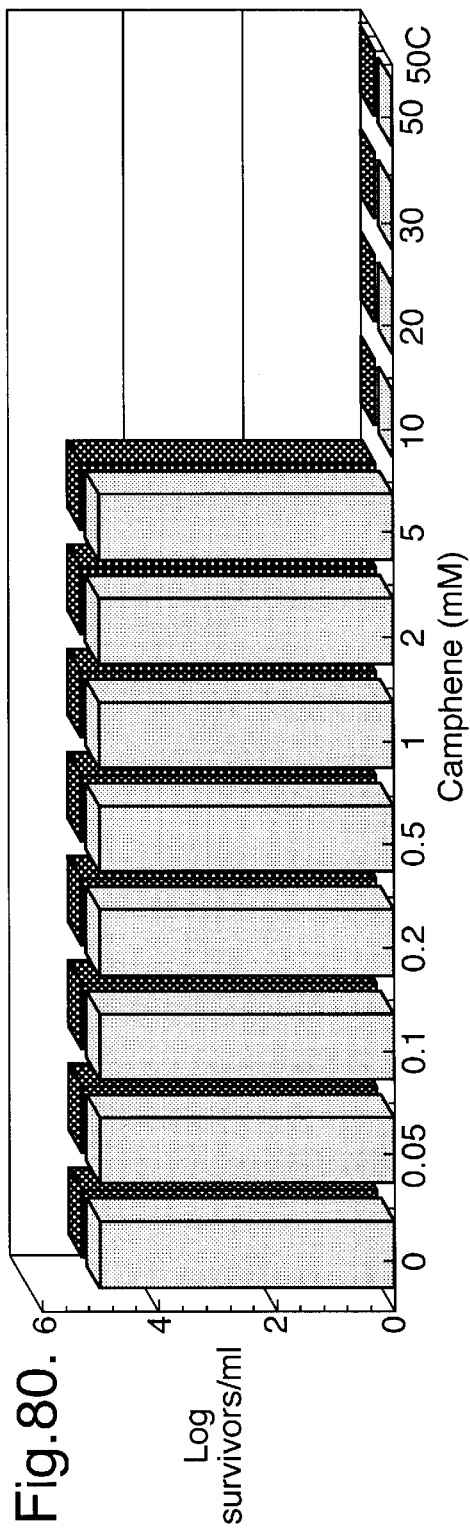
Figure 81:
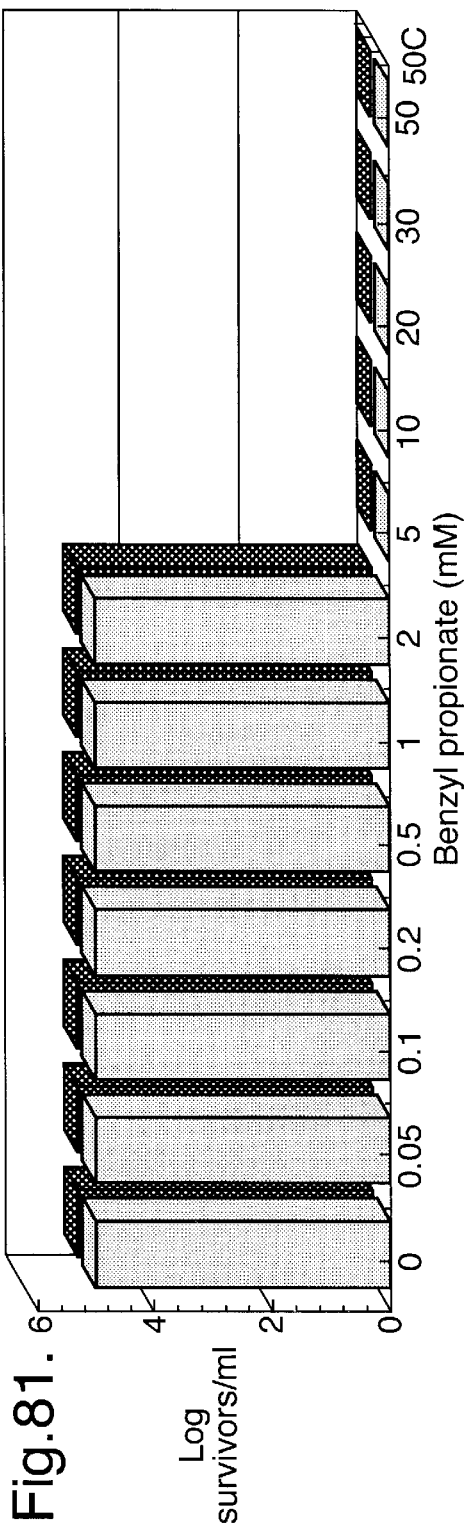
Figure 82:
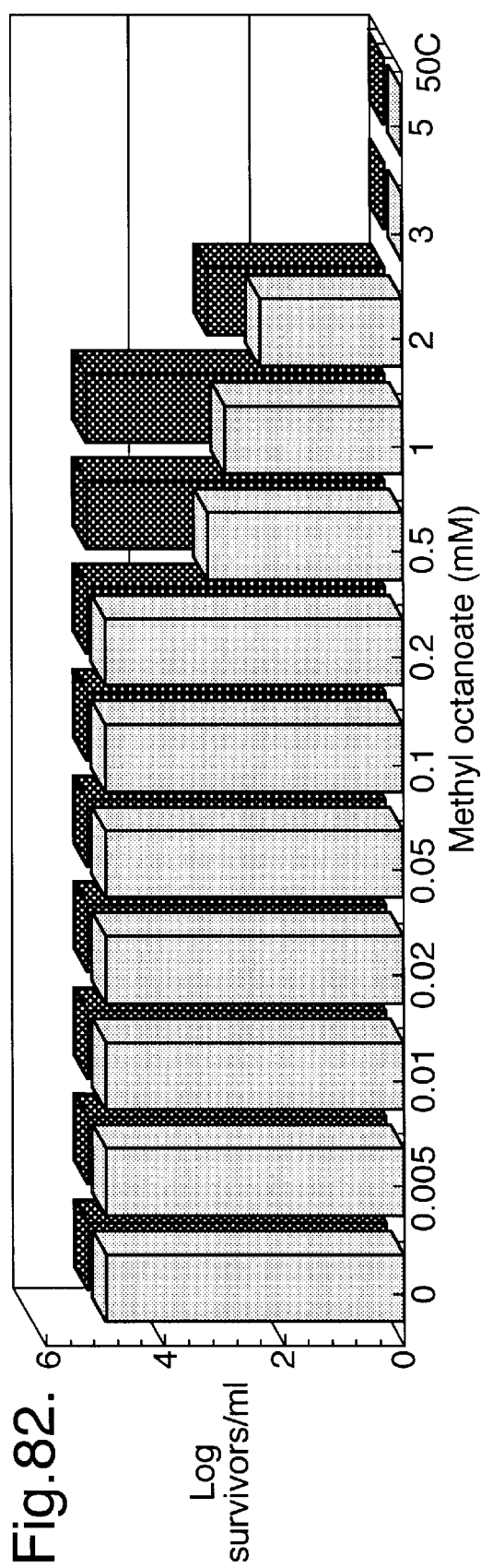

FIG. 11 is a Scatter plot of molecular weight/partition coefficient of compounds able to function as pasteurisation adjuncts. The compounds are listed on Table 1, together with logPoct (partition coefficient) and molecular weight (M.W.) Compounds were assessed as High, Moderate or Low as pasteurisation adjuncts. High effects compounds, most preferred, generally showed at least a 5 fold decrease in MIC, minimum inhibitory concentration at 50° C. compared with 30° C.

EXAMPLE 5
Experiments with High Effect Pasteurisation Adjuncts

FIGS. 12 to 47 show the high effect pasteurisation adjuncts listed in Table 1 tested in YEPD broth pH 3.4. YEPD contained glucose, 20 g/l, peptone 20 g/l and yeast extract 10 g/l. Rows of 30 ml tubes containing 10 ml YEPD, pH 3.4, were equilibrated at the required temperature for 7 minutes in a water bath, before inoculation with $10^4$ cells/ml of the yeast *Saccharomyces cerevisiae* X2180-1B. Tubes were held at temperature for 10 minutes before being cooled rapidly in cold water for 5 minutes. Tubes were then incubated for 48 hours at 25° C. to allow surviving yeasts to grow out, and form discrete colonies. The pasteurisation adjunct had little effect at low temperature on yeast survival. 50° C. temperature+pasteurisation adjuncts showed a remarkable combined synergistic effect, acting to rapidly kill the yeast inoculum.

EXAMPLE 6
Experiments with Moderate Effect Pasteurisation Adjuncts

FIGS. 48 to 63 show the moderate effect pasteurisation adjuncts listed in Table 1 tested in YEPD broth pH 3.4. YEPD contained glucose, 20 g/l, peptone 20 g/l and yeast extract 10 g/l. Rows of 30 ml tubes containing 10 ml YEPD, pH 3.4, were equilibrated at the required temperature for 7 minutes in a water bath, before inoculation with $10^4$ cells/ml of the yeast *Saccharomyces cerevisiae* X2180-1B. Tubes were held at temperature for 10 minutes before being cooled rapidly in cold water for 5 minutes. Tubes were then incubated for 48 hours at 25° C. to allow surviving yeasts to grow out, and form discrete colonies. The pasteurisation adjunct had little effect at low temperature on yeast survival. 50° C. temperature+pasteurisation adjuncts showed a remarkable combined synergistic effect, acting to rapidly kill the yeast inoculum.

EXAMPLE 7
Experiments with Low Effect Pasteurisation Adjuncts

FIGS. 64 to 77 show the low effect pasteurisation adjuncts listed in Table 1 tested in YEPD broth pH 3.4. YEPD contained glucose, 20 g/l, peptone 20 g/l and yeast extract 10 g/l. Rows of 30 ml tubes containing 10 ml YEPD, pH 3.4, were equilibrated at the required temperature for 7 minutes in a water bath, before inoculation with $10^4$ cells/ml of the yeast *Saccharomyces cerevisiae* X2180-1B. Tubes were held at temperature for 10 minutes before being cooled rapidly in cold water for 5 minutes. Tubes were then incubated for 48 hours at 25° C. to allow surviving yeasts to grow out, and form discrete colonies. The pasteurisation adjunct had little effect at low temperature on yeast survival. 50° C. temperature+pasteurisation adjuncts showed a remarkable combined synergistic effect, acting to rapidly kill the yeast inoculum.

EXAMPLE 8
Control Experiments

FIGS. 78 to 82 show the control compounds showing little effect as pasteurisation adjuncts tested in YEPD broth pH 3.4. YEPD contained glucose, 20 g/l, peptone 20 g/l and yeast extract 10 g/l. Rows of 30 ml tubes containing 10 ml YEPD, pH 3.4, were equilibrated at the required temperature for 7 minutes in a water bath, before inoculation with $10^4$ cells/ml of the yeast *Saccharomyces cerevisiae* X2180-1B. Tubes were held at temperature for 10 minutes before being cooled rapidly in cold water for 5 minutes. Tubes were then incubated for 48 hours at 25° C. to allow surviving yeasts to grow out, and form discrete colonies. Control compounds had a normal effect at low temperature on yeast survival and at 50° C. temperature showed only very slight improvements in activity.

What is claimed is:

1. A method for preparing an ambient-stable beverage suitable for cold filling comprising the steps of:
   adding to a beverage at least one pasteurisation adjunct that has no appreciable fungicidal activity at a temperature between 0 and 35 degrees C but exhibits fungicidal activity when heated to a temperature between 40 and 65 degrees C,
   and raising the temperature of the beverage to a temperature between 40 and 65 degrees C in order to activate the fungicidal activity of the pasteurisation adjunct.

2. A method according to claim 1 wherein the pasteurisation adjunct exhibits fungicidal activity when heated to a temperature between 45 and 55° C.

3. A method according to claim 1 wherein the pasteurisation adjunct is selected from the group consisting of allyl cyclohexanepropionate, amyl hexanoate, amyl octanoate, benzoin, benzyl benzoate, benzyl salicylate, bornyl acetate, butyl heptanoate, butyl laurate, butyl 10-undecenoate carvyl propionate, β-caryophylene, decyl acetate, decyl butyrate, decyl propionate, 2-dodecenal, ethyl decanoate, ethyl 2-decenoate, ethyl laurate, ethyl nonanoate, ethyl tridecanoate, ethyl undecanoate, ethyl 10-undecenoate, geranyl acetate, geranylacetone, geranyl butyrate, geranyl propionate, heptyl butyrate, w-6-hexadecalactone, hexadecanol, hexyl hexanoate, hexyl octanoate, isoamyl hexanoate, isoamyl laurate, isoamyl salicylate, lauric acid, lauric alcohol, lauric aldehyde, lauryl acetate, linalyl acetate, linalyl propionate, methyl decanoate, methyl laurate, methyl myristate, methyl nonanoate, methyl undecanoate, methyl-9-undecenoate, mristaldehyde, myristic acid, nerolidol, neryl butyrate, neryl isobutyrate, nonyl acetate, octyl butyrate, w-pentadecalactone, pentadecanoic acid, pentadecanol, phenethyl hexanoate, phenethyl octanoate, 2-phenoxylethyl isobutyrate, tetradecanol, tridecanal, tridecanoic acid, tridecanol, 2-tridecenal and 2-undecanone.

4. A method according to claim 3 wherein the pasteurisation adjunct is selected from the group consisting of allyl cyclohexanepropionate, amyl hexanoate, butyl heptanoate, decyl acetate, decyl propionate, 2-dodecenal, ethyl decanoate ethyl 2-decenoate, ethyl nonanoate, ethyl 10-undecenoate, geranyl acetate, geranylacetone, geranyl butyrate, geranyl propionate, heptyl butyrate, hexyl hexanoate, isoamyl hexanoate, lauric acid, lauric alcohol, lauric aldehyde, methyl decanoate, methyl laurate, methyl nonanoate, methyl undecanoate, methyl-9-undecenoate, myristic acid, nerolidol, neryl isobutyrate, nonyl acetate, octyl butyrate, phenethyl hexanoate, 2-phenoxylethyl isobutyrate, tridecanal, tridecanoic acid, tridecanol, 2-tridecenal and 2-undecanone.

5. A method according to claim 4 wherein the pasteurisation adjunct is selected from the group consisting of decyl acetate, lauric acid, lauric aldehyde, lauric alcohol, 2-dodecenal, ethyl 2-decenoate, geranyl acetone and geranyl acetate.

6. A method according to claim 1 wherein the pasteurisation adjunct is a compound that has a molecular weight between 170 and 230 daltons and a $\log P_{oct}$ value between 3.5 and 5.5.

7. A method according to claim 1 wherein the concentration of the pasteurisation adjunct is no greater than 1 mM.

8. A method according to claim 1 wherein the beverage is tea based.

9. A method according to claim 8 wherein the beverage contains 0.01 to 3% tea solids.

10. A method according to claim 1 wherein the pasteurisation adjunct also becomes antibacterial when activated by heat.

11. A method according to claim 1 wherein the concentration of the pasteurisation adjunct is no greater than 0.1 mM.

* * * * *